(12) United States Patent
Bowen et al.

(10) Patent No.: US 12,332,618 B2
(45) Date of Patent: Jun. 17, 2025

(54) VAPORIZER CONTROLS

(71) Applicant: JUUL Labs, Inc., Washington, DC (US)

(72) Inventors: Adam Bowen, San Mateo, CA (US); Brandon Cheung, San Francisco, CA (US); James Monsees, San Francisco, CA (US); Roxolana Wacyk, San Francisco, CA (US)

(73) Assignee: JUUL Labs, Inc., Washington, DC (US)

( * ) Notice: Subject to any disclaimer, the term of this patent is extended or adjusted under 35 U.S.C. 154(b) by 317 days.

(21) Appl. No.: 16/956,489

(22) PCT Filed: Dec. 21, 2018

(86) PCT No.: PCT/US2018/067388
§ 371 (c)(1),
(2) Date: Jun. 19, 2020

(87) PCT Pub. No.: WO2019/126805
PCT Pub. Date: Jun. 27, 2019

(65) Prior Publication Data
US 2021/0011446 A1    Jan. 14, 2021

Related U.S. Application Data

(60) Provisional application No. 62/760,918, filed on Nov. 13, 2018, provisional application No. 62/745,959, (Continued)

(51) Int. Cl.
*A24F 40/49* (2020.01)
*G05B 19/042* (2006.01)
(Continued)

(52) U.S. Cl.
CPC ......... *G05B 19/042* (2013.01); *G06K 7/1413* (2013.01); *G06K 7/1417* (2013.01);
(Continued)

(58) Field of Classification Search
CPC .......... A24F 40/49; A24F 40/50; A24F 40/60; A24F 40/65
(Continued)

(56) References Cited

U.S. PATENT DOCUMENTS 5,610,635 A    3/1997  Murray et al.
6,103,055 A    8/2000  Maher et al.
(Continued)

FOREIGN PATENT DOCUMENTS

AU    2017202891 B2    5/2017
CN       1195270 C     7/2001
(Continued)

OTHER PUBLICATIONS

Pham, et al., (Feb. 28, 2011)"A Clustering Approach for Collaborative Filtering Recommendation Using Social Network Analysis", Journal of Universal Computer Science, 17(4):583-604.
(Continued)

*Primary Examiner* — Paultep Savusdiphol
(74) *Attorney, Agent, or Firm* — Mintz Levin Cohn Ferris Glovsky and Popeo, P.C.

(57) ABSTRACT

Vaporizers and vaporizer systems, which can include a user device in communication with a vaporizer, can include one or more features related to control of functions and/or features of the vaporizer. A method for locking a vaporizer is provided. The method includes determining whether a vaporizer is within a communication range of a second device. The method further includes locking the vaporizer in response to the vaporizer being within the communication range. The method further includes receiving information
(Continued)

associated with a user of the vaporizer. The method further includes determining, based on the received information, an age of the user and unlocking, by the one or more processors and based on the age of the user satisfying a threshold, the vaporizer to activate the operation of the vaporizer.

20 Claims, 52 Drawing Sheets

Related U.S. Application Data filed on Oct. 15, 2018, provisional application No. 62/690,947, filed on Jun. 27, 2018, provisional application No. 62/609,289, filed on Dec. 21, 2017.

(51) Int. Cl.
  *G06K 7/14* (2006.01)
  *G06K 19/06* (2006.01)
(52) U.S. Cl.
  CPC . *G06K 19/06028* (2013.01); *G06K 19/06037* (2013.01); *G05B 2219/2614* (2013.01)
(58) Field of Classification Search
  USPC .................................. 392/404, 386, 390, 398
  See application file for complete search history.

(56) References Cited

U.S. PATENT DOCUMENTS

| | | |
|---|---|---|
| 8,402,976 B2 | 3/2013 | Fernando et al. |
| 8,550,069 B2 | 10/2013 | Alelov |
| 8,807,131 B1 | 8/2014 | Tunnell et al. |
| 9,072,321 B2 | 7/2015 | Liu et al. |
| 9,247,773 B2 | 2/2016 | Memari et al. |
| 9,315,890 B1 | 4/2016 | Bache et al. |
| 9,439,455 B2 | 9/2016 | Alarcon et al. |
| 9,462,832 B2 | 10/2016 | Lord |
| 9,609,895 B2 | 4/2017 | Galloway et al. |
| 9,763,478 B2 | 9/2017 | Cameron et al. |
| 9,770,055 B2 | 9/2017 | Cameron et al. |
| 9,772,216 B2 | 9/2017 | Poole et al. |
| 9,877,519 B2 | 1/2018 | Xiang |
| 10,028,537 B1 | 7/2018 | Hawes et al. |
| 10,034,495 B2 | 7/2018 | Alarcon et al. |
| 10,058,124 B2 | 8/2018 | Monsees et al. |
| 10,104,913 B2 | 10/2018 | Lau et al. |
| 10,131,532 B2 | 11/2018 | Murison et al. |
| 10,165,799 B2 | 1/2019 | Reevell |
| 10,194,693 B2 | 2/2019 | Wensley et al. |
| 10,278,423 B2 | 5/2019 | Smith et al. |
| 10,299,514 B2 | 5/2019 | Bilat et al. |
| 10,321,711 B2 | 6/2019 | Henry, Jr. et al. |
| 10,327,474 B2 | 6/2019 | Hawes et al. |
| 10,334,885 B2 | 7/2019 | Baker et al. |
| 10,357,060 B2 | 7/2019 | Rostami et al. |
| 10,368,580 B2 | 8/2019 | Rostami et al. |
| 10,369,308 B2 | 8/2019 | Baker et al. |
| 10,375,990 B2 | 8/2019 | Lord |
| 10,314,343 B2 | 9/2019 | Newcomb et al. |
| 10,420,374 B2 | 9/2019 | Liu |
| 10,448,670 B2 | 10/2019 | Talon et al. |
| 10,463,077 B2 | 11/2019 | Lau et al. |
| 10,499,690 B2 | 12/2019 | Thorens |
| 10,506,829 B2 | 12/2019 | Freelander |
| 10,555,552 B2 | 2/2020 | Batista et al. |
| 10,575,561 B2 | 3/2020 | Reevell |
| 10,575,562 B2 | 3/2020 | Bless et al. |
| 10,667,558 B2 | 6/2020 | Bessant et al. |
| 10,671,031 B2 | 6/2020 | Hawes et al. |
| 10,674,764 B2 | 6/2020 | Reevell |
| 10,721,967 B2 | 7/2020 | Raichman |
| 10,736,356 B2 | 8/2020 | Jordan et al. |
| 10,765,148 B2 | 9/2020 | Hawes et al. |
| 10,772,355 B2 | 9/2020 | Zuber et al. |
| 10,791,760 B2 | 10/2020 | Zuber et al. |
| 10,881,139 B2 | 1/2021 | Li et al. |
| 10,888,119 B2 | 1/2021 | Ampolini et al. |
| 10,897,930 B2 | 1/2021 | Kobal et al. |
| 10,897,931 B2 | 1/2021 | Azzopardi et al. |
| 10,945,461 B2 | 3/2021 | Juster et al. |
| 10,945,463 B2 | 3/2021 | Dickens et al. |
| 10,952,473 B2 | 3/2021 | Bessant et al. |
| 11,026,448 B2 | 6/2021 | Leadley et al. |
| 11,035,704 B2 | 6/2021 | Kane et al. |
| 11,160,936 B2 | 11/2021 | Bache et al. |
| 11,224,253 B2 | 1/2022 | Fernando et al. |
| 11,259,370 B2 | 2/2022 | Fernando et al. |
| 11,290,182 B2 | 3/2022 | Bache et al. |
| 11,304,448 B2 | 4/2022 | Hawes et al. |
| 11,330,840 B2 | 5/2022 | Fernando et al. |
| 2005/0066961 A1 | 3/2005 | Rand |
| 2006/0196505 A1 | 9/2006 | Izuchukwu |
| 2007/0125765 A1 | 6/2007 | Nelson |
| 2009/0266358 A1 | 10/2009 | Rock et al. |
| 2010/0191385 A1 | 7/2010 | Goodnow et al. |
| 2010/0234987 A1 | 9/2010 | Benschop et al. |
| 2011/0036346 A1 | 2/2011 | Cohen et al. |
| 2011/0097060 A1 | 4/2011 | Buzzetti |
| 2011/0150294 A1 | 6/2011 | Eckhoff et al. |
| 2012/0291791 A1 | 11/2012 | Pradeep |
| 2012/0304990 A1 | 12/2012 | Todd |
| 2013/0174842 A1 | 7/2013 | Young et al. |
| 2013/0220315 A1 | 8/2013 | Conley et al. |
| 2013/0276799 A1 | 10/2013 | Davidson et al. |
| 2013/0284192 A1 | 10/2013 | Peleg et al. |
| 2013/0311001 A1 | 11/2013 | Hampiholi |
| 2013/0319439 A1 | 12/2013 | Gorelick et al. |
| 2013/0340775 A1* | 12/2013 | Juster .................... H04L 67/01 131/273 |
| 2014/0078164 A1 | 3/2014 | Chan et al. |
| 2014/0123989 A1 | 5/2014 | Lamothe |
| 2014/0144429 A1 | 5/2014 | Wensley et al. |
| 2014/0158129 A1 | 6/2014 | Pratt, Jr. et al. |
| 2014/0182608 A1 | 7/2014 | Egoyants et al. |
| 2014/0190496 A1 | 7/2014 | Wensley et al. |
| 2014/0246035 A1 | 9/2014 | Minskoff et al. |
| 2014/0278250 A1 | 9/2014 | Smith et al. |
| 2014/0283859 A1 | 9/2014 | Minskoff et al. |
| 2014/0334804 A1 | 11/2014 | Choi |
| 2014/0338685 A1 | 11/2014 | Amir |
| 2014/0345635 A1 | 11/2014 | Rabinowitz et al. |
| 2015/0020822 A1 | 1/2015 | Janardhan et al. |
| 2015/0020825 A1 | 1/2015 | Galloway et al. |
| 2015/0064672 A1 | 3/2015 | Bars |
| 2015/0075546 A1 | 3/2015 | Kueny et al. |
| 2015/0101625 A1 | 4/2015 | Newton et al. |
| 2015/0114407 A1 | 4/2015 | Duncan et al. |
| 2015/0122252 A1 | 5/2015 | Frija |
| 2015/0136155 A1 | 5/2015 | Verleur et al. |
| 2015/0136158 A1 | 5/2015 | Stevens et al. |
| 2015/0164144 A1 | 6/2015 | Liu |
| 2015/0181945 A1* | 7/2015 | Tremblay ................ A24F 40/60 131/328 |
| 2015/0208731 A1 | 7/2015 | Malamud et al. |
| 2015/0216237 A1 | 8/2015 | Wensley et al. |
| 2015/0257445 A1 | 9/2015 | Henry et al. |
| 2015/0258289 A1 | 9/2015 | Henry et al. |
| 2015/0272220 A1 | 10/2015 | Spinka et al. |
| 2015/0272223 A1 | 10/2015 | Weigensberg et al. |
| 2015/0288468 A1 | 10/2015 | Xiang |
| 2015/0305409 A1 | 10/2015 | Verleur et al. |
| 2015/0359263 A1 | 12/2015 | Bellinger |
| 2016/0004469 A1 | 1/2016 | Yun et al. |
| 2016/0021930 A1 | 1/2016 | Minskoff et al. |
| 2016/0057811 A1 | 2/2016 | Alarcon et al. |
| 2016/0063235 A1 | 3/2016 | Tussy |
| 2016/0089508 A1 | 3/2016 | Smith et al. |
| 2016/0106936 A1 | 4/2016 | Kimmel |
| 2016/0143361 A1* | 5/2016 | Juster .................... A24F 40/65 392/404 |
| 2016/0157524 A1 | 6/2016 | Bowen et al. |
| 2016/0158782 A1 | 6/2016 | Henry et al. |

(56) References Cited

U.S. PATENT DOCUMENTS

| | | |
|---|---|---|
| 2016/0161459 A1 | 6/2016 | Rouse |
| 2016/0166564 A1 | 6/2016 | Myers et al. |
| 2016/0166786 A1 | 6/2016 | Kinzer |
| 2016/0198767 A1 | 7/2016 | Verleur |
| 2016/0211693 A1 | 7/2016 | Stevens et al. |
| 2016/0219933 A1 | 8/2016 | Henry et al. |
| 2016/0219938 A1 | 8/2016 | Mamoun et al. |
| 2016/0235124 A1 | 8/2016 | Karles et al. |
| 2016/0278435 A1 | 9/2016 | Choukroun et al. |
| 2016/0331026 A1 | 11/2016 | Cameron |
| 2016/0331034 A1 | 11/2016 | Cameron |
| 2016/0331035 A1 | 11/2016 | Cameron |
| 2016/0331036 A1 | 11/2016 | Cameron |
| 2016/0331859 A1 | 11/2016 | Cameron |
| 2016/0331913 A1 | 11/2016 | Bourque |
| 2016/0356751 A1 | 12/2016 | Blackley |
| 2016/0360789 A1 | 12/2016 | Hawes et al. |
| 2016/0363570 A1 | 12/2016 | Blackley |
| 2016/0366946 A1 | 12/2016 | Murison et al. |
| 2017/0014582 A1 | 1/2017 | Skoda |
| 2017/0018000 A1 | 1/2017 | Cameron |
| 2017/0020195 A1 | 1/2017 | Cameron |
| 2017/0028178 A1 | 2/2017 | Skoda |
| 2017/0030882 A1 | 2/2017 | Skoda |
| 2017/0034324 A1 | 2/2017 | Zhang et al. |
| 2017/0042230 A1 | 2/2017 | Cameron |
| 2017/0042231 A1 | 2/2017 | Cameron |
| 2017/0042252 A1 | 2/2017 | Takeuchi et al. |
| 2017/0045994 A1 | 2/2017 | Murison et al. |
| 2017/0046357 A1 | 2/2017 | Cameron |
| 2017/0048691 A1 | 2/2017 | Liu |
| 2017/0135407 A1 | 5/2017 | Cameron |
| 2017/0135408 A1 | 5/2017 | Cameron |
| 2017/0136193 A1 | 5/2017 | Cameron |
| 2017/0150756 A1 | 6/2017 | Freelander et al. |
| 2017/0156397 A1 | 6/2017 | Sur et al. |
| 2017/0156399 A1 | 6/2017 | Freeman et al. |
| 2017/0157341 A1 | 6/2017 | Pandya et al. |
| 2017/0180067 A1 | 6/2017 | Poornachandran et al. |
| 2017/0181223 A1 | 6/2017 | Sur et al. |
| 2017/0181474 A1 | 6/2017 | Cameron |
| 2017/0181475 A1 | 6/2017 | Cameron |
| 2017/0188627 A1 | 7/2017 | Sur |
| 2017/0196270 A1 | 7/2017 | Vick et al. |
| 2017/0208867 A1 | 7/2017 | Li et al. |
| 2017/0215480 A1 | 8/2017 | Qiu |
| 2017/0215485 A1 | 8/2017 | Zitzke et al. |
| 2017/0231273 A1 | 8/2017 | Xiang |
| 2017/0245547 A1 | 8/2017 | Lipowicz |
| 2017/0245550 A1 | 8/2017 | Freelander |
| 2017/0251721 A1 | 9/2017 | Batista et al. |
| 2017/0251722 A1 | 9/2017 | Newcomb et al. |
| 2017/0251723 A1 | 9/2017 | Dayioglu et al. |
| 2017/0258136 A1 | 9/2017 | Hawes et al. |
| 2017/0258138 A1 | 9/2017 | Hawes et al. |
| 2017/0258140 A1 | 9/2017 | Matischek et al. |
| 2017/0262064 A1 | 9/2017 | Ofir et al. |
| 2017/0265524 A1 | 9/2017 | Duque et al. |
| 2017/0266397 A1 | 9/2017 | Mayle et al. |
| 2017/0273357 A1 | 9/2017 | Barbuck |
| 2017/0304563 A1 | 10/2017 | Adelson |
| 2017/0304567 A1 | 10/2017 | Adelson |
| 2017/0318861 A1 | 11/2017 | Thorens |
| 2017/0360097 A1 | 12/2017 | Xiang |
| 2017/0368273 A1 | 12/2017 | Rubin |
| 2018/0020720 A1* | 1/2018 | Matischek .......... H05B 1/0297 131/329 |
| 2018/0043114 A1 | 2/2018 | Bowen et al. |
| 2018/0070641 A1 | 3/2018 | Mazur et al. |
| 2018/0132526 A1 | 5/2018 | Davis et al. |
| 2018/0146711 A1 | 5/2018 | Bessant et al. |
| 2018/0153219 A1 | 6/2018 | Verleur et al. |
| 2018/0153221 A1 | 6/2018 | Verleur et al. |
| 2018/0160733 A1 | 6/2018 | Leadley et al. |
| 2018/0184722 A1 | 7/2018 | Murison et al. |
| 2018/0280637 A1 | 10/2018 | Weigensberg et al. |
| 2018/0325176 A1 | 11/2018 | Burseg |
| 2019/0104762 A1 | 4/2019 | Cameron et al. |
| 2019/0158938 A1 | 5/2019 | Bessant et al. |
| 2019/0166913 A1 | 6/2019 | Bache et al. |
| 2019/0200674 A1 | 7/2019 | Bless et al. |
| 2019/0200677 A1 | 7/2019 | Chong et al. |
| 2019/0272359 A1 | 9/2019 | Popplewell et al. |
| 2019/0307170 A1 | 10/2019 | Zarifian et al. |
| 2019/0380388 A1 | 12/2019 | Amorde et al. |
| 2019/0387796 A1 | 12/2019 | Cohen |
| 2020/0058057 A1 | 2/2020 | Ouyang |
| 2020/0352249 A1 | 11/2020 | Achtien et al. |

FOREIGN PATENT DOCUMENTS

| | | |
|---|---|---|
| CN | 201067079 Y | 6/2008 |
| CN | 104321779 A | 1/2015 |
| CN | 204275207 U | 4/2015 |
| CN | 104797152 A | 7/2015 |
| CN | 204466899 U | 7/2015 |
| CN | 104839892 B | 8/2015 |
| CN | 105050434 A | 11/2015 |
| CN | 105342009 B | 2/2016 |
| CN | 105722417 A | 6/2016 |
| CN | 106164958 A | 11/2016 |
| CN | 106455717 A | 2/2017 |
| CN | 106462862 A | 2/2017 |
| CN | 106573118 A | 4/2017 |
| CN | 106573123 A | 4/2017 |
| CN | 106594797 A | 4/2017 |
| CN | 106686995 A | 5/2017 |
| CN | 106998821 A | 8/2017 |
| CN | 107049996 A | 8/2017 |
| CN | 107205484 A | 9/2017 |
| CN | 107438372 A | 12/2017 |
| CN | 108038161 A | 5/2018 |
| CN | 109310157 A | 2/2019 |
| CN | 109789285 A | 5/2019 |
| CN | 110325060 A | 10/2019 |
| CN | 111213920 A | 6/2020 |
| CN | 212464894 U | 2/2021 |
| EP | 2110034 A1 | 10/2009 |
| EP | 2399636 A1 | 12/2011 |
| EP | 2849589 B1 | 3/2015 |
| EP | 2999367 B1 | 3/2016 |
| EP | 3000245 B1 | 3/2016 |
| EP | 3275324 B1 | 1/2018 |
| EP | 3442361 B1 | 2/2019 |
| EP | 3481473 B1 | 5/2019 |
| EP | 3534733 B1 | 9/2019 |
| EP | 3550996 B1 | 10/2019 |
| EP | 3644974 B1 | 5/2020 |
| EP | 3731667 B1 | 11/2020 |
| EP | 3463535 B1 | 8/2022 |
| GB | 2507103 A | 4/2014 |
| GB | 2527403 A | 12/2015 |
| GR | 20120100199 A | 11/2013 |
| JP | 2949114 B1 | 9/1999 |
| JP | 2006180378 A | 7/2006 |
| JP | 2007172605 A | 7/2007 |
| JP | 2008501406 A | 1/2008 |
| JP | 2008059382 A | 3/2008 |
| JP | 2013524835 A | 6/2013 |
| JP | 2014519850 A | 8/2014 |
| JP | 2016114402 A | 6/2016 |
| JP | 2017513513 A | 6/2017 |
| JP | 2019521739 A | 8/2019 |
| KR | 10-2009-0119127 A | 11/2009 |
| KR | 10-2010-0080114 A | 7/2010 |
| KR | 101523088 B1 | 5/2015 |
| KR | 20150064754 A | 6/2015 |
| KR | 1020210127579 A | 10/2021 |
| RU | 2606942 C2 | 1/2017 |
| TW | 201330884 A | 8/2013 |
| TW | M548451 U | 9/2017 |
| TW | 1763672 B | 5/2022 |
| WO | WO-2011160788 A1 | 12/2011 |
| WO | WO-2014058678 A1 | 4/2014 |

(56) References Cited

FOREIGN PATENT DOCUMENTS

| WO | WO-2014060267 A2 | 4/2014 |
|---|---|---|
| WO | WO-2014068504 A2 | 5/2014 |
| WO | WO-2015031836 A1 | 3/2015 |
| WO | WO-2015038981 A2 | 3/2015 |
| WO | WO-2015063126 A1 | 5/2015 |
| WO | WO-2015138560 A1 | 9/2015 |
| WO | WO-2015161485 A1 | 10/2015 |
| WO | WO-2015161486 A1 | 10/2015 |
| WO | WO-2015165747 A1 | 11/2015 |
| WO | WO-2015167000 A1 | 11/2015 |
| WO | WO-2016008096 A1 | 1/2016 |
| WO | WO-2016009202 A1 | 1/2016 |
| WO | WO-2016058992 A2 | 4/2016 |
| WO | WO-2016065413 A1 | 5/2016 |
| WO | WO-2016115715 A1 | 7/2016 |
| WO | WO-2016123307 A1 | 8/2016 |
| WO | WO-2016172023 A1 | 10/2016 |
| WO | WO-2016187110 A1 | 11/2016 |
| WO | WO-2016187695 A1 | 12/2016 |
| WO | WO-2017054627 A1 | 4/2017 |
| WO | WO-2017055793 A1 | 4/2017 |
| WO | WO-2017055799 A1 | 4/2017 |
| WO | WO-2017055801 A1 | 4/2017 |
| WO | WO-2017056103 A1 | 4/2017 |
| WO | WO-2017205692 A1 | 11/2017 |
| WO | WO-2018087738 A1 | 5/2018 |
| WO | WO-2019104227 A1 | 5/2019 |
| WO | WO-2019173923 A1 | 9/2019 |
| WO | WO-2020006311 A1 | 1/2020 |
| WO | WO-2020023547 A1 | 1/2020 |
| WO | WO-2020084383 A1 | 4/2020 |
| WO | WO-2020097570 A1 | 5/2020 |

OTHER PUBLICATIONS

Behm, et al., (Jan. 1993) Clinical Evaluation of a Citric Acid Inhaler for Smoking Cessation, Drug and Alcohol Dependence, 31(2):131-138.

\* cited by examiner

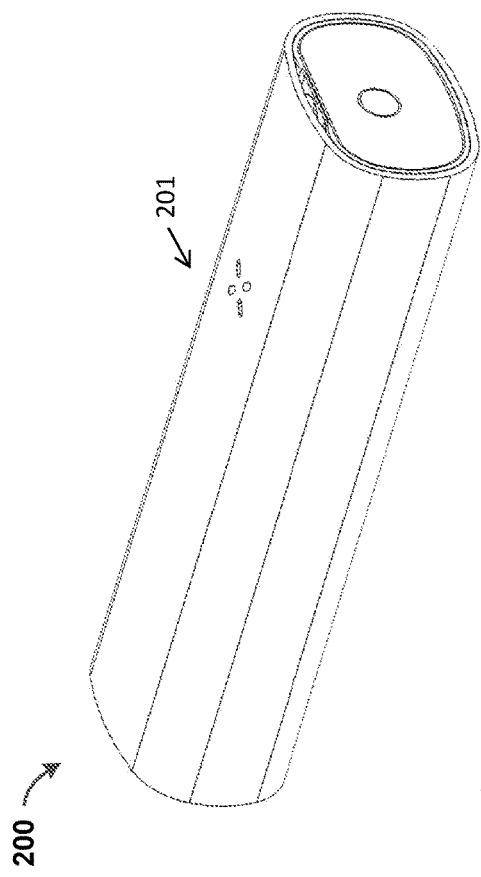
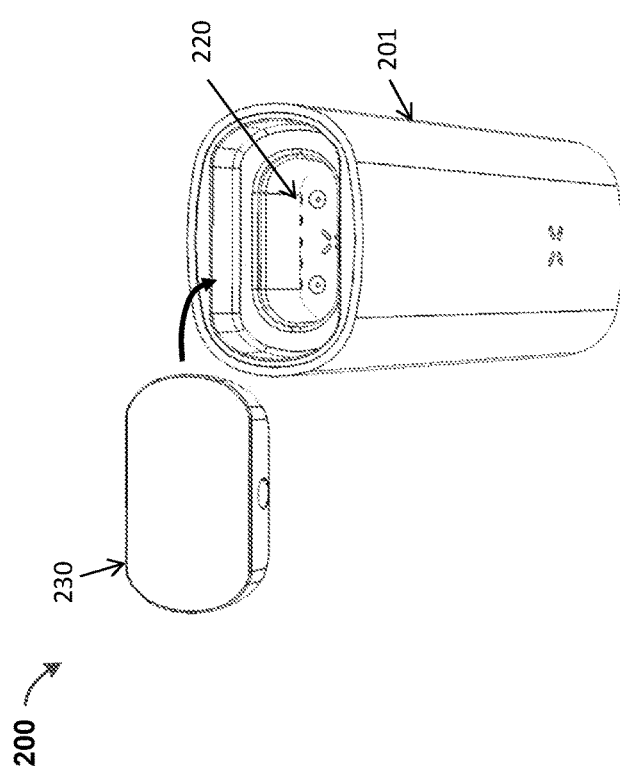

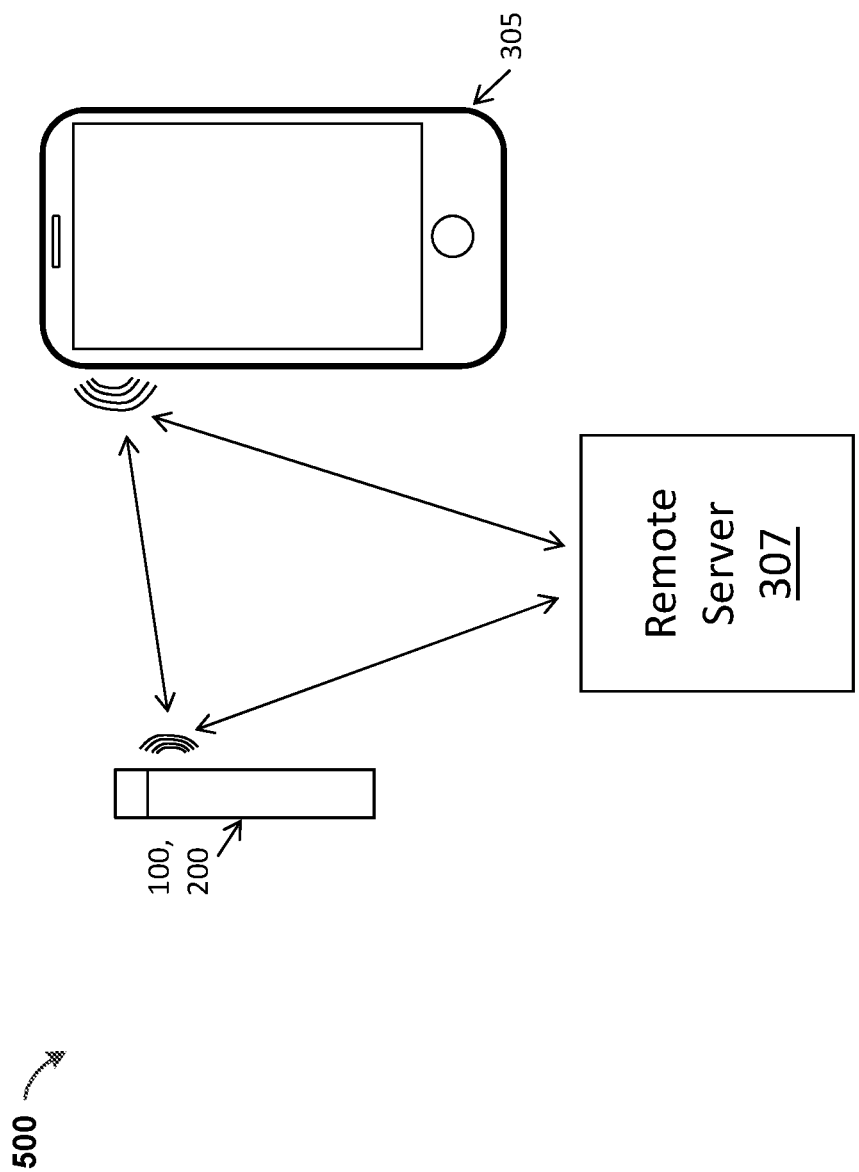

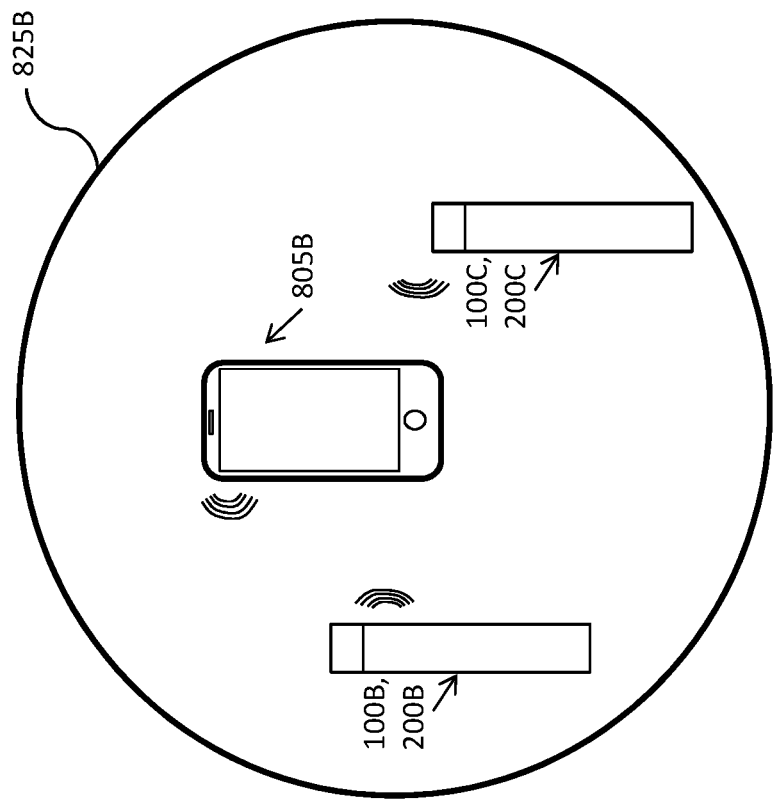
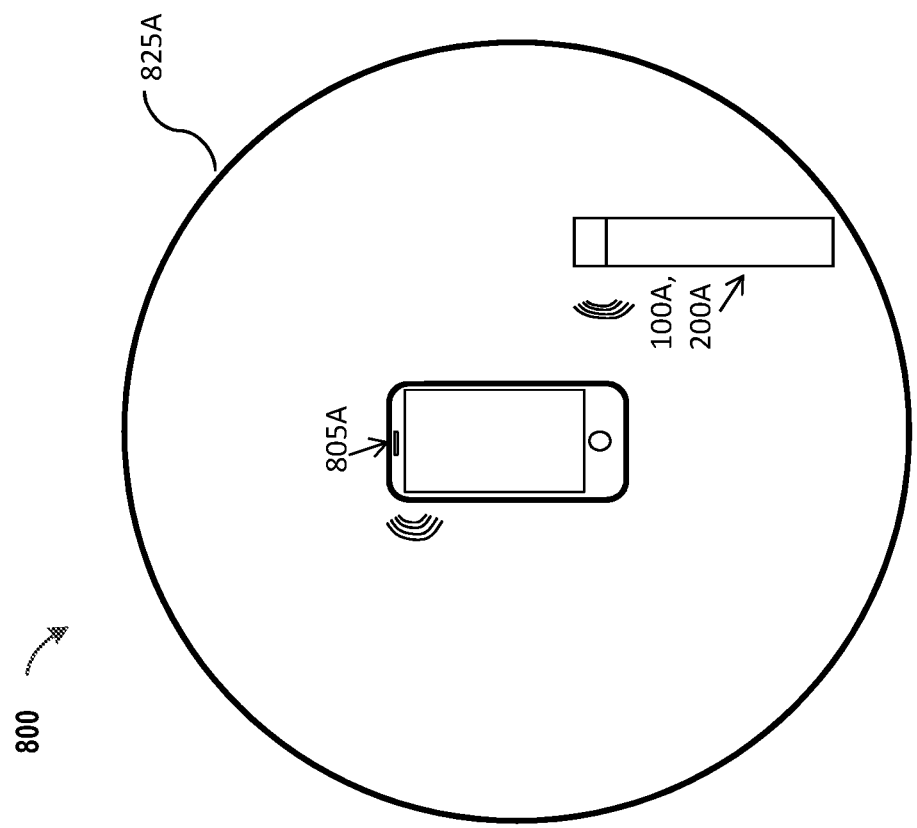
FIG. 8A

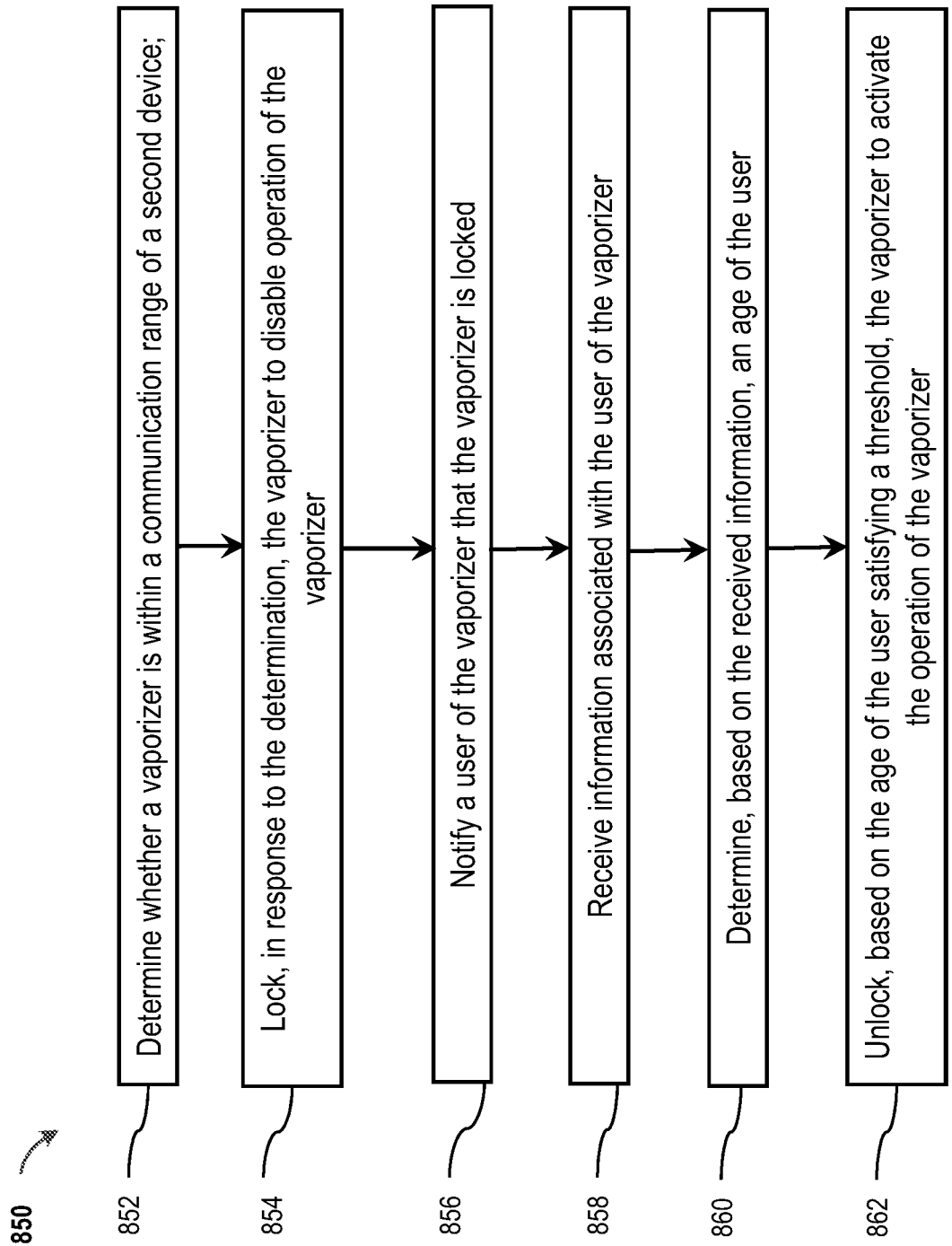

FIG. 14A

REPORT A DEVICE

Thank you for helping us prevent under-age use of our products. We take reports very seriously and a compliance agent will be investigating this device shortly.

DEVICE SERIAL NUMBER vornuvat ⊗

INVALID SERIAL NUMBER.
REPORT A COUNTERFEIT DEVICE.

I'M A

School Administrator

SCHOOL

Kinnelon Highschool

121 Kinnelon Rd

NJ | 07045

SUBMIT NEW REPORT

FIG. 14C

REPORT A DEVICE

Thank you for helping us prevent under-age use of our products. We take reports ver seriously and a compliance agent will be invactigating this deivce shortly.

DEVICE SERIAL NUMBER vornuvat ⊗

I'M A

School Administrator

SCHOOL

Kinnelon Highschool

121 Kinnelon Rd

COUNTERFEIT DEVICE

We believe the the device you've reported is a counterfeit, please mail the device to us so we can investigate this incident throughly. We'll send you a special pre-paid package.

NOTES

Student purchased device on eBay from @VapeJUUL

DATE OF PURCHASE

08/19/2018

PLACE OF PURCHASE ebay

SUBMIT

FIG. 14E

THANK YOU

Thank you for helping us prevent under-age use of our products. We take reports ver seriously and a compliance agent will be following up shortly with retailers in the area.

We'll send you an update to your email once we have some more information. If you'd like to learn more about the actions we take you can head to our Youth Prevention FAQ.

I'M DONE

SUBMIT ANOTHER REPORT

FIG. 14F

VAPORIZER CONTROLS

CROSS REFERENCE TO RELATED APPLICATIONS

This application is a national phase application of international application PCT/US18/67388 filed Dec. 21, 2018 which claims priority to U.S. Provisional Application Nos. 62/609,289, filed Dec. 21, 2017, and entitled "Vaporizer Device Locking," and 62/690,947, filed on Jun. 27, 2018, and entitled "Connected Vaporizer Device Systems," and 62/745,959, filed on Oct. 15, 2018, and entitled "Vaporizer Device Locking," and 62/760,918, filed on Nov. 13, 2018, and entitled "Connected Vaporizer Device Systems," the disclosures of which are incorporated herein by reference in their entirety.

TECHNICAL FIELD

The apparatuses, devices, systems, and methods described herein relate to vaporizing devices, such as electronic vaporizers, and to methods of using, controlling and/or verifying authorized use of, making, etc. of such devices.

BACKGROUND

Vaporizing devices, which can also be referred to as electronic vaporizer devices, e-vaporizer devices, electronic cigarettes or e-cigarettes, or simply "vaporizers," can be used for delivery of vapor containing one or more active ingredients by inhalation of the vapor by a user of the vaporizing device. Electronic vaporizer devices are gaining increasing popularity both for prescriptive medical use, in delivering medicaments, and for consumption of tobacco and other plant-based smokeable materials. Among other technical challenges associated with vaporizing devices, underage or other unauthorized use of such devices can create a wide range of problems. Preventing such use can present numerous challenges.

SUMMARY

Aspects of the current subject matter relate to management of operation (e.g., one or more settings or operation parameters of a vaporizer.

Some aspects relate to computer-implemented methods for operating a vaporizer. Such methods include one or more processor determining whether a vaporizer is within a communication range of a second device and locking or unlocking the vaporizer in response to the vaporizer being within the communication range. The method further includes receiving, by the one or more processors, information associated with a user of the vaporizer. The method further includes determining, by the one or more processors and based on the received information, an age of the user. The method further includes unlocking, by the one or more processors and based on the age of the user satisfying a threshold, the vaporizer to activate the operation of the vaporizer.

In another aspect, a vaporizer is provided. The vaporizer includes at least one processor. The vaporizer further includes at least one memory storing instructions which, when executed by the at least one processor, cause the vaporizer to at least determine whether the vaporizer is within a communication range of a second device. The vaporizer further caused to lock the vaporizer to deactivate operation of the vaporizer in response to the vaporizer being within the communication range. The vaporizer further caused to receive information associated with a user of the vaporizer; determine, based on the received information, an age of the user. The vaporizer further caused to unlock, based on the age of the user satisfying a threshold, the vaporizer to activate the operation of the vaporizer.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to electronic vaporizer devices, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 4A illustrates an example view of the vaporizer of FIG. 3, in accordance with some example implementations;

FIG. 4B illustrates another example view of the vaporizer of FIG. 3, in accordance with some example implementations;

FIG. 5 illustrates a block diagram of communication exchange among a vaporizer, a user device, and a server, in accordance with some example implementations;

FIG. 8A illustrates a diagram of communication exchange among one or more vaporizers and a user device, in accordance with some example implementations;

FIG. 8B illustrates a flowchart of an example method for authenticating a user of a vaporizer, in accordance with some example implementations;

FIGS. 14A-14F illustrate features of exemplary user interfaces for an application that may be used with a vaporizer consistent with implementations of the current subject matter;

When practical, similar reference numbers denote similar structures, features, or elements.

DETAILED DESCRIPTION

Figure 1:
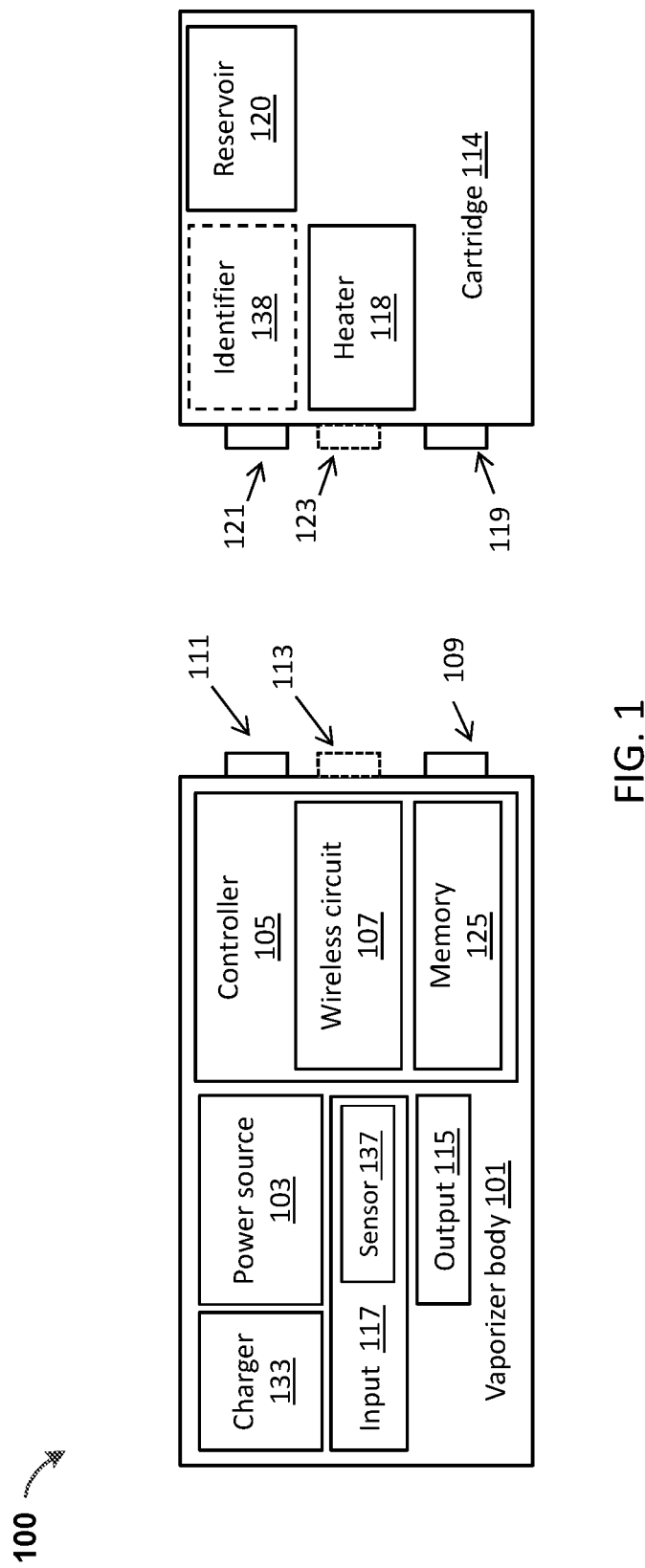
FIG. 1 illustrates a block diagram of a vaporizer, in accordance with some example implementations.

Controlling use of vaporizer devices, including, for example, taking measures to prevent unauthorized use of such devices, is a key consideration from multiple perspectives. Uncontrolled underage use of vaporizer can present public health and regulatory issues. Also, because modern commercially vaporizers tend to be quite small and amenable to being used discretely, use of such products may occur in locations, for example schools, hospitals, other public indoor spaces, etc., where allowing uncontrolled use is either undesirable or potentially in violation of locally applicable ordinances. In other examples, counterfeiting of vaporizer parts, for example consumable parts (such as replaceable cartridges, etc.) that contain the substance to be inhaled, can lead to poor operation of a vaporizer and may also present health issues by circumventing quality control approaches with regard to the purity of the inhalable substance and/or other components of the consumable part that come into contact with inhaled air. It is therefore desirable to implement approaches that permit one or more of control of who is allowed to use a vaporizer, control of where a vaporizer may be used, control of consumables that may be used with a vaporizer, and the like.

The current subject matter includes features that may be advantageously used in addressing one or more of these and/or other needs. For example, implementations of the current subject matter include methods, devices, apparatuses, articles of manufacture, and systems relating to vaporizing and/or aerosolizing one or more materials for inhalation by a user and to approaches relating to creating additional barriers to unauthorized use of such devices and/or consumables usable with such devices.

With regard to preventing underage use, conventional vaporizers may rely on third parties to provide age verification during the purchase of a vaporizer. For example, a retail store employee may perform some form of age verification (e.g., visual inspection of a driver's license) in order to authorize purchase, in a manner that is similar to current approaches to curtailing unauthorized/underage use of other substances and/or delivery systems such as alcoholic beverages, conventional cigarettes, etc. However, as with these other substances, authentication that occurs only at the point of sale may not prevent a purchaser from providing the purchased product (e.g., a vaporizer, cartridges or other consumables usable with a vaporizer, etc.) to an unintended party (e.g., an under-age minor) or prevent use of unintended parties when the vaporizer is lost or stolen. It may be desirable to provide additional security, authentication, or safety measures to help reduce or prevent undesirable uses or users of the vaporizer. Such approaches may include technical features implemented at one or more of multiple stages of the purchase and use cycle for a vaporizer, as described herein.

With regard to controlling use of vaporizers in location controls on the use of vaporizers, inclusion of one or more communication features on a vaporizer may be advantageous, for example in association with one or more features described herein.

Additionally, because many vaporizer devices, cartridges or other consumable parts, and other age-controlled substances may be resold or otherwise transferred to a new user after an age controlled purchase, it may also or alternatively be desirable to implement one or more approaches for correlating geographical clusters of unauthorized use with locations where unauthorized sales may be occurring.

Various implementations of the current subject matter may be used in conjunction with one or more of a variety of vaporizers and/or vaporizer systems. The term "vaporizer" is used generically in the description herein and claims to refer to any of a self-contained apparatus, an apparatus that includes two or more separable parts (e.g., a vaporizer body that includes a battery and/or other hardware, and a cartridge that includes and/or is configured to hold a vaporizable material), and/or the like. A "vaporizer system" as used herein may include one or more components, such as a device in communication (e.g., wirelessly or over a wired connection) with a vaporizer and optionally also the vaporizer itself. A vaporizer or one or more components of a vaporizer system consistent with implementations of the current subject matter may be configured for user control and operation. As used herein, an "aerosol" may refer to vapor (e.g., gas-phase molecules of one or more substances) and/or particles (e.g., condensed droplets, solid particles, or the like) entrained in a volume of air.

Examples of vaporizers consistent with implementations of the current subject matter include electronic vaporizers, electronic cigarettes, e-cigarettes, or the like. In general, such vaporizers are hand-held devices that heat (by convection, conduction, radiation, or some combination thereof) a vaporizable material to provide an inhalable dose of the material. The vaporizable material used with a vaporizer may be provided within a cartridge (e.g., a part of the vaporizer that contains the vaporizable material in a reservoir or other container and that can be refillable when empty or disposable in favor a new cartridge containing additional vaporizable material of a same or different type. A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge having a reservoir or the like for holding the vaporizable material. In various implementations, a vaporizer may be configured for use with liquid vaporizable material (e.g., a carrier solution in which an active and/or inactive ingredient(s) are suspended or held in solution or a liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself such that all of the solid material can eventually be vaporized for inhalation. A liquid vaporizable material can likewise be capable of being completely vaporized or can include some part of the liquid material that remains after all of the material suitable for inhalation has been consumed. In certain examples, the vaporizable material can be or include one or more of a tobacco-based material, a Cannabis-based material, a botanical material, or the like. In certain examples, the vaporizable material is or includes nicotine, a nicotine derivative, a nicotine salt, or the like. Alternatively or additionally, the vaporizable material may be or include one or more of a nutraceutical, a cannabinoid, a medicinal compound, or the like.

Consistent with some implementations of the current subject matter, a vaporizer and/or vaporizer system may be configured to identify a vaporizable material to be vaporized, and to adjust the operation of the vaporizer accordingly. For example, a vaporizer may be adapted to receive a cartridge or other pre-loaded container holding a vaporizable material (e.g., the vaporizable material a solution of nicotine, cannabis, and/or another active ingredient) and to identify and/or determine information about the vaporizable material and/or the cartridge or other pre-loaded container, such as one or more of: a type of vaporizable material, a concentration of vaporizable material in a solution or other non-pure form of a vaporizable material that is contained in a reservoir or other container of the cartridge, an amount (e.g., a mass, volume, etc.) of vaporizable material in a reservoir or other container of the cartridge, a configuration of the cartridge (e.g., what specific components or types of components such as a heater power or configuration, one or more electrical properties, etc. are present in the cartridge), a lot number of the cartridge, a date of manufacture of the cartridge, an expiration date after which the cartridge should not be used, a manufacture or fill date for the cartridge, or the like.

A vaporizer consistent with implementations of the current subject matter may be configured to connect (e.g., wirelessly connect or over a wired connection) to a communication device (or optionally devices) in communication with the vaporizer. Such a device can be a component of a vaporizer system as discussed herein, and can include first communication hardware, which can establish a wireless communication channel with second communication hardware of the vaporizer. For example, a device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. Although the term "device" is used herein, the term "apparatus" is intended and should be construed as such.

A device that is part of a vaporizer system as defined herein can be used for any of one or more functions, such as controlling dosing (e.g., dose monitoring, dose setting, dose limiting, user tracking, etc.), controlling sessioning (e.g., session monitoring, session setting, session limiting, user tracking, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities with other users (e.g., social media communications, interacting with one or more groups, etc.), or the like. The terms "sessioning", "session", "vaporizer session," or "vapor session," are used generically in the following description and claims to refer to a period devoted to the use of the vaporizer. The period can include a time period, number of doses, amount of vaporizable material, and/or the like.

In some implementations of the current subject matter, a vaporizer can include functionality for communicating with a cartridge containing a vaporizable material. The vaporizer may also be in communication with a device that is part of a vaporizer system, although this is not required. The vaporizer, whether under control of or otherwise in communication with a device that is part of a vaporizer system or as a standalone unit separate from a vaporizer system, can be configured such that operation of the vaporizer can be modified, controlled, etc. based on one or more parameters that are received from the cartridge or are accessed from a database or other information source based on the identification of the cartridge.

For example, a vaporizer consistent with implementations of the current subject matter can be configured to recognize a cartridge and recite (and in some cases transmit) or otherwise acquire information about the cartridge. In other words, a computing element such as a controller or the like that is associated with a vaporizer body can obtain information about the cartridge via some form of data exchange. A variety of methods of cartridge recognition by a vaporizer are within the scope of the current subject matter, including those described in more detail below. Any of the approaches described herein may be performed with or without the addition of wireless communication/connectivity also described herein, although such wireless connectivity as described herein may be advantageously applied, as will be described in greater detail below.

Implementations of the current subject matter also include methods of using a vaporizer and/or a vaporizer system for functions such as determining and/or controlling a dose, amount, or the like of one or more chemical species of the vaporizable material or of the vaporizable material itself.

FIG. 1 illustrates a block diagram of a vaporizer 100, in accordance with some example implementations. As illustrated, the vaporizer 100 of in FIG. 1 includes a vaporizer body 101. The vaporizer body 101 may include a housing enclosing a power source 103 (e.g., a device or system that stores electrical energy for on-demand use), which may be a battery, capacitor, a combination thereof, or the like, and which may be rechargeable or non-rechargeable. The housing may also enclose a controller 105, which may include a processor. In the examples shown, a cartridge 114 may be attached on, in, or partially in the vaporizer body 101.

Figure 2A:
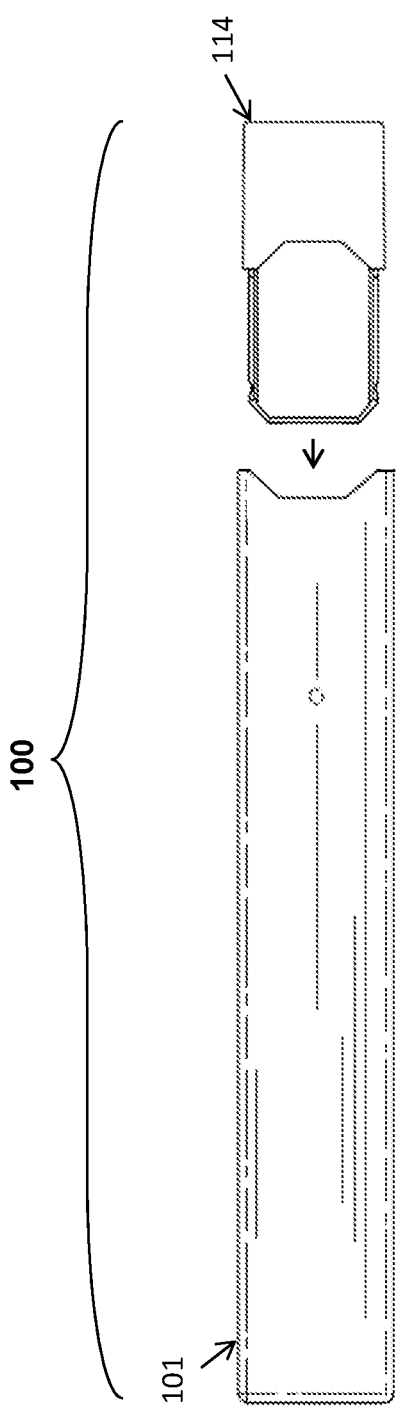
FIG. 2A illustrates an example exploded view of the vaporizer of FIG. 1, in accordance with some example implementations.
Figure 2B:
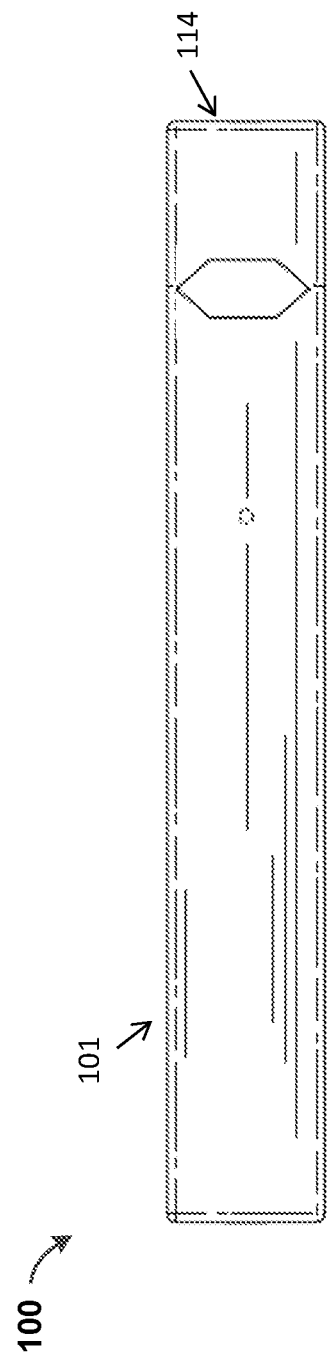
FIG. 2B illustrates another example view of the vaporizer of FIG. 1, in accordance with some example implementations.
Figure 2D:
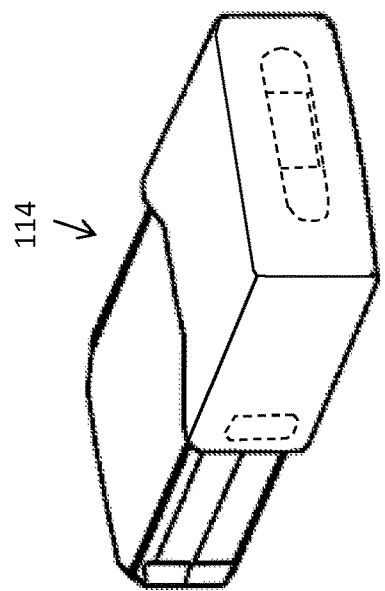
FIG. 2D illustrates an example view of the vaporizer cartridge of FIG. 1, in accordance with some example implementations.
Figure 2C:
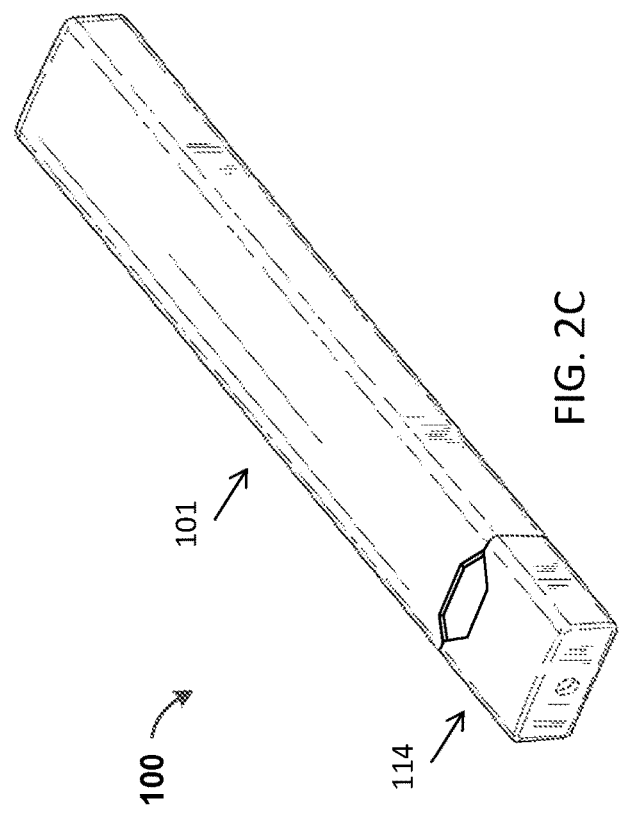
FIG. 2C illustrates another example view of the vaporizer of FIG. 1, in accordance with some example implementations.

FIG. 2A illustrates an example vaporizer 100 which may include features indicated in FIG. 1. As illustrated in FIG. 2A, a vaporizer 100 can include a vaporizer body 101 and a cartridge 114, which is separable from the vaporizer body 101. FIG. 2B and FIG. 2C respectively illustrate front and side plan views of the example vaporizer 100 of FIG. 2A. FIG. 2D illustrates an example view of the cartridge 114 of FIG. 2A separated from the vaporizer body 101. In some implementations, the cartridge 114 can hold and/or be configured to hold a liquid vaporizable material. For example, when a vaporizer includes a cartridge (such as the cartridge 114), the cartridge 114 may include one or more reservoirs 120 of and/or for vaporizable material. Any appropriate vaporizable material may be contained within the reservoir 120 of the cartridge 114, including solutions of nicotine or other organic materials.

While the example vaporizer shown in FIG. 2A-2D involves a cartridge 114 insertable into a vaporizer body 101, other vaporizer configurations are within the scope of the current subject matter. For example, vaporizers with and without cartridges are usable with the current subject matter. For vaporizers that involve use of cartridges, such cartridges can be consumable (e.g., disposable after the volume of provided vaporizable material is used up) or re-usable (e.g., capable of being refilled with vaporizable material).

A processor of the controller 105 may include circuitry to control operation of a heater 118, which can optionally include one or more heating elements for vaporizing a vaporizable material contained within the cartridge 114, for example within a reservoir or container that is part of the cartridge 114. In various implementations, the heater 118 may be present in the vaporizer body 101 or within the cartridge 114 (as shown in FIG. 1), or both. The controller circuitry may include one or more clocks (oscillators), charging circuitry, I/O controllers, memory, etc. Alternatively or in addition, the controller circuitry may include circuitry for one or more wireless communication modes, including Bluetooth, near-field communication (NFC), WiFi, ultrasound, ZigBee, RFID, etc. The vaporizer body 101 may also include a memory 125 that may be part of the controller 105 or otherwise in data communication with the controller. The memory 125 may include volatile (e.g., random access memory) and/or non-volatile (e.g., read-only memory, flash memory, solid state storage, a hard drive, other magnetic storage, etc.) memory or data storage.

Further with reference to FIG. 1, a vaporizer 100 may include a charger 133 (and charging circuitry which may be controlled by the controller 105), optionally including an inductive charger and/or a plug-in charger. For example, a universal serial bus (USB) connection may be used to charge the vaporizer 100 and/or to allow communication over a wired connection between a computing device and the controller 105. The charger 133 may charge the onboard power source 103. A vaporizer 100 consistent with implementations of the current subject matter may also include one or more inputs 117, such as buttons, dials, or the like, and/or sensors 137, including accelerometers or other motion sensors, capacitive sensors, flow sensors, or the like. These sensors 137 may be used by the vaporizer 100 to detect user handling and interaction. For example, detection of a rapid movement (such as a shaking motion) of the vaporizer 100 may be interpreted by the controller 105 (e.g., through receipt of a signal from one or more of the sensors 137) as a user command to begin communication with a user device that is part of a vaporizer system and that can be used for controlling one or more operations and/or parameters of the vaporizer 100 as described in more detail below. Additionally or alternatively, detection of a rapid movement (such as a shaking motion) of the vaporizer 100 may be interpreted by the controller 105 (e.g., through receipt of a signal from one or more of the sensors 137) as a user command to cycle through a plurality of temperature settings to which the vaporizable material held within the cartridge 114 is to be heated by action of the heater 118. In some optional variations, detection of removal of the cartridge 114 by the controller 105 (e.g., through receipt of a signal from one or more of the sensors 137) during a cycling-through of the plurality of temperature settings may act to establish the temperature (e.g., when the cycle is at a desired temperature, a user may remove the cartridge 114 to set the desired temperature). The cartridge 114 may then be re-engaged with the vaporizer body 101 by the user to allow use of the vaporizer 100 with the heater controlled by the controller 105 consistent with the selected temperature setting. The plurality of temperature settings may be indicated through one or more indicators on the vaporizer body 101.

A vaporizer consistent with implementations of the current subject matter may also include one or more outputs 115. Outputs 115 as used herein can refer to any of optical (e.g., LEDs, displays, etc.), tactile (e.g., vibrational, etc.), or sonic (e.g., piezoelectric, etc.) feedback components, or the like, or some combination thereof.

A vaporizer 100 consistent with implementations of the current subject that includes a cartridge 114 may include one or more electrical contacts (such as the electrical contacts 109, 111, 113 shown in FIG. 1) on or within the vaporizer body 101 that may engage complementary contacts 119, 121, 123 (e.g., pins or receptacles) on the cartridge 114 when the cartridge is engaged with the vaporizer body 101. The contacts on the vaporizer body are generally referred to as "vaporizer body contacts" and those on the cartridge are generally referred to as "cartridge contacts." These contacts may be used to provide energy from the power source 103 to the heater 118 in implementations of the current subject matter in which the heater 118 is included in the cartridge 114. For example, when the cartridge contacts and the vaporizer body contacts are respectively engaged by coupling of the cartridge 114 with the vaporizer body 101, an electrical power circuit can be formed allowing control of power flow from the power source 103 in the vaporizer body 101 to the heater 118 in the cartridge 114. A controller 105 in the vaporizer body 101 can regulate this power flow to control a temperature at which the heater 118 heats a vaporizable material contained in the cartridge 114.

Any appropriate electrical contact may be used, including pins (e.g., pogo pins), plates, and the like. In addition, as described below, in some implementations of the current subject matter, one-way or two-way communication is provided between the vaporizer body 101 and the cartridge 114 through one or more electrical contacts, which may include the electrical contacts used to provide energy from the power source 103 to the heater 118. The cartridge 114 and the vaporizer body 101 may be removably coupled together, e.g., by engaging a portion of a housing of the cartridge 114 with the vaporizer body 101 and/or the vaporizer housing in a mechanical connection (e.g., a snap and/or friction fit) or the like. Alternatively or additionally, the cartridge 114 and the vaporizer body 101 may be coupled magnetically or via some other coupling or engaging mechanism. Said another way, cartridge to vaporizer coupling can be achieved by any of multiple possible approaches, including but not limited to magnetic coupling, friction fit coupling, threaded coupling, snap-in or snap-fit coupling, or the like.

Any of the cartridges described herein may include one or more identifiers 138. The identifier 138 may be recognized, detected, and/or read by the vaporizer body 101, and may convey information about the vaporizable material contained within the cartridge and/or about the cartridge 114 itself. The identifier 138 may include a readable and/or readable/writable cartridge memory. The identifier 138 may include circuitry for receiving and/or transmitting information between the cartridge 114 and the vaporizer body 101. For example, a data exchange circuit may include the cartridge memory, which stores information (e.g., data characterizing one or more parameters of the cartridge), and additional circuitry that forms a data exchange circuit in cooperation with other circuitry on a vaporizer body 101 when the cartridge 114 is coupled to the vaporizer body 101.

In some implementations of the current subject matter, the identifier 138 is passive and may include codes or markings (e.g., bar codes, quick response (QR) codes, etc.). In some examples, the identifier 138 may be structural (e.g., one or more pins, projections, etc.) on the cartridge 114 that may be detected by the vaporizer body 101. Visual or mechanical identifiers may be identified directly by the vaporizer body 101 using an imaging device (e.g., camera, etc.) or reading device (e.g., optical reading) integrated into the vaporizer body (not shown in FIG. 1), or via communication through a separate device, such as a smartphone. For example, a user may take an image of the identifier 138 (e.g., code, marking, etc.) and transmit the code or information derived from the code (such as the information about the vaporizable material and/or the cartridge) to the vaporizer body 101 via wireless circuitry 107, or optionally over a wired connection. A wireless connection (e.g., a wireless communication channel) can be established between first communication hardware of the device and second communication hardware of the vaporizer. The first and second communication hardware can respectively include transceivers for use with one or more wireless communication protocols, non-limiting examples of which are described herein.

Figure 3:
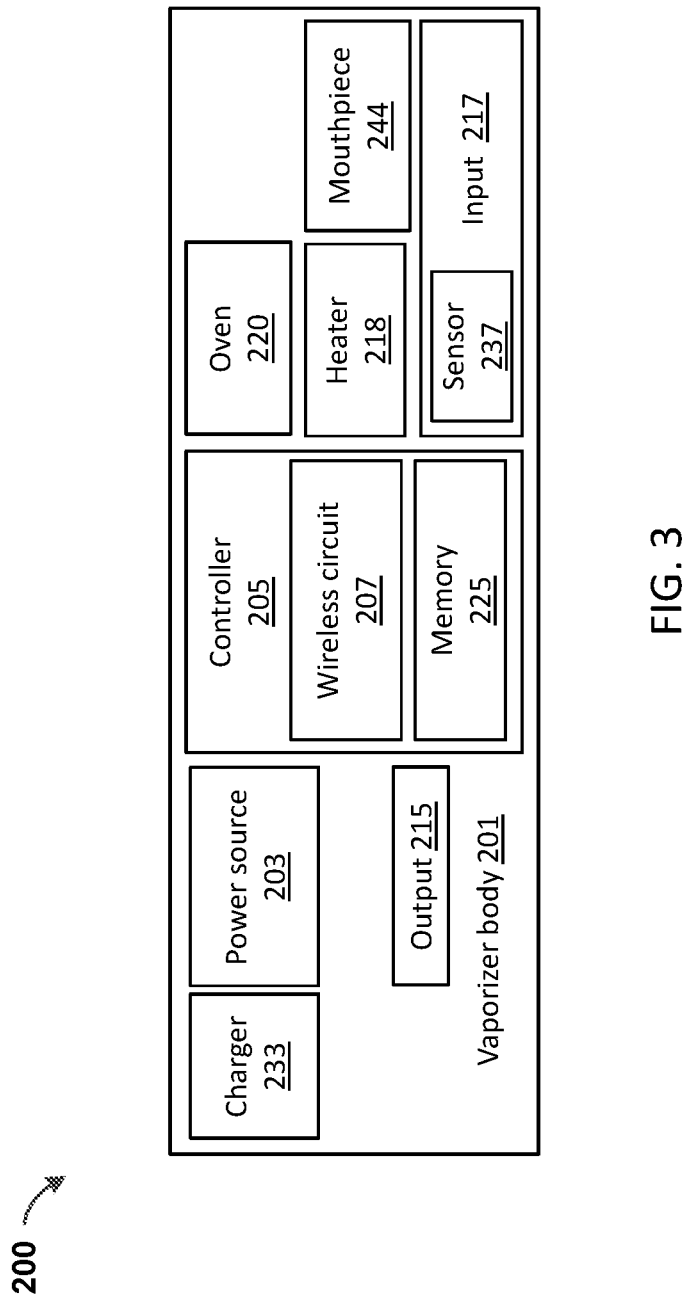
FIG. 3 illustrates a bock diagram of another vaporizer, in accordance with some example implementations.

FIG. 3 shows a schematic diagram of a vaporizer 200 that does not use a cartridge (but may still optionally accept a cartridge), but may instead use a loose-leaf material. The vaporizer 200 in FIG. 3 may include loose vaporizable material that may be placed in an oven 220 (e.g., vaporization chamber). Many of the same elements present in the vaporizer 100 using cartridge 114 shown in FIG. 1 and FIGS. 2A-D may also be included as part of a vaporizer 200 that does not use cartridges. For example, a cartridge-free vaporizer 200 may include a vaporizer body 201 with control circuitry 205 which may include power control circuitry, and/or wireless circuitry 207, and/or memory 225. A power source 203 (e.g., battery, capacitor, etc.) may be charged by a charger 233 (and may include charging control circuitry, not shown). The vaporizer 200 may also include one or more outputs 215 and one or more inputs 217 with sensors 237. In addition, the vaporizer 200 may include one or more heaters 218 that heat an oven 220 or other heating chamber. The heater 218 may be controlled using the resistance of the heater 218 to determine the temperature of the heater, e.g., by using the temperature coefficient of resistivity for the heater. A mouthpiece 244 may also be included.

FIG. 4A shows a side perspective of an exemplary vaporizer 200 with a vaporizer body 201. In the bottom perspective view of FIG. 4B, a lid 230 is shown removed from the vaporizer body 201, exposing the oven/vaporization chamber 220.

FIG. 5 shows a schematic representation of communication among a vaporizer 100, 200, a digital device 305 that wirelessly communicates with the vaporizer 100, 200 and a remote server 307 that may communicate directly with the vaporizer 100, 200, or through the digital device 305. The digital device 305 may be a hand-held mobile device such as a smartphone, smartwatch, tablet, etc., or a desktop or laptop computing device. As noted herein, the digital device 305 may optionally be a dedicated remote control device.

In general, as illustrated schematically in FIG. 5, a vaporizer 100, 200 may remotely communicate with a remote server 307 and/or a digital device 305 such as a wearable electronics device (e.g., Google Glass, smartwatch, smartwear, etc.) and/or a smartphone, smartwatch, etc. Thus, a vaporizer may include a communications interface (wireless circuitry 107, 207) that may be implemented through a communication chip (e.g., second communication hardware) in or on the vaporizer. Exemplary wireless chips may include, but are not limited to, a Bluetooth chip, such as Parani BCD 210 or Texas Instruments (TI) CC2650 Bluetooth Single-Chip Solution, an NFC-enabled chip (such as Qualcomm's QCA1990), that allows for NFC communication, or enhanced Wi-Fi or Bluetooth communication where NFC is used for link setup. As described and explained in relation to examples herein, one or more of these wireless circuits may be used for communication with or between the cartridge 114 in implementations that are configured for reading a cartridge 114 as schematically shown in FIG. 1. For example, NFC may be used to read an identifier 138 (as RFID tag) on the cartridge 114.

A wireless communication chip may include a Wi-Fi-enabled chip, such as TI's SimpleLink family's CC3000, that can connect the vaporizer to Wi-Fi networks. In some implementations, the wireless circuit comprises a subscriber identity module (SIM) card on board of the vaporizer, a Nano-SIM card, or the like (e.g., allowing 3G/4G cellular network communication). Alternative forms of communication may be used to establish two-way communication between a vaporizer 100, 200 and a user device 305.

Connection between the vaporizer 100, 200 and the user device 305 may be automatic (e.g., after an initial set-up) or alternatively may be initiated by the user through various settings, by user interaction with the vaporizer itself (e.g., by shaking the vaporizer, tapping the vaporizer, pressing one or more buttons on the vaporizer, etc.).

Vaporizers, vaporizer systems, and methods of using them for user-customization of vaporizer settings and active substance (e.g., nicotine, other drugs, etc.) usage based on activity patterns are also within the scope of the current subject matter. A vaporizer and/or vaporizer system consistent with the current description may allow a user to personalize a vaporizer among other possible communication-related features.

A vaporizer and/or vaporizer system consistent with implementations of the current subject matter may be configured to facilitate communicative interaction through the vaporizer. For example, a vaporizer may be configured to share usage information with others, such as third parties (e.g., health care providers, including doctors, counselors specializing in use reduction, etc.) for better prescription and administration of medical treatment. A vaporizer and/or vaporizer system may also be configured to communicate with non-medical third parties (e.g., friends, colleagues, etc.), and with unknown third parties (making some or all information publically available). In some implementations, the vaporizers described herein, either by themselves or in communication with one or more communications devices that are part of a vaporizer system, may identify and provide information about the operation, status, or user input from the vaporizer to a public or private network. In some implementations of the current subject matter, a vaporizer and/or vaporizer system may be configured to provide one or more interactive user interfaces for use by the user and/or multiple users of different (or the same) vaporizers. Interaction via the user interface(s) may be tied to the operation of the vaporizer and/or a user's manipulation of the vaporizer (e.g., based on accelerometer output, touch or lip sensing, draw detection, etc.).

A vaporizer and/or vaporizer system consistent with implementations of the current subject matter may also be configured to provide location information, possibly including one or more of information about user location in proximity to one or more of: other users (known or unknown users, specified or unspecified users, etc.), retailers, specific locations (lounges, clubs, vaporizer-friendly locations), etc. A vaporizer and/or vaporizer system may also be configured to facilitate the placing of orders based on use or operation of the vaporizer and/or vaporizer system.

A vaporizer may include a GPS capability or may access GPS information from another device (e.g. a user device 305) in communication with the vaporizer as part of a vaporizer system.

In certain implementations of the current subject matter, a vaporizer that includes a cartridge may be configured to recognize and/or identify the cartridge, optionally including but not limited to features about the cartridge and/or its contents. One or more recognition/identification approaches may be employed to allow the vaporizer (e.g., a controller, microprocessor, etc. that is part of a vaporizer body) to determine information about the cartridge and/or the vaporizable material held in the cartridge, such as one or more of: the type of vaporizable material (e.g., nicotine, cannabis derived material, flavors, whether the vaporizable material is neat, in solution, a solid or a liquid, a loose leaf or otherwise plant matter-containing material, etc.), a concentration of vaporizable material (e.g., in a carrier solution containing one or more of propylene glycol, vegetable glycerin, or other solvents, etc.), an amount or volume of vaporizable material, the configuration of the cartridge (e.g., heater properties, electrical properties, etc.), a lot number of the cartridge, a date of manufacture of the cartridge, an expiration date for the cartridge, information for verifying a source and/or authenticity of the cartridge, etc.

This information may be directly encoded on the cartridge, or a reference indicator may be provided that the vaporizer (or a processor in communication with the vaporizer) may use as an index to look up some or all of this information, or a combination of reference number and directly encoded material may be provided.

In some implementations of the current subject matter, the cartridge may be recognized and/or identified by the engagement between the cartridge and the vaporizer. In some implementations of the current subject matter, the cartridge may be configured to include a keyed interaction with the vaporizer. For example, the shape or size of some part of a cartridge may be detected by the vaporizer (such that different variants in size, shape, etc. may be indicative of certain features of the cartridge and/or its contents). Alternatively or in addition, the cartridge may include n pins or protrusions that may be detected when the cartridge is inserted into or otherwise connected to a vaporizer body (e.g., by completing an electrical connection). For n pins, there are $2^n$ possible combinations of markings, each of which can be indicative of a feature or combination of features of the cartridge and/or its contents.

In further optional variations, a cartridge may be configured or identified based on an electrical property that the vaporizer can detect based on an electrical connection with the cartridge. For example, an electrical circuit may be completed by combination of the cartridges and the vaporizer body through joining of two or more pairs of electrical contacts (e.g., on part of each pair on the cartridge and a corresponding contact on the vaporizer body) such that a heater or other component of the cartridge is part of the completed circuit. One or more parameters of the heater or other cartridge component, such as for example a characteristic resistance, inductance, time response, or the like (e.g., time constant, RC time constant, LC circuit resonance, etc.), may be detected after the circuit is completed. These one or more parameters may be indicative of a feature or combination of features of the cartridge and/or its contents.

In some implementations of the current subject matter, the cartridge may be recognized and/or identified by markings on the cartridge identified by the vaporizer. These markings may be visible or not visible to a user. For example, the cartridge may be marked with a characteristic UV, IR, or other wavelength-specific ink that can be detected by the vaporizer, which may include, e.g., an emitter/detector pair specific to the marker(s). For example, markings may include an infrared-scannable barcode located on the cartridge. In some implementations, the markings may be a pattern, such as a QR code, bar code, etc., that indicate information about the cartridge and/or the contents (vaporizable material) of the cartridge. The markings may be symbolic, including alphanumeric. The markings may be 'read' or detected directly by the vaporizer, which may include a camera or other optical detector, or it may be indirectly detected via communication with a second device (e.g., wearable, smartphone, etc.) having a camera or the like. For example, markings on the cartridge may be detected the user device 305 (e.g., via a camera or other sensor that is part of or otherwise controllable to provide input to the user device 305). For example, a smartphone acting as the user device 305 may identify a marking captured as an image via the smartphone camera using an application (e.g., software) on the smartphone to look up one or more properties from a look-up table, or it may directly communicate the marking to the vaporizer that may look up the properties, and/or it may communicate with a remote server that may look up the properties and communicate them to the vaporizer directly or through the smartphone.

In some implementations of the current subject matter, the cartridge may be recognized by RFID (Radio-Frequency identification) technology. RFID markers have been used in a wide array of applications for inventory control. Some RFID technologies use active devices which contain their own power source and others use passive RFID devices that interact with another powered device that causes the transfer of data without reliance on power at the passive device. For example, a cartridge may include one or more RFID chips or components that can be detected and read by a reader on the vaporizer to identify and receive information about the cartridge.

In some implementations of the current subject matter, the cartridge may be recognized and/or identified by communicating with a memory (e.g., EEPROM) on the cartridge through an electrical connection with the vaporizer. In implementations in which the heater is present on the cartridge, such as the exemplary vaporizer shown in FIG. 1, it may be advantageous to use one or more of the electrical connections on the cartridge (e.g., contacts 119, 121, 123) that are also used to power and/or control the heater to communicate with the memory. This may be particularly challenging where the cartridge may engage with the vaporizer in more than one orientation, and/or where the heater is controlled through this same contact, and modulation of the applied/received electrical signals between the cartridge and the vaporizer may modify the control and/or temperature determination of the heater. One or more additional electrical contacts may be used in addition to those controlling the heater. In general, communication between the cartridge and the vaporizer may be one way (e.g., reading information about the cartridge and/or the vaporizable material from the cartridge by the vaporizer) or it may be two-way (e.g., reading information about the cartridge and/or the vaporizable material and writing information about the operation of the device, e.g., number of uses, duration of use, temperature settings, etc.). Information may be written to the cartridge, and this information may be used to derive other information about the cartridge, including the amount of material left in the cartridge, etc.

In general, any of the vaporizers described herein may estimate, measure and/or predict the amount of vapor and/or material (including active ingredients) in the vapor that can be delivered to a user. For example, as described in detail below, the apparatuses described herein may be used to determine and/or control dosing of the vaporizable material. For example, the current subject matter includes vaporizers and methods of using such vaporizers for accurate and controlled dose delivery of an active ingredient in a vaporizable material (e.g., nicotine, cannabis, and any other active ingredient/drug) based on user specified, medical, switching or cessation needs. Dose control may include display of dosing information per use, per session (e.g., multiple uses within a predetermined time period, such as 1-15 minutes, 1-30 min, within 1-60 min, 1-90 min, 1-120 min, etc.), per day, or other predetermined and/or user-defined time period. Dose control may also include monitoring dosing (e.g., amount of one or more active ingredient delivered by the apparatus). Dosing control may also or alternatively include controlling the operation of the vaporizer based on the amount of one or more active ingredient delivered by the apparatus over time, including alerting a user when a predetermined (user defined, factory-set, or third-party set) amount or threshold is approached (e.g., within 50%, 75%, 80%, 85%, 90%, 95%, 98%, 99%, etc. of the predetermined amount) or exceeded, and/or stopping (locking, disabling, etc.) operation of the apparatus when the predetermined threshold is met or exceeded. Apparatuses that include dosing (dose) control may include internal logic (circuitry and/or programming, including application-specific integrated circuit (ASIC) logic) for controlling dosing and/or may communicate with an external processor (via a wireless communication link) that performs all or some of the dose control.

Information about the cartridge and/or a vaporizable material held in the cartridge, optionally including one or more of the types of information described above, may be particularly helpful in quantifying a dose of the vaporizable material delivered to a user. In some implementations of the current subject matter, dose and/or use information may be stored (written) on the cartridge (e.g., in a memory)—for example, based on a calculation of an amount of vaporizable material delivered, data may be written to the cartridge and/or data may be stored at a server and associated with a specific cartridge such that re-connection of the cartridge with a same or a different vaporizer body results in the vaporizer body being capable of ascertaining how much of the vaporizable material has previously been dispensed from the cartridge.

Additional techniques via which a vaporizer may implement cartridge recognition and/or communication include the use of a marker (e.g., QR code, IR or US marker, etc.), mechanical and/or electronic keying, or the like. In general, and as noted elsewhere herein, electronic communications between a cartridge and vaporizer may be include one-way or in some implementations two-way (including duplex or multiplex) transmission of information so that information may be received by the vaporizer from the cartridge and optionally information may be written to the cartridge by the vaporizer. Information provided to the vaporizer may include information about the vaporizable material and/or the cartridge, such as those discussed elsewhere herein.

A cartridge including an identification circuit (also referred to herein as a cartridge identification circuit) may be configured to communicate and transfer such information from the cartridge to the vaporizer. The cartridge identification circuit may include a memory (e.g., an EEPROM). In cartridge variations in which the heater (e.g., a resistive heating element such as a resistive coil or wire) is controlled by the application of energy onto one or more (e.g., 2, 3, 4, etc.) heater electrical contacts that communicate with corresponding contacts on the vaporizer, the cartridge identification circuit may communicate with the vaporizer through the same heater electrical contacts, despite the increased complexity and potential for disruption of the heater.

The cartridge identification circuit may also be configured so that the cartridge may be inserted into the vaporizer in multiple orientations without disrupting the cartridge identification circuit operation.

The same cartridge identity circuit may also be written with information about the cartridge, vaporizable material, and history of the cartridge, including, for example: the usage time and/or total energy applied, etc.

Information stored on the memory (read and/or written) may be encoded, including the use of encryption, error-correction encoding (e.g., hamming code, etc.), or the like. In operation, when the cartridge is first inserted into the vaporizer body, the vaporizer microcontroller may be configured to first determine if a signal can be read off of the cartridge encoding information about the cartridge and/or identifying the cartridge as compatible with the vaporizer. Information may be read using the measurement circuit of the vaporizer. In some implementations, even when a cartridge may not be read (e.g., may not include a cartridge identity circuit or is unable to read from the cartridge identity circuit) the vaporizer may use a default setting.

During operation, the vaporizer may periodically (e.g., after each puff, etc.) write to the memory in the cartridge identity circuit, if detected. The vaporizer may signal to the memory to request a read from the memory similar to how the device writes to memory, and may then disconnect the battery voltage applied to the heater contacts to allow the memory (e.g., EEPROM) to take control of the I/O line and use it to output data, providing a digital output (switching the I/O line low/high) transmitting an output that the vaporizer detects through the resistance measurement circuit. Typically, if the memory is transmitting, it may affect the absolute accuracy of the temperature control; the vaporizer may be configured so that the device does not heat when the memory is transmitting (outputting) and normal heating operation may not trigger the memory into transmitting data.

As will be described in greater detail below, the information stored in the memory of a cartridge identity circuit such as those described herein may be useful for dose control (e.g., calculating and storing dosing information), as well as for security, communications and storage of operational parameters, particularly in devices including a wireless capability. However, cartridge identification may be useful even in the absence of wireless communication capabilities.

As discussed, the memory (e.g., an EEPROM) may store information about the vaporizable material and/or the cartridge. One example of the information that may be stored may include values related to the specific properties of the heating element, such as the nominal heater R (resistance) for the cartridge, including the heating element of the cartridge. This value may be determined and stored at the factory, at the time the device is manufactured/produced, and/or it may be done later. Storing a specific R value for each cartridge in the memory affiliated with that cartridge may be useful for the accurate temperature control for the device, including determining baseline resistance at ambient temperature, as described herein. Although resistance/baseline measurement on the manufacturing line may be slightly different from the measurement the device gets for use, a baseline adjustment (determined by algorithm) may also be used. Alternatively or additionally, once a reliable baseline for a cartridge has been determined, this baseline may be related (e.g., in a remote database, on a remote server, etc.) to an ID affiliated with the specific cartridge, so that if the cartridge is removed and reinserted, the same baseline value can also be used (as soon as the cartridge ID is confirmed) which could be a faster check than waiting for stable baseline to be detected.

In general, storing a cartridge characteristic such as the resistance of the heater in the cartridge itself may be also useful for confirming that the connection between the vaporizer and the cartridge is good, and that the vaporizer's resistance measurement circuit is working normally. Thus, in any of the methods and apparatuses described herein, a nominal cartridge resistance may be stored in the cartridge's memory (or may be stored on a remote server/device and retrieved based on a unique cartridge ID) and may be used to confirm that the connection between the device and pod is good, and/or that the device's resistance measurement circuit is working normally, and/or that the cartridge's resistance has not changed since the cartridge was assembled or filled.

As mentioned herein, in some implementations, the vaporizer may write usage information to the cartridge's memory; usage information can be used to estimate the amount of vaporizable material that has been removed from the cartridge and the amount of vaporizable material remaining. Usage information may include number of puffs/draws, the dosage delivered, or the like.

A vaporizer and/or vaporizer system may include software, firmware or hardware that is separate or separable from the vaporizer and that wirelessly communicates with the vaporizer. For example, applications ("apps") may be executed on a processor of a portable and/or wearable user device, including smartphones, tablets, smartwatches, personal data assistants, and the like, which are referred to generally herein as user devices (e.g., user device 305 in FIG. 3) that is part of a vaporizer system. A user device may provide an interface for the user to engage and interact with functions related to the vaporizer, including communication of data to and from the vaporizer to the user device or the like and/or additional third party processor (e.g., servers such as the remote server 307 in FIG. 3). For example, a user may control some aspects of the vaporizer (temperature, dosage, etc.) and/or data transmission and data receiving to and from a vaporizer, optionally over a wireless communication channel between first communication hardware of the device and second communication hardware of the vaporizer. Data may be communicated in response to one or more actions of the user (e.g., including interactions with a user interface displayed on the device), and/or as a background operation such that the user does not have to initiate or authorize the data communication process.

User interfaces may be deployed on a user device and may aid the user in operating the vaporizer. For example, the user interface operating on a user device may include icons and text elements that may inform the user of various ways that vaporizer settings can be adjusted or configured by the user. In this manner (or in others consistent with the current subject matter) information about a vaporizer can be presented using a user interface displayed by the user device. Icons and/or text elements may be provided to allow a user to see information about vaporizer status, such as battery information (charge remaining, vapor draws remaining, time to charge, charging, etc.), cartridge status (e.g., type of cartridge and vaporizable material, fill status of cartridge, etc.), and similar device status. Icons and/or text elements may be provided to allow a user to update internal software (a.k.a., firmware) in the vaporizer. Icons and text elements may be provided to allow a user to set security and/or authorization features of a vaporizer, such as setting a PIN code to activate the vaporizer or the use of personal biometric information as a means of authentication. Icons and text elements may be provided to allow a user to configure foreground data sharing and related settings.

A vaporizer may include or incorporate one or more authentication features. For example, the user interface ("app") may include, for example, PIN-based authentication, biometric authentication (which can include fingerprint based authentication, iris scan based authentication, facial recognition based authentication, and/or the like). Authorization may include age-analysis, such as an estimation or calculation of user age based on analysis of facial features. Authorization may be used to lock/unlock the vaporizer.

The authentication process can be embodied as a feature of an application that is installed and running on a user device capable of communicating data through the use of wired or wireless methods (e.g., as part of a vaporizer system as described herein). As noted above, the user device may have an operating system capable of running application(s). Alternatively, the vaporizer may itself include one or more user interface features (e.g., for entry of a pin code or some other user entry-based authentication approach, etc.) and/or sensors for implementing fingerprint or iris scanning, facial recognition, etc.

In some implementations of the current subject matter, a vaporizer may be connected to (e.g., in communication with) an additional (e.g., portable, wearable, smartphone, desktop, laptop, etc.) device, which may enable user programmable dose control, real-time usage monitoring, personalized use settings, device lockout and social features. For example, a vaporizer and/or vaporizer system may include features relating to security controls, including parental control, user age control/restriction and anti-theft control. A vaporizer and/or vaporizer system may include anti-theft and/or authentication functions that may lock or otherwise restrict use/operation of the device when the vaporizer is stolen, misplaced, etc. and/or when used with counterfeit parts, and may also be configured to allow locking (e.g., parental-lock) for child-proofing, or otherwise preventing unauthorized third party operation.

In one example, an anti-counterfeiting or other lock-out feature of this type may be implemented using cartridge identifiers to prevent use of counterfeit consumables such as replaceable cartridges containing a vaporizable material. For example, cartridge identifiers from a verified source or supplier can include a hash or some other verification code as part of the identifier, and the vaporizer may lock out use of the vaporizer if a cartridge lacking the necessary hash or verification code is coupled to a vaporizer body. Such a feature can be used to require that a user identity verification is entered at the device in communication with the vaporizer to cause the device to unlock use of the vaporizer. In one example, a cartridge may include an identifier that indicates that it contains a controlled substance and a user may be required by the application on the device (in response to determining this about the cartridge via identifier information received from the cartridge) to verify his or her identity (e.g., via a password entry, a biometric identity verification, etc.) and for the application to verify that the identified user is authorized for use of the controlled substance prior to being able to use the vaporizer with that cartridge coupled to the vaporizer body. In another example, a nicotine or cannabis-containing cartridge may require user identity verification such that the application on the device only allows use of the vaporizer is when a user identity is verified and the user has been registered as being above the minimum age.

In some examples, a security control may be incorporated via an application executing on a device in communication with a vaporizer. For example, an application executing on a device in communication with a vaporizer can receive an identifier of the vaporizer itself or alternatively/additionally of the cartridge and may, based on or otherwise using the identifier, determine whether a security setting is included in a user profile or other settings associated with the vaporizer or cartridge. Consistent with implementations of the current subject matter, such functionality may be entirely or partially included within the vaporizer (and/or cartridge) or they may be distributed between the vaporizer and a user interface that may be presented on an additional device that is part of a vaporizer system, such as a wearable and/or handheld device, laptop, desktop, etc., operating control logic. Control logic or other software functionality for providing these features may include a user interface, and may provide input/output and analysis capability for modulating operation of the vaporizer. Non-limiting options for the first communication hardware of the device and/or the second communication hardware of the vaporizer are described herein.

A vaporizer may be configured to switch to a locked or "further authentication required" mode after a period of inactivity exceeding some preset (or, optionally, a user configurable) threshold amount of time. In some examples, this locked mode may be or include a "sleep mode" when there is no usage detected for a predetermined and/or preset period of time. In some implementations of the current subject matter, as a prerequisite for the vaporizer to be activated, and thereby be capable of being used for the purpose of generating vapor, the user must be authenticated to ensure that the device is being utilized by an intended user, and to thereby deter or prevent unauthorized use, or accidental or unintended activation of the device, or use of the device by an individual not of legal age to ingest the active component, including nicotine or cannabis. Personal identification number (PIN) based authentication may apply a user selected PIN code to authenticate the end use. Biometric authentication may be used, optionally using one or more approaches. For example, a fingerprint based authentication process may authenticate the end user. An iris scan based authentication process may use an eye or iris scan, or the like, to authenticate the end user. Facial recognition based authentication may use a face scan or image processing algorithm to authenticate the end user. Biometric authentication, including iris scanning, facial recognition, etc. may be particularly useful if the personal digital device has a camera, such as a forward facing camera, or other sensors configured for such authentication to enable use of the user device.

A vaporizer may be deactivated following a threshold criteria being met. For example, the vaporizer may be rendered inactive after a period of inactivity. The period of inactivity may be preset and/or selected by the user (e.g., using the control software of running on the personal digital device). Thus, the period of inactivity may be a configurable parameter of the vaporizer. The application software/firmware may include functionality to unlock or activate the vaporizer using authentication, as mentioned herein.

The vaporizer may include a heating element configured to heat a vaporizable material. The app may be configured to disable and/or lock the vaporizer by disabling power to and/or use of a heater element of the vaporizer. The disabling and/or locking of the vaporizer may be based on authentication and/or age verification of a user. The disabling and/or locking of the vaporizer may also be based on vaporizer being within range of a disabling/locking signal or disabling/locking device (e.g., beacon 705) as discussed below with respect to FIGS. 7-9. A control system (e.g., via firmware) can be configured to selectively disallow a user from actuating the heater element from certain (e.g., standard heating) actions. In some aspects, the device can be configured to ignore pressure sensor readings and/or other indicia of a user puffing on the device. The app may be configured to provide a notification indicating that the vaporizer has been operationally disabled and/or locked. Additionally or alternatively, the device may be configured to alert the user that the device is locked (e.g., using one or more LEDs, sound, haptics, etc.) upon determining that the user is trying to puff on the device. In some implementations, the vaporizer may be configured such that the vaporizer becomes operational responsive to the vaporizer being within a threshold range of the user device. In some implementations, the vaporizer may be configured such that the vaporizer becomes operational responsive to the vaporizer receiving a signal from the user device. In some implementations, the vaporizer may be configured such that the vaporizer becomes inoperative responsive to the vaporizer receiving a signal from the user device. For example, a user may lock and/or unlock the vaporizer by a user input to the app, such as with fingerprint recognition, face recognition, and/or the like.

A vaporizer may be configured to be locked such that key functionality (e.g., vapor production) is disabled to prevent unauthorized parties from using a locked device. In some implementations, a vaporizer paired to an app or other software may implement a lock/unlock feature such that a given user may lock the device, thus preventing unauthorized users from unlocking and/or accessing the vaporizer. The locking feature may be configured with strong security (e.g., encryption, firewall, and/or the like) to prevent defeating the locking functionality through hacking.

The app may be configured to disable and/or lock the vaporizer responsive to the vaporizer being outside of the threshold communication range with the user device. For example, if the vaporizer is beyond the communication range of the user device, the vaporizer may be configured to deactivate vaporizer operation such that the vaporizer is inoperable until returning to communication range with the user device.

The app running on a user device may be configured to disable and/or lock the vaporizer responsive to location and/or time parameters, such as how long the vaporizer has been out of range of the user device.

The app may be configured to enable and/or unlock the vaporizer responsive to the vaporizer being within the threshold communication range with the user device. For example, the vaporizer may resume an operational status responsive to being within communication range with the user device.

The vaporizer may be configured to receive information associated with a first user of a first user device. The vaporizer may be configured to activate and/or unlock vaporizer operation responsive to the vaporizer being communicatively coupled and within a threshold communication range with the first user device associated with the first user. The vaporizer may be configured to deactivate vaporizer operation responsive to the vaporizer being outside of the threshold communication range with the first user device. The vaporizer may be configured to deactivate vaporizer operation responsive to the vaporizer being communicatively coupled with a second user and/or a second user device. For example, if a first user pairs a first vaporizer with the first user device, the first vaporizer may deactivate and/or lock responsive to a second user attempting to pair the first vaporizer with the second user device.

The user interface examples illustrated in FIGS. 13A-13H relate to locking and reporting features that may provide benefits in providing data as well as vaporizer-specific controls for preventing unauthorized and/or underage use, purchase, etc. of a vaporizer.

Figure 13C:
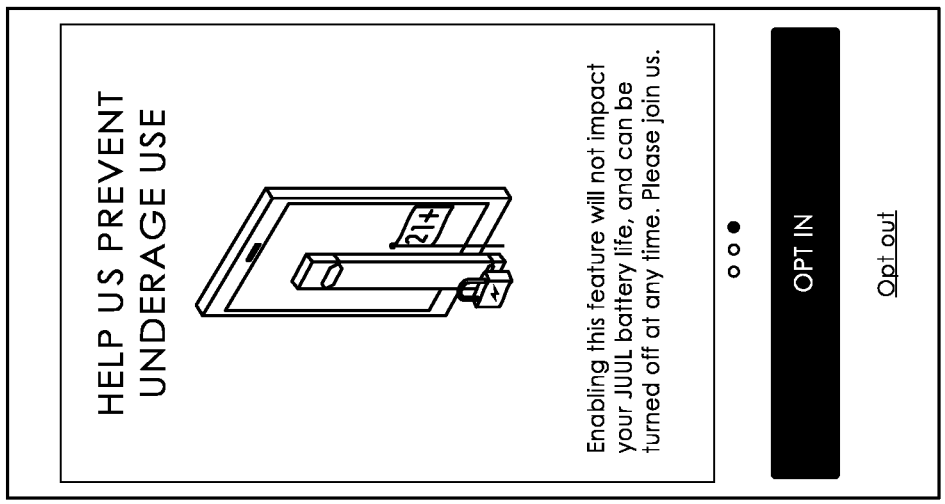
FIGS. 13A-13H illustrate features of exemplary user interfaces for an application that may be used with a vaporizer consistent with implementations of the current subject matter.
Figure 13B:
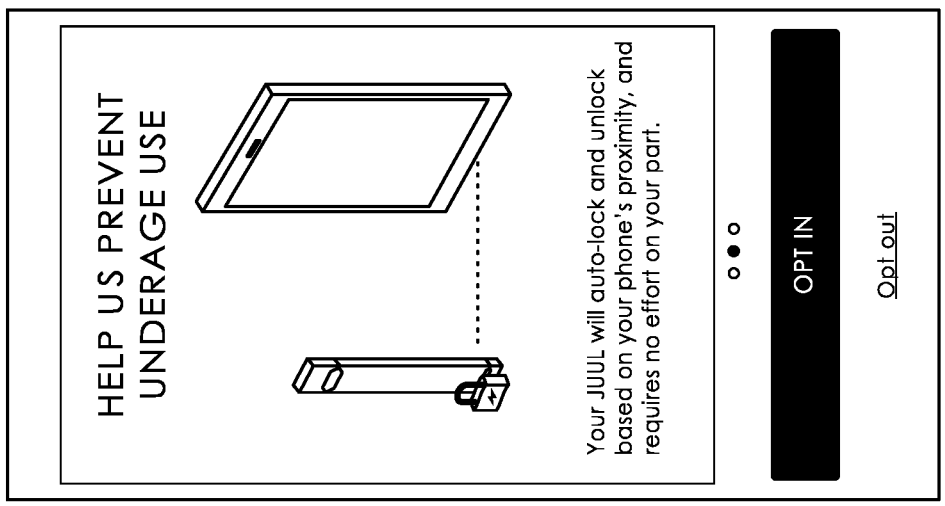
Figure 13A:
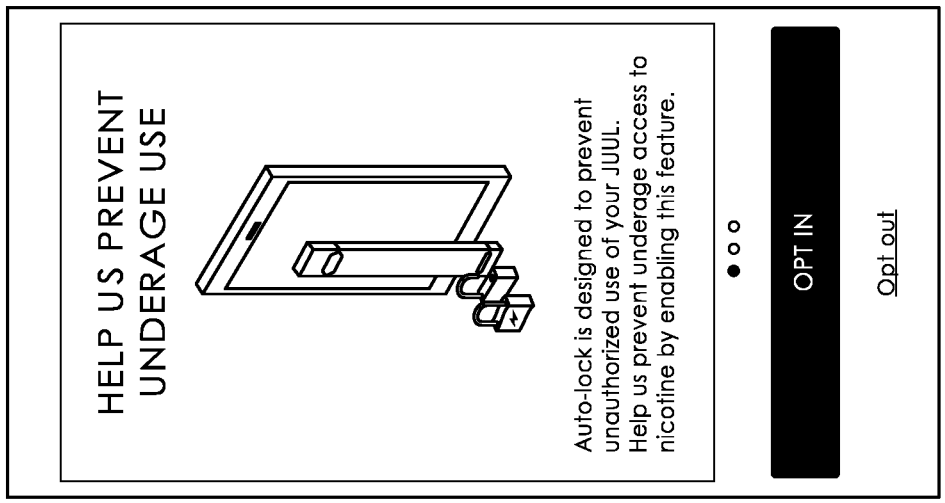

The app screen view of FIG. 13A or a similar approach may be used to prompt a user of a vaporizer to implement a device locking feature. In one example, this may be provided as an "opt-in" feature such that the vaporizer has a default state of not automatically transitioning to a locked state. Alternatively, the locking feature may require an "opt-out" by the user to disable automatic locking. In still other examples, the auto-locking feature may not be a user-configurable option.

The screen views of FIG. 13B and FIG. 13C show views that may be presented to the user upon selection of the opt-in feature. This screen may be used to explain that the vaporizer will transition automatically to a locked state if communication between the user's mobile device and the vaporizer does not occur for some period of time longer than a threshold amount of time. Functionally, when this feature is enabled, a controller of the vaporizer (e.g., a microcontroller, PCB, software running on a programmable processor, other computing hardware, etc.) can execute operations that track a duration since a last successful communication with a user's mobile device that has been paired to the vaporizer. If this duration exceeds some threshold value, the vaporizer controller can cause interruption of the normal operation of the vaporizer, for example by preventing delivery of current to a heating element or otherwise activating an atomizer that causes production of inhalable aerosol.

Figure 13E:
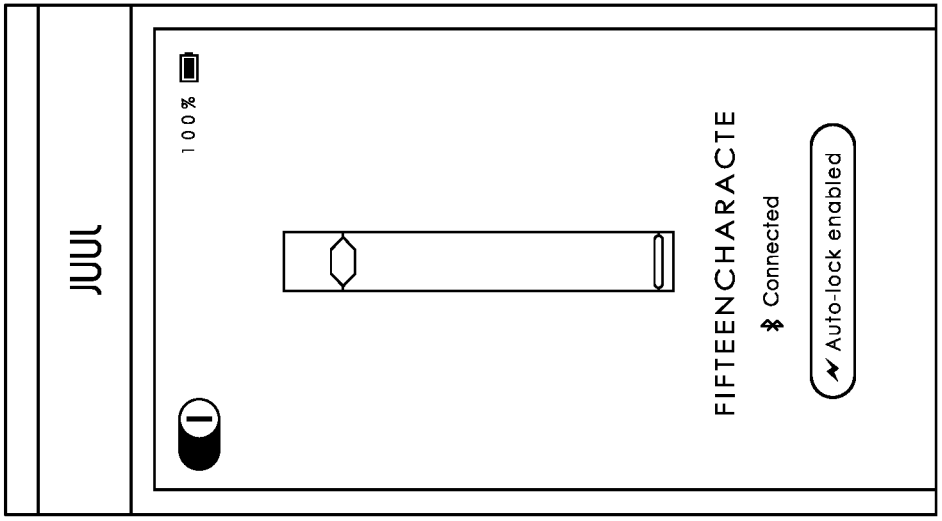
Figure 13D:
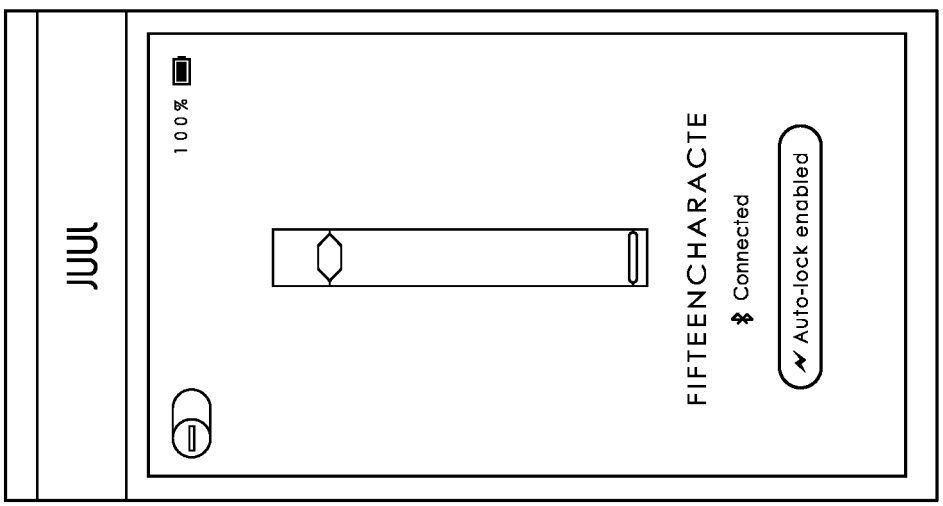

The screen views of FIG. 13D and FIG. 13E show a transition from having the auto-locking feature disabled and enabled via activation of a user interface element such as a slider control (upper left corner of the screens in FIGS. 13D and 13E). In one example implementation, a user may elect to opt in or opt out of having the auto-lock feature available, for example via the views of FIGS. 13A-13C. At any given time, the user may elect to have the auto-lock feature enabled or disabled for his or her vaporizer using the on/off election shown in FIG. 13D and FIG. 13E. Disabling of the feature may be desirable if the user intends to use his or her vaporizer for some period of time when the user's mobile device is not nearby or if the user's mobile device needs to be turned off or otherwise put in a state in which it would not be able to communicate with the vaporizer. In some implementations of the current subject matter, it may be advantageous for the auto-lock disable feature to have a time limit such that the vaporizer controller reverts back to an auto-lock enabled state after some fixed or user-configurable duration of having the auto-lock disabled.

In some implementations, the vaporizer device and/or user app may be configured to display a first notification for a locked device that is "in range" (e.g., the user device being within a threshold range of the vaporizer device). In some implementations, the vaporizer device and/or user app may be configured to display a second notification for a locked vaporizer device that is "out of range" (e.g., the user device being outside a threshold range of the vaporizer device), as in FIG. 13F. The vaporizer device and/or user app may be configured to display an option for the user to "opt-in" the some or all of "auto-lock" features. For example, the vaporizer device and/or user app may be configured to display a count-down timer for a time-based "auto-locked" vaporizer device that is "in range" (e.g., the user device being within a threshold range of the vaporizer device). In some embodiments, the user may have an option to specify the length of time after which the "auto-lock" is responsive (e.g., a time varying from the default time of 24 hours may be provided). In some implementations, the vaporizer device may be configured to auto-lock a vaporizer device responsive to the vaporizer device changing from an "in range" status to an "out of range" status. In some implementations, the vaporizer device may be configured to auto-lock a vaporizer device responsive to the vaporizer device being "out-ofrange" for a defined time period (e.g., 24 hours). In some embodiments, the vaporizer device may be configured to unlock automatically responsive to returning to in-range status. In some implementations, the vaporizer device and/or user app may be configured to display an overlay description of the lock/unlock feature, and/or a picture and/or animated gif representation of the vaporization device being in-range and/or out-of-range.

Figure 13F:
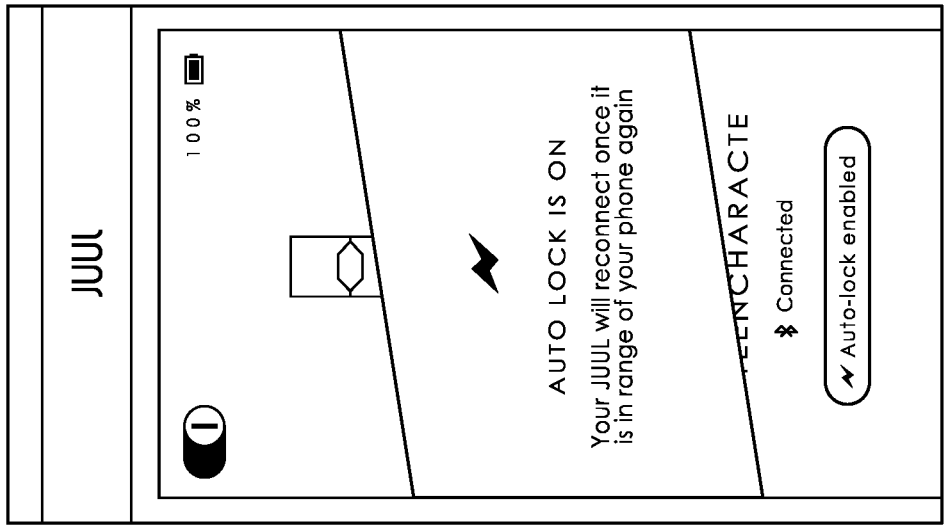
Figure 13G:
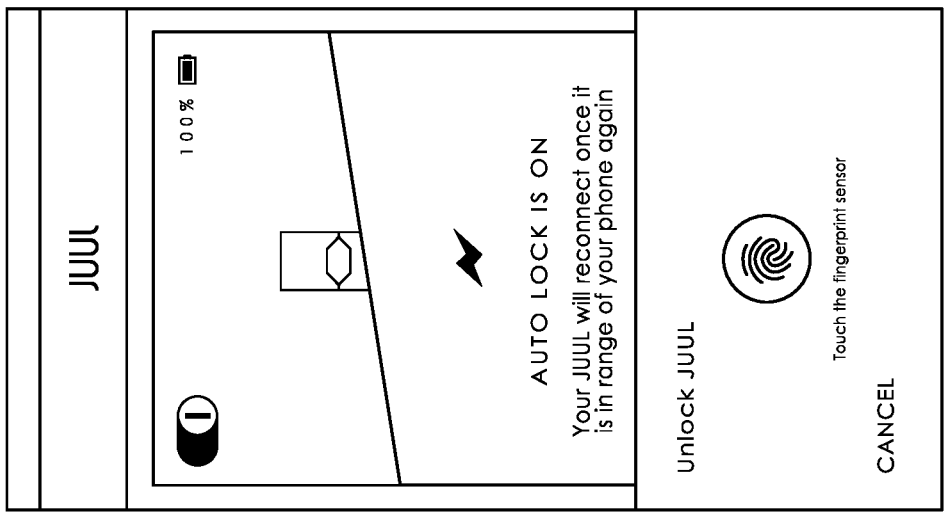
Figure 13H:
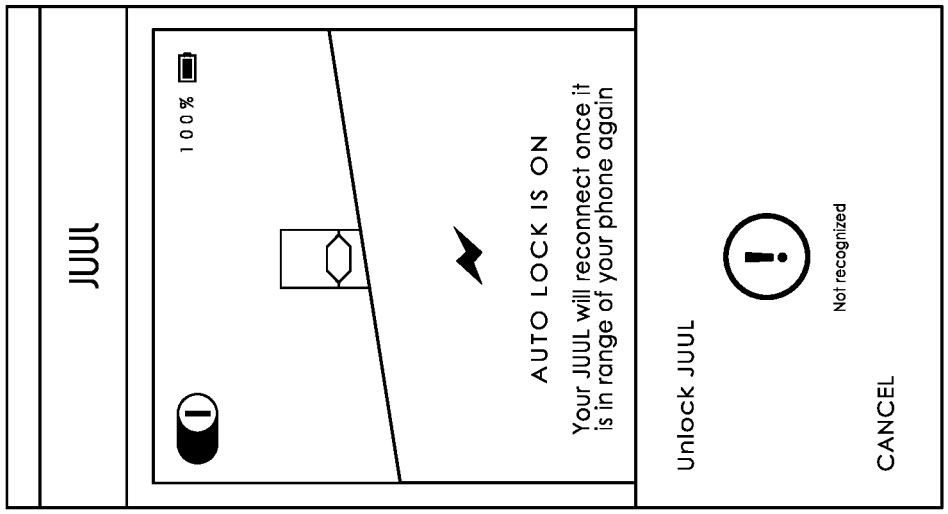

In other words, FIG. 13F shows a screen view that can indicate that the auto-lock in enabled and that the vaporizer is not within range of the mobile device (and is therefore unusable until communication is reestablished between the mobile device and the vaporizer). FIG. 13G shows an optional screen view that can be included to require that a password or some biometric verification (e.g., a fingerprint sensor ID, facial recognition, etc.) be received by the user's mobile to device to re-authorize use of the vaporizer and to thereby cause the mobile device to communicate to the vaporizer controller than operation of the vaporizer should again be allowed. Such a feature cold prevent a minor or other unauthorized user from making use of the vaporizer merely by being somewhere close enough to the user's mobile device (e.g., in an adjoining room, etc.) to allow communication between the mobile device and the vaporizer to be re-established. FIG. 13H shows an example of a screen view that can indicate that the proper authorization has not been received such that the vaporizer will remain disabled.

In some implementations, the vaporizer lock feature to lock (e.g., disable) or unlock (e.g., enable) a vaporizer device from a user interface of the user device may be configured to be available when the vaporizer is in communication range of the communication device (e.g., the user device being within a threshold range of the vaporizer device). In response to the vaporizer device being locked, the vaporizer device may be configured to disable some or all functionality of the vaporizer device. In various examples, locking the vaporizer may include one or more of disabling power to a heater element, disregarding inputs from a pressure sensor or other switch configured to activate the vaporizer for aerosol generation, etc. In response to detecting an attempted inhalation/puff on a locked vaporizer device, the vaporizer device may be configured to display a "locked" LED indication, block airflow, and/or provide another indication that the device is locked. In some aspects, locking the vaporizer device may change the state of a home screen on the user interface such that if the vaporizer device is locked, a "locked" notification is displayed and the user may unlock the vaporizer device from the home screen. The vaporizer device may be configured such that the user may only unlock the vaporizer device via an app logged into that user's account. In some embodiments, the lock and/or unlock features may be available with or without Wi-Fi and or the user/device having data service reception.

In addition to the above-noted auto-lock features, a vaporizer device may be configured to provide an "Access Feature" to registered app users for account login with or without an age verification (AV). The vaporizer device may optionally be configured such that the Access Feature availability may be linked to the app and/or the user login rather than a specific user mobile device. In some implementations, a user device using the device app with a specific user logged into a user account may be able to unlock/lock a specific device previously locked by that user using another instance of the device app.

Locking the device may be performed by disabling power to a heater element, pressure sensor, or other element of the vaporizer.

In some implementations, a vaporizer lock feature to lock (e.g., disable) or unlock (e.g., enable) a vaporizer from a user interface of the user device may be configured to be available when vaporizer is in communication range of the user device (e.g., the user device being within a threshold range of the vaporizer). In response to the vaporizer being locked, the vaporizer may be configured to disable some or all functionality of the vaporizer. In response to detecting an attempted inhalation/puff on a locked vaporizer (or another attempted use of the vaporizer, such as a tap on the device to query battery level, and/or inserting or removing a pod), the vaporizer may be configured to display a "locked" LED indication, block airflow, and/or provide another indication that the device is locked. The "locked" indication may include a locked animation, battery level animation, LED animation, sound, and/or the like. In some aspects, locking the vaporizer may change the state of a home screen on the user interface such that if the vaporizer is locked, a "locked" notification is displayed and the user may unlock the vaporizer from the home screen. The vaporizer may be configured such that the user may only unlock the vaporizer via an app logged into that user's account. In some embodiments, the lock and/or unlock features may be available with or without Wi-Fi and or the user/device having data service reception.

Figure 28:
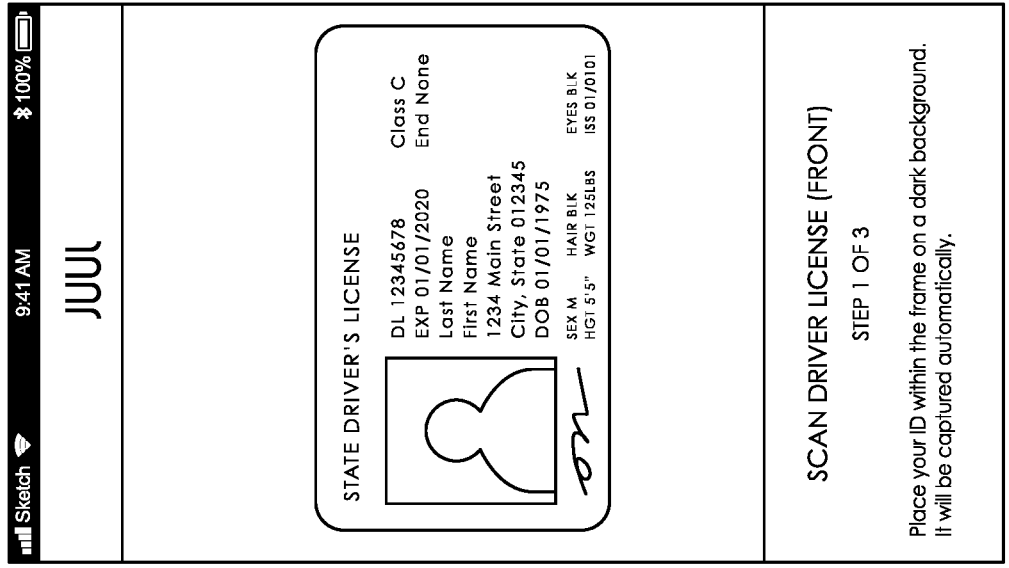
Figure 27:
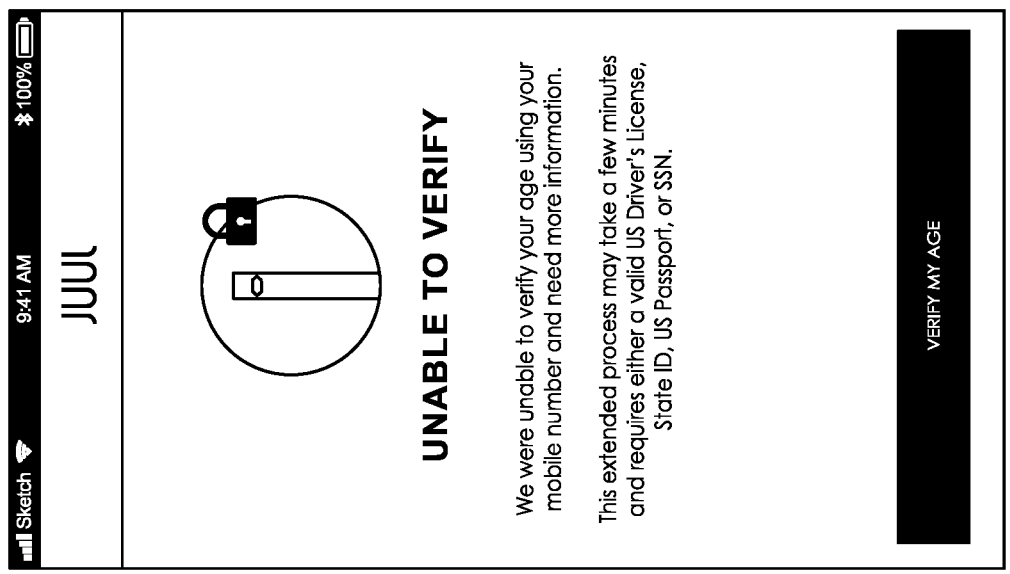
Figure 30:
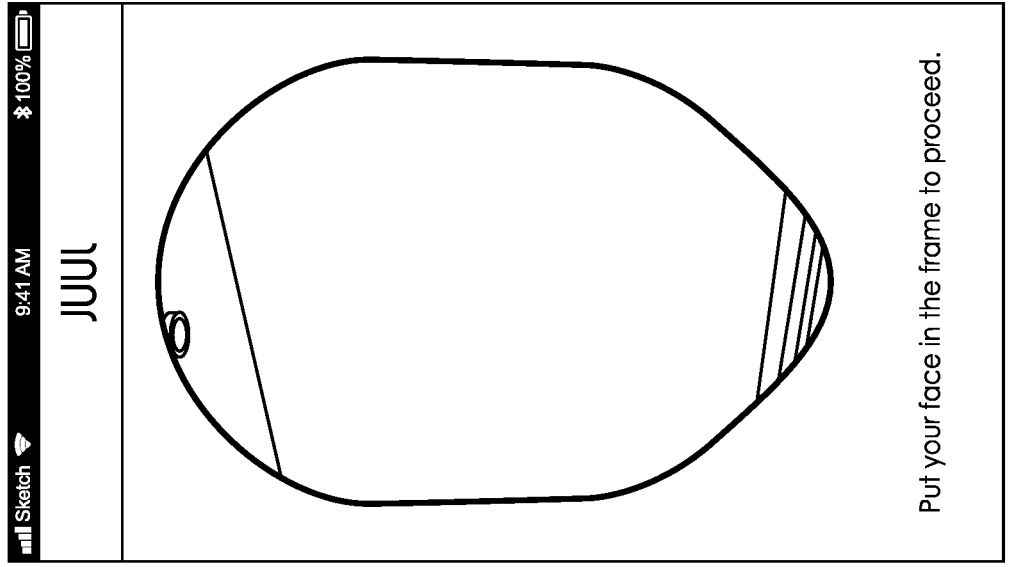
Figure 29:

In some implementations, the vaporizer and/or user app may be configured to display a first notification for a locked device that is "in range" (e.g., the user device being within a threshold range of the vaporizer). In some implementations, the vaporizer and/or user app may be configured to display a second notification for a locked vaporizer that is "out of range" (e.g., the user device being outside a threshold range of the vaporizer), as in FIG. 28. The vaporizer and/or user app may be configured to display an option for the user to "opt-in" the some or all of "auto-lock" features. For example, the vaporizer and/or user app may be configured to display a count-down timer for a time-based "auto-locked" vaporizer that is "in range" (e.g., the user device being within a threshold range of the vaporizer). In some embodiments, the user may have an option to specify the length of time after which the "auto-lock" is responsive (e.g., a time varying from the default time of 24 hours may be provided). In some implementations, the vaporizer may be configured to auto-lock a vaporizer responsive to the vaporizer changing from an "in range" status to an "out of range" status. In some implementations, the vaporizer may be configured to auto-lock a vaporizer responsive to the vaporizer being "out-of-range" for a defined time period (e.g., 24 hours). In some embodiments, the vaporizer may be configured to unlock automatically responsive to returning to in-range status. In some implementations, the vaporizer and/or user app may be configured to display an overlay description of the lock/unlock feature, and/or a picture and/or animated gif representation of the vaporization device being in-range and/or out-of-range.

The vaporizer may be configured to provide an "Access Feature" to registered app users for account login with or without an age verification (AV). The vaporizer may be configured such that the Access Feature availability may be linked to the app and/or the user login rather than a specific user device. In some implementations, a user device using the device app with a specific user logged into a user account may be able to unlock/lock a specific device previously locked by that user using another instance of the device app.

The vaporizer may be configured such that the Access Function may operate on a user device without Wi-Fi, LTE, or other connectivity to the Internet. The Access Function may be responsive to the device being in Bluetooth Low Energy (BLE) range of the user device and the user being currently logged into the user's account. In such implementations, no request to external servers may be required to unlock or lock the vaporizer from the app.

In some embodiments, vaporizer pairing, locking, and/or unlocking may be only accessible through an app logged into the user account linked to that vaporizer. The vaporizer may be configured to self-lock after an extended period of non-connectivity with the user's device and/or app. For example, if a vaporizer has not connected to a paired app within a set window (e.g., 1 second, 24 hours, 7 days, and/or other durations), the vaporizer may automatically lock to prevent unauthorized use of lost or stolen vaporizers.

The vaporizer may be configured such that the lock feature may persist across power events. Configuration and state data for such feature must be maintained in non-volatile storage on the vaporizer to survive power-on reset (POR) and/or other reset conditions.

The vaporizer may be configured such that a locked device cannot be factory reset (Lock Retention Feature), and may provide an indication to the user that the vaporizer is locked. For example, if a user tries to "factory reset" a locked vaporizer, the vaporizer may show the "locked" LED indication, and not undergo reset.

The vaporizer may be configured such that the Lock Retention Feature includes security sufficient in preventing defeating the locking functionality through hacking. In some embodiments, a shared private key must be used to lock/unlock the vaporizer. A shared private key may be generated by the app and transmitted to the vaporizer during a lock request. To unlock the device, the app may be configured to provide a challenge-response authorization to the vaporizer with the private key to initiate an unlock sequence.

The vaporizer may be configured to authorize allowed vaporizers to link to different user devices owned by the same user account holder. For example, if a user loses her user device, the user may be able to log into the app on her new user device and connect the vaporizer to the new user device. For a vaporizer previously paired to another user device and associated with a user account holder, the vaporizer may be able to pair with new user device responsive to the app's user credentials being the same as the user credentials used to pair the vaporizer on the previously paired user device.

The vaporizer may be configured such that authorized users may not have to "shake to pair" (e.g., perform an electronic handshake communication exchange) to the same user device logged into the same user account after first pairing and/or linking to the user account. For example, when a vaporizer is linked to a user account (with or without an age verification), the vaporizer may "remember" that pairing until being unlinked from the user account. User credentials may be stored on the vaporizer, such that the linked app information is retained.

The vaporizer may be linked and authorized (e.g., tied to an account, with or without an age verification) such that the user may be provided with a specific set of features based on the authorization and/or link. The vaporizer may be configured such that authorized and authenticated devices may be linked and the user is provided with a specific set (the full set) of features via the app.

The vaporizer may be configured such that authorized ownership prohibits vaporizers owned by another account holder to be linked to another account without device owner explicitly releasing the vaporizer from the original account, thus making stealing more difficult by communicating that the vaporizer is paired to another account user. For a vaporizer previously paired to another user device and associated with a user account, the vaporizer may only pair with a new user device responsive to the app's user credentials being the same as those used to pair the vaporizer on the previously paired user device. In some implementations, responsive to the vaporizer being paired with a first user account and/or a first user device, the vaporizer may be configured such that it may not be paired with a second user account and/or a second user device.

The vaporizer may be configured for authorized ownership. For example, if a user attempts to link a vaporizer paired with a first user account to a second user account, the user interface may be configured to display the name of the vaporizer and/or the second user (e.g., in case the user accidentally swapped with a friend).

The vaporizer may be configured to communicatively couple to one user device at a time. For example, the vaporizer may only be paired and bonded to a single Bluetooth central user device such that subsequent pairings and bondings overwrite previous connections.

The vaporizer may be configured to pair to the Bluetooth central user device when locked, such that the vaporizer may be unlocked by any Bluetooth central user device logged into the user's account.

The vaporizer may be configured such that a vaporizer linking users may only link a specified number of vaporizers per a time period to prevent underage abusing (e.g., for youth prevention device activation/deactivation). For example, matching ecommerce regulations may link maximum of five devices per 90 days (ecommerce purchase limit). The app may be configured to communicate the date after which a user may link another vaporizer.

The vaporizer may be configured to "shake to pair" for initial pairing of the vaporizer to a user account (in order to prevent other vaporizers in range from pairing). The vaporizer may provide an indication that it has been shaken, and is pairable.

The vaporizer may be configured such that counterfeit vaporizers may not be able to connect to the app and/or Cloud during the initial pairing process to a user device. The app may be configured to verify that the vaporizer is not a counterfeit device prior to allowing the device to be linked to a user account and/or providing any app services (such as firmware updates). Such process may utilize industry standard security procedures to ensure the service is secure and non-hackable.

The vaporizer may be configured such that genuine vaporizers may take measures to only pair and link to genuine manufacturer apps and cloud to ensure security. The vaporizer may be configured to independently verify that the app and/or cloud being connected to has been provided by the manufacturer and not a third party service to prevent fraud and other non-manufacturer-approved activities. Such process may utilize industry standard security procedures to ensure the service is secure and non-hackable.

The vaporizer may be configured such that the first pairing and user device linkage (of a non-associated device) must happen when the app has internet access. Internet access may be required for verification of genuine (vs. counterfeit) vaporizers.

The vaporizer may be configured such that users may pair additional devices to their account ("add device"), subject to limit of five devices per 90 days. The app may be configured to verify such criteria and provide a verification (or not) notice.

The vaporizer may be configured to be "factory reset", unless the device is locked. Factory reset may include resetting the vaporizer to the newly out-of-box state, including clearing the log, and resetting the "Research Mode" of data collection to "Standard Mode". If reset gestures are attempted (e.g., if pod is removed and/or inserted) while the vaporizer is locked, the vaporizer may be configured such that the LEDs show the "locked" indication. A user must first unlock the device to enable factory reset. Factory reset gestures may include orientating the device vertically, such that the pod is pointing up, removing the pod, orienting the device such that the pod end is down, inserting the pod, removing the pod a second time, orienting the device with the pod end up, reinserting the pod, and/or the like.

The vaporizer may be configured such that if a user loses a locked device and releases it from the user account, then finds it again, she may be able to reconnect the device by logging into her user account to resume use. If a device is lost in a locked state, and re-pairing is attempted with the account the device was originally associated with, the device may function as normal and the link to the account may be restored. If the re-pairing is attempted with a different account, the device may remain locked.

The vaporizer may be configured such that a device that has not been linked to an account (even if it has been non-authorized linked to a user device) may be re-paired and bonded with any user device and any user account, such that the device may be repaired and bonded to the app, no ownership construct is imposed on this link until the device is connected to a vaporizer user account.

In some implementations, a vaporizer that has not been linked to another user account may be paired and bonded to a user device and app without requiring a user login for the app (e.g., for new vaporizers, where the user has not yet gone through login or authentication). However, the app may be configured to provide reduced feature sets until the user logs in with an existing user account or creates a new user account.

In some implementations, users may be able to unlink a vaporizer from an associated user account (e.g., if the user would like to give the vaporizer away, or they've lost the vaporizer). In one embodiment, a previous user's data (e.g., usage data) may be visible by a new user of the vaporizer. An account-linked vaporizer may be released ("unlinked") from that user account, both when in-range and out-of-range, via the app. The vaporizer may be configured to restore to factory settings, including unlocking the vaporizer if the vaporizer is "locked", and wiping the log, but keeping the latest firmware, responsive to an attempt being made to pair the vaporizer again to an app.

The vaporizer may be configured such that responsive to the firmware (main/running image) of the vaporizer being overwritten/updated, the vaporizer may not function normally (e.g., may not produce vapor). A static LED pattern (or other indication) may be provided to alert the user that the vaporizer is undergoing an update. In some embodiments, basic vaporizer function may be suspended responsive to firmware being loaded to microcontroller memory. A static LED pattern (or other indication) may be displayable in the updating state to alert the user that the vaporizer is functioning and updating firmware.

In some implementations, usage data may be tied to a user account, such that if a user logs into the app on a different user device (or logs-out then logs back in) the data may be preserved. Usage data may include one or more of vapor experience, goals data (e.g., from user setup, onboarding flow), guided draw results, location history, and/or other usage data.

In some implementations, if a user deletes an associated user account, according to General Data Protection Regulation (GDPR), all data associated with that user must be irrevocable unlinked from that user's account in a non-reversible fashion. The user app may be configured to unlink user data, provide user data (e.g., via CSV, and/or the like) per user request, provide the user with terms and conditions pages.

In some implementations, a user may age verify from one of several app locations, resulting in associated updates to the app feature set. An Account Settings page of the app may display "age verified" for the country (or other geographic region) of the user and may include other information associated with the user and/or the account associated with the user. Responsive to age verification updates, enabled features may include checkout, vaporizer replacement, external webpages, mobile site, and/or other features. Age verification may be required for check-out, vaporizer replacement, and other features. Age verification may be accessed from one or more of checkout (e.g., shopping), account menu, vaporizer replacement flow, login, internet connectivity, and/or other app features. A user's age verification status may be reflected in Account Settings. The app may provide an age verification status and for which country the verification applies. The user may be provided an option to age verify from the app. Responsive to an unverified request, an external mobile web page may be provided.

User Age Verification

In some implementations, age verification procedures may include verification using database services. In some implementation, a user may be age verified using personal user information such as a social security number, credit history, facial recognition, and/or the like. In some implementations, a user's name and phone number may be verified using a two-factor authentication (e.g., receive code via text message). Other age authentication procedures may include a "passport" feature. For example, a user may create an authorized use identification via the user interface of the user device. When the vaporizer leaves proximity of the associated user device, the vaporizer may be configured to disable functionality. Functionality may be reenabled responsive to returning within a threshold proximity of the associated user device. In some implementations, the vaporizer may be configured such that the vaporizer remains enabled responsive to being beyond a threshold proximity of the user device for a limited duration (e.g., once a given time period expires, the vaporizer may lock).

Age verification may also be correlated with location information to determine whether the user satisfies an age threshold. For example, the vaporizer and/or application may receive global positioning system (GPS) information for identifying a location of the vaporizer and/or application. In some aspects, the age threshold may be based on a geographic location such as a particular country, state, city, county, and/or the like. If the age threshold has changed based on the location of the vaporizer and/or application, the vaporizer and/or application may re-authenticate the user based on the updated age threshold.

Performing such multi-factor authentication with proximity detection may reduce the likelihood of underage and/or unauthorized use of the vaporizer. Additionally, correlating proximity and/or location information with age verification and/or identification information may allow more flexibility to preventing vaporizer operation in designated areas.

The vaporizer may be configured to receive vaporizer settings from the user via the app. Vaporizer settings may include changing the vaporizer name. The user account may be configured to store the vaporizer settings of a user, such that if the user logs into the user account on a new user device, the user's previous settings may be preserved. Vaporizer settings preserved by the user account may include brightness, lock state, low battery alert, vaporizer name, and/or other settings. A user account may be configured to unlink a vaporizer from the user account. By way of non-limiting example, responsive to user selection of "unlink vaporizer," a prompt may be provided such as "Are you sure you want to unlink <JOHN's JUUL> from your account? The vaporizer may be reset to factory settings, and may be linked to any other user's account." Responsive to a "Yes" selection by the user, the vaporizer may be unlinked. Responsive to a "No" selection by the user, unlinking may not remove usage data from user's account, may remove all location data, and/or may remove vaporizer from location features.

Additionally, vaporizer settings may include vaporizer warranty and/or registration status. Responsive to an unregistered vaporizer (e.g., when the vaporizer is not linked to an account because the user is not logged into an account), display of the warranty registration page may be provided such that the vaporizer information is provided and the user is prompted to create or login to a user account. In some embodiments, the app may be configured such that a user may create a new account and/or log in to an existing account using existing Google, Facebook, and/or other account login information.

In some implementations, a battery level of the vaporizer may be displayed on the user device without the vaporizer app being enabled. For example, a 'battery service' may be configured to display the battery level of the vaporizer as an icon via the user interface of the user device. Such vaporizer information may be displayed responsive to the vaporizer being within a threshold range of the user device.

MONITORING—HEALTH and CESSATION. A vaporizer and/or applications running on a device that is part of a vaporizer system consistent with implementations of the current subject matter may also be configured to monitor usage for a digital health regimen, and/or smoking cessation, etc. For example, similar to weight loss monitoring devices, a vaporizer or an app or both may be useful for people who want to reduce nicotine consumption, and/or keep track of how much nicotine consumed within a certain amount of time. For example, the vaporizer and/or app may be configured to allow cigarette-e-cigarette dual users to log in how many cigarettes they consume and compare the total amount of HPHCs and nicotine they get on different days when they use different combinations.

The app and/or vaporizer may also provide additional motivation by providing messaging such as reporting how much of X compound is consumed, and may show how much money the former smoker is saving by reducing or eliminating smoking. This would be most relevant for nicotine, although it may be used for other substances as well. In some implementations, the user may enter their usual price per pack of cigarettes, which may be used as the baseline. This may also be relevant for THC, since vaping is a more effective means of consumption. From anecdotal data, there may be a 5-10× multiplier between smoking and vaping; for example, someone who would vape×mg of THC would otherwise smoke 10×mg of THC in a given time interval. Based on dosage monitoring by the device, the vaporizer and/or app may report on savings relative to how much the user otherwise smokes.

In some implementations of the current subject matter, the app may also allow a user to log other health related activities, such as from a fitness app, and/or may suggest correlations between nicotine or THC usage and alcohol consumption, heart rate, blood pressure, workout time or weight changes, etc. For example, a user may enter a preferred unit dose (using presets, or estimated/recorded/programmable data as described herein), and a dosage interval or total daily target. The vaporizer and/or app may then lock out after each dosage, and an alert may pop up on a user computing device (e.g., phone, smartwatch, tablet, etc.) when it's time for a next dosage, and the vaporizer automatically unlocks for this next dosage. This could be used as a user-elected reduction approach (step-down or cessation), or to maintain a prescribed therapeutic regimen (e.g., X mg of agent every Y hours, not to exceed Z mg/day). In some aspects, vaporizer and/or app may capture usage information of the user and/or vaporizer that can be fed back into the app (e.g., via Bluetooth, WiFi, and/or the like) so that the information can be recorded and recommendations around nicotine cessation programs can be provided based on any captured and/or recorded data (including usage of the device and the additional information) and/or usage patterns determined therefrom. In some aspects, a recommendation can include a cessation plan based on the data and/or patterns that is implemented using the app and the device (e.g., by locking the device at certain times based on the plan).

In some implementations, the vaporizer and/or an affiliated app may have a dashboard style user-interface, in which users can log on and tabulate their progress over time. Data may be some based on individual and/or group data. For example, the group data can show as a population of what the mean smoking-vaping switch rate is at any given time since starting to use a vaporizer. The apparatus may provide a view in which the user can select other users to define a group (cohort) based on their starting conditions: e.g., packs per day, age, gender, etc.

DEVICE CONTROL AND CUSTOMIZATION. As mentioned herein, the vaporizer may be controlled in part by user input to an affiliated app. For example, particular aspects of the vaporizer that may be controlled may include changing a temperature set-point, for example to allows users to get less vapor if they need to be less conspicuous. This may also allow the user to reduce harshness and active ingredient consumption per puff.

The app may also provide a more precise indication of battery level beyond what is displayed on the vaporizer. For example, during charging, the app may indicate time remaining.

As mentioned herein, the app may also provide firmware updates to the vaporizer.

For a device that accepts both nicotine and THC cartridges, the affiliated (connected) app may also allow the user to switch between nicotine and THC modes, which may likely have different temperature set points.

A vaporizer and/or a device that is part of a vaporizer system may use received signal strength indicator (rssi) to help a user locate a lost vaporizer. In addition, the app may allow the user to cause the vaporizer to vibrate, flash and/or emit sound(s) as an alarm, including for helping to locate a misplaced apparatus. For example, a temperature change, vibration or flash lights may also be the indicator of whether the vaporizer is hiding nearby. In some implementations, the vaporizer may also help locate a misplaced phone when connected via changing LED colors depending on the distance between the vaporizer and the phone.

One or more network devices may be configured to receive, by one or more processors, information associated with the vaporizer, communicate the received information associated with the vaporizer to the app, and determine a unique identification associated with the vaporizer. Network devices may include user devices of other vaporizer users. The app may be configured to determine whether the vaporizer is within a communication range of the one or more network devices. The vaporizer may be configured to emit a signal responsive to a prompt communicated by the network devices. For example, if the vaporizer has been misplaced in a location beyond range of a user device, one or more network devices may receive a "lost device" notification and the misplaced vaporizer may emit a signal responsive to being within the communication range of one or more of the network devices. The network devices may be configured to transmit location information to the user device responsive to the vaporizer being located. The vaporizer may be configured to disable and/or lock responsive to a prompt communicated by the network devices.

A vaporizer and/or an app may be used to adjust LED brightness and color of the vaporizer. For example, for vaporizers with multiple LEDs, a user may download personalized indicator patterns to the device. In addition to making the vaporizer feel more personalized, this may have enhanced utility as it may make it easy to identify which vaporizer belongs to a particular owner.

In some implementations, the temperature of the vaporizer may be adjusted by using a graphical user interface that allows both gross and precise control of the vaporizer temperature with a single finger. For example, a graphical user interface (GUI) may include a display of the temperature visually indicating the current temperature and/or target temperature of the vaporizer; this temperature may be adjusted up or down (within a range). In this example, to adjust the temperature, the user may hold a fingertip in a location on or against the indicator, causing indicators to appear on either side of the temperature when the vaporizing temperature may be adjusted up (on right side) or down (on left side). Quickly sliding a finger over the adjacent indicators may rapidly move the temperature setting in large intervals (e.g., by 3 degree, 5 degree, 10 degree, 15 degree, 20 degrees, 25 degrees, 30 degrees, 35 degrees, etc., intervals). Large interval adjustment is indicated by the large circles. Holding a fingertip on the temperature indicator or adjacent indicators for a predetermined longer period of time (e.g., 1 second, 2 seconds, 3 seconds, 4 second, 5 seconds, etc.) may open a fine temperature control; moving the figure along the fine temperature control may allow increasing/decreasing the selected temperature by fine amounts (e.g., 0.1 degrees, 0.5 degrees, 1 degree, 2 degrees, etc.). The temperature change is shown in the central temperature indicator.

Figure 6:
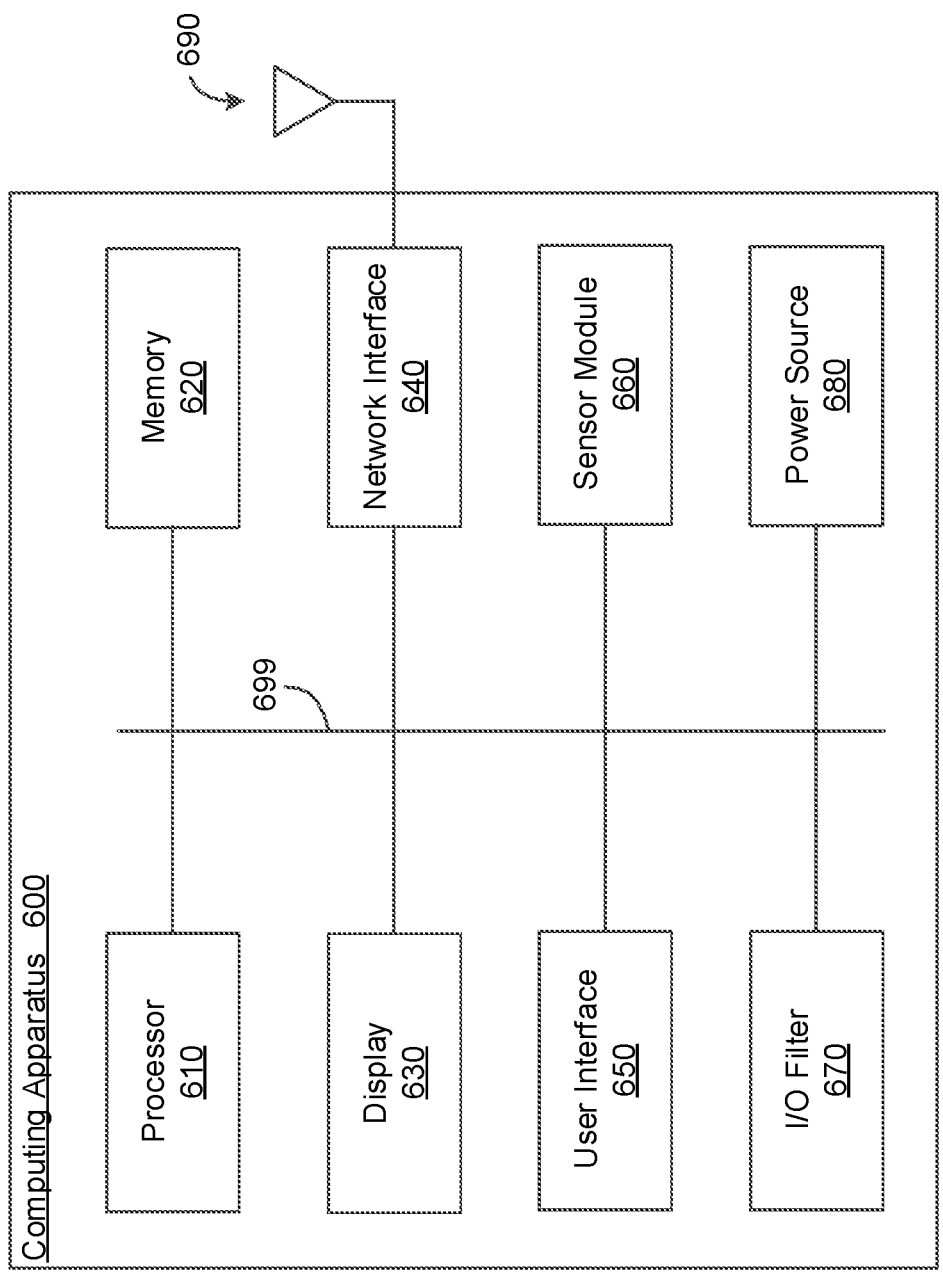
FIG. 6 illustrates an example device which may be used to implement one or more of the described features and/or components, in accordance with some example implementations.

FIG. 6 illustrates an example computing apparatus 600, features of which may be used some example implementations. It will be understood that all of the components shown in FIG. 6 need not be on the same single device or apparatus. Certain functions may be split between a vaporizer and a user device, for example. In other examples, the feature may be distributed between a user device and a vaporizer that includes two or more separable components (e.g., a charger unit and a vaporizer). For example, at least a portion of the computing apparatus 600 may be included as a portion of the vaporizer 100, the vaporizer 200, the user device 305, the remote server 307, the beacon 705, the user device 805, and/or one or more other parts of a vaporizer system. The components of the computing apparatus 600 can be implemented in addition to or alternatively from any of the components of the vaporizer apparatuses 100, 200 illustrated and/or described. Computing apparatus 600 may be implemented to perform one or more of the processes described herein.

The computing apparatus 600 may perform one or more of the processes described herein. For example, the computing apparatus 600 may be used to execute an application providing for user control of a vaporizer in communication with the computing apparatus 600 and/or to provide an interface for the user to engage and interact with functions related to the vaporizer, in accordance with some example implementations.

As illustrated, the computing apparatus 600 may include one or more processors such as processor 610 to execute instructions that may implement operations consistent with those described herein. The computing apparatus 600 may include memory 620 to store executable instructions and/or information. Memory 620 may include solid-state memory, solid-state disk drives, magnetic disk drives, or any other information storage device. The computing apparatus 600 may include a network interface 640 to a wired network or a wireless network, such as the network described with reference to FIG. 5. In order to effectuate wireless communications, the network interface 640, for example, may utilize one or more antennas, such as antenna 690.

The computing apparatus 600 may include one or more user interfaces, such as user interface 650. The user interface 650 can include hardware or software interfaces, such as a keyboard, mouse, or other interface, some of which may include a touchscreen integrated with a display 630. The display 630 may be used to display information, such as information related to the functions of a vaporizer, provide prompts to a user, receive user input, and/or the like. In various implementations, the user interface 650 can include one or more peripheral devices and/or the user interface 650 may be configured to communicate with these peripheral devices.

In some aspects, the user interface 650 may include one or more sensors and/or may include an interface to one or more sensors, such as those described herein. The operation of these sensors may be controlled, at least in part, by a sensor module 660. The computing apparatus 600 may comprise an input and output filter 670, which can filter information received from the sensors or other user interfaces, received and/or transmitted via the network interface 640, and/or the like. For example, signals detected through the sensors can be passed through the filter 670 for proper signal conditioning, and the filtered data may then be passed to the sensor module 660 and/or processor 610 for validation and processing (e.g., before transmitting results or an indication via the network interface 640). The computing apparatus 600 may be powered through the use of one or more power sources, such as power source 680. As illustrated, one or more of the components of the computing apparatus 600 may communicate and/or receive power through a system bus 699.

Any of the devices described herein may include a device lock, as mentioned herein. For example, the app (e.g., running on the user device 305) and/or the vaporizer 100, 200 may authenticate to a mobile device (e.g., user device 305) using encryption, as an anti-counterfeit mechanism. A similar scheme may be used to tie the vaporizer 100, 200 to a user device (e.g., a mobile communications device such as a phone, smartwatch, tablet, computer, etc. owned or used by the user), such that if stolen the vaporizer may be disabled to prevent others from using it. In some implementations, the vaporizer 100, 200 may connect periodically using the network interface 640 to the user device 305 to verify and/or authorize use and/or age of the user. In some implementations, a user may connect to the application on the user device 305 or computer and provide authentication to enable operation of the vaporizer 100, 200. In some aspects, the authentication includes password or PIN entry, a defined gesture (e.g., tap three times), selection of a confirmation button, a voice authentication, or a biometric authentication (e.g., facial recognition) inputted into the application using the user interface 650.

The vaporizers 100, 200 described herein may also include parental lockout (e.g., child-proofing). For example, a vaporizer 100, 200 could be 'locked' for parents who want to make sure their children or other underage users are unable to use the vaporizer. For parental lockout, in addition to Bluetooth or other relatively long range communications, the vaporizer 100, 200 may also implement a near-field communications (NFC) tag on the vaporizer. The NFC tag can implemented in the computing apparatus 600 (e.g., using the sensor module 660, network interface 640, I/O filter 670, and/or the user interface 650. The NFC tag can be configured to store and transfer information. NFC readers are built into many smartphones. One feature of NFC is that it only works in very short range, which can allow unlocking of the vaporizer to be easy for a user to accomplish. For example, a user might need only to tap an already authorized phone against the vaporizer, and the vaporizer can thereby acquire one or more authorization code(s) from the phone to unlock the vaporizer (possibly after the phone itself is unlocked in some conventional fashion by its authorized user). In some aspects, the authorized user device may activate a NFC tag of the vaporizer 100, 200 and the vaporizer 100, 200 NFC tag may communicate information and/or identification, via the network interface 640 and/or antenna 690 to the user device 305 to enable unlocking of the vaporizer. NFC tags are extremely cheap and small and may be used in addition to, or instead of, other wireless communication modes, such as Bluetooth. NFC may be used to implement some of the other features described herein.

In some implementations, authentication may occur at the vaporizer 100, 200. For example, the vaporizer 100, 200 may include a thumbprint/fingerprint sensor (e.g., as part of the sensor module 660) which enables operation of the vaporizer with a valid thumbprint/fingerprint. The vaporizer may also include other biometric sensors (e.g., as part of the sensor module 660) for authentication purposes. For example, the vaporizer 100, 200 may include sensors capable of iris recognition, face recognition, speech recognition, DNA recognition, or the like. In another example, the vaporizer 100, 200 may require a specific action/gesture to enable operation. The specific action or gesture may include a password or PIN entry, a defined gesture (e.g., tap three times), a voice authentication, selection of a confirmation button, or a biometric authentication (e.g., facial recognition). In some aspects, the processor 610 can receive these inputs from the sensor module 660 or other component of the computing apparatus 600 and determine if authentication is successful.

In some aspects, it may be beneficial to implement authentication/child lock procedures at different times or stages of vaporizer 100, 200 use to better protect against unauthorized use. The authentication/child lock procedures may be the same at each time period/stage or may be different depending on the time period/stage, or any combination of the authentication/child lock procedures described herein at the same or different time periods/stages.

For example, in some implementations the vaporizer may require a first authentication at or around the time of an initial purchase of the vaporizer apparatus 100, 200. In some aspects, the first authentication may include locking the vaporizer 100, 200 to prevent any use of the vaporizer apparatus until the consumer's age is verified and satisfies an age threshold. In some aspects, the processor 610 can perform the first authentication and/or locking in response to inputs received from the sensor module 660 or other component of the computing apparatus 600. The first authentication may comprise a single-step authentication or a multi-step authentication. The locking may occur at the manufacturer, the retailer, or at any stage during the manufacturing, distribution, or retail process. The type or manner of the first authentication may depend on the retailer, location, or manner in which the device is purchased. In some aspects, the consumer can freely use the vaporizer for a period of time after purchase (e.g., 1 day, 7 days, 30 days, etc.) before the first authentication (e.g., age verification) is required. The vaporizer may be configured to lock (e.g., disable functionality) responsive to the threshold time period expiring without completing the first authentication or completing registration of the device via a user interface by the user.

In some aspects, the first authentication and unlocking of the device may occur at the point-of-sale (POS) either online or in a retail store. For retail stores, first authentication may include the retailer checking the age and identification of the consumer. The check may include a visual inspection of the consumer's identification documentation (driver's license, passport, etc.). The check may also involve the retailer swiping or scanning a bar code, QR code, or other encryption code of the identification document to read and verify the consumer's age and/or identification.

In some implementations, the retailer may manually enter or scan in the age/identification into a computer application that verifies the identity and/or age of the consumer. For example, the retailer may be equipped with a tablet, laptop, desktop, or other computing device running an application associated with the vaporizer. In some implementations, the application may be specifically tailored to the retail store in order for the retailer to more accurately age verify and identify a consumer. The consumer or retailer may register the device using the application and provide its identification and age-related information to the application. The application may then perform the first authentication to verify the age and/or identity of the consumer. In some aspects, the application may communicate with a vaporizer application database or a third party system to complete the first authentication. In some implementations, the application retrieve the phone number associated with the consumer to verify the same phone number is associated with the phone running the application and that the vaporizer is being registered to. The application may store the consumer's information for later use. The retailer app may also communicate with one or more servers and/or databases to determine whether the consumer is associated with suspicious activity (e.g., large number of device purchases) to flag and/or block a transaction. Such tracking may beneficially identify consumers that may be attempting to resell devices to minors or other unintended users in order to bypass the first authentication or other authentication/youth prevention measures.

Online retailers may also perform the first authentication. For example, in order to purchase a vaporizer online, the consumer may be required to enter their identification information including their age. The retailer may verify the information entered is correct accessing databases containing consumer identification information (e.g., Social Security office, the department of motor vehicles, tax records, etc.) or the retailer may contract with third parties that have access to such information and can verify that consumer information entered is correct and the consumer satisfies any age threshold. The third parties can receive the consumer information on a server and the server can response to the retailer with a determination of the consumer's age/identification. The first authentication may include a multi-step authentication process where after the consumer enters its information (e.g., contact information), the retailer, manufacturer, or the like sends a code to the consumer (e.g., via the application, text message, email message, or the like) for the user to enter before the purchase can be completed. In some aspects, the consumer and/or retailer enters the code when the vaporizer pairs to a smart phone, tablet, computer, or other computing apparatus. If the consumer and/or retailer enters the correct code, the sale may be authorized, if not, the sale transaction may be terminated. In some implementations, the information the consumer uses can be stored to create a user profile. The user profile can be stored at the vaporizer, the application, a server, or other computing device.

In some implementations, the retailer (online or in-store) may be authorized to unlock the phone after the first authentication. For example, the manufacturer, vaporizer company, distributor, or other entity may provide to the retailer a code or PIN to unlock the vaporizer apparatus after a successful first authentication check. The code may be provided to the retailer through a computer application, text message, email message, printed document, or the like. In some aspects, the code may be predetermined or randomly generated. The predetermined code may be based on a unique characteristic of the vaporizer (e.g., a serial code, manufacturer code, or the like). The code may also only be valid for a certain period of time after generation. In some aspects, the retailer may have access to an application that wirelessly communicates with the vaporizer apparatus. The application may prompt the retailer to confirm the results of the first authentication and the application may then send the code to unlock the device to the retailer via the application interface, a text message, an email message, or the like. The retailer may then enter the code on the vaporizer apparatus or on the application that communicates with the vaporizer apparatus to unlock the vaporizer for the consumer's use. For example, after the retailer receives a message with the code, the retailer may enter the code on its vaporizer application. The application then transmits a signal to the vaporizer which unlocks the vaporizer.

In some aspects, the consumer may be provided the code to unlock the device. For example, the consumer, once it receives the vaporizer apparatus may register the vaporizer online via a webpage or on an application running on the consumer's smart phone, tablet, laptop, or other computing apparatus. After authorizing the consumer in some fashion (e.g., by checking authorized identification to ensure the consumer is at or above legal age), the webpage or apparatus may provide the code to the user via the webpage or application interface, a text message, an email message, or the like. The consumer may enter the code on an interface/input of the vaporizer to unlock the vaporizer. In other aspects, the consumer can enter the code on a webpage or application that is communicatively coupled to the vaporizer and the webpage or application can unlock the vaporizer by sending a signal to the vaporizer to unlock it for use of the consumer. In some aspects, the consumer enters the code when the vaporizer pairs to the consumer's smart phone, tablet, computer, or other computing apparatus.

In some implementations, the application or webpage may require further inputs for completing the first authentication. For example, the application may require a fingerprint to launch the application and/or to authorize the use of the vaporizer. In some implementations, a fingerprint sensor on the vaporizer apparatus may receive the fingerprint of the consumer and send the received input to the application. In other examples, a fingerprint sensor on a smart phone, tablet, laptop or other computing device may send the fingerprint information to the application. In some aspects, the application may store the fingerprint information in a database for future retrieval. While fingerprints are described in some examples, the concepts may equally apply to other biometric feedback, such as a retinal scan or facial scan and analysis.

Additionally, the application and/or webpage may perform further verifications for completing the first authentication. For example, the application or webpage, after receiving the consumer's age and/or identity information, may perform a check to determine whether the user and/or a user profile associated with the received consumer information is linked to suspicious activity. For example, the application or webpage may communicate with a server and/or database to determine whether a number of vaporizers devices associated with the consumer satisfies a threshold. In some implementations, if the number of vaporizers satisfies the threshold, the application and/or webpage may flag or identify the consumer as an unauthorized reseller of vaporizer and block the transaction.

In some implementations, the application and/or webpage can initiate a live chat where the consumer can provide their identification documentation (e.g., driver's license, passport, etc.) to a live person on the other side of the communication to verify identification and/or age of the consumer. Additionally, the application and/or webpage can be configured to accept a scan of the identification documentation and/or of a magnetic strip of the identification documentation to be analyzed by the application and/or webpage or by a person reviewing the identification documentation.

After the initial purchase of the vaporizer apparatus, it may be desirable to ensure that the vaporizer 100, 200 will be used only by its intended consumer. For example, if the vaporizer is lost or stolen after the first authentication (e.g., purchase authentication), a second authentication to use the vaporizer may prevent undesirable users (e.g., under-age children, thieves, etc.) from using the vaporizer. Accordingly, the vaporizer may require a second authentication after the first authentication to allow use of the vaporizer. The second authentication may occur at or around the time when the consumer attempts to use the vaporizer for the first time. In some aspects, the consumer can freely use the vaporizer for a period of time after purchase (e.g., 1 day, 7 days, 30 days, etc.) before the second authentication (e.g., age verification) is required. In some aspects, the processor 610 can perform the second authentication and/or locking in response to inputs received from the sensor module 660 or other component of the computing apparatus 600.

In some aspects, the second authentication may take place at the application running on a user device in communication with vaporizer. The application may be on the consumer's smart phone, tablet, laptop, watch, wearable device, or other computing apparatus. For example, the second authentication can include a fingerprint authentication. In some aspects, the vaporizer can be authorized if the fingerprint input during the second authentication matches the fingerprint analysis during the first authentication. The consumer may input its fingerprint using the fingerprint sensor on the vaporizer or a fingerprint sensor on a computing apparatus in communication with or running the application (e.g., smart phone, tablet, etc.). In some implementations, the second authentication can include other biometric information of the consumer to confirm the same user is using the device as during the first authentication.

In some aspects, the second authentication can be correlated with user information or a user profile created at or before the time of the second authentication. For example, during the first authentication, the consumer may enter their age information (e.g., scanning driver's license, manually typing birthday in application, etc.) along with a first fingerprint sample. During the second authentication, the consumer may input a second fingerprint sample. If the second fingerprint sample matches the first fingerprint sample, the vaporizer and/or the application can correlate the age information of the consumer entered during the first authentication to verify the age of the consumer during the second authentication.

In some implementations, the computing apparatus running the application can be used to provide the second authentication. For example, the vaporizer may remain in a locked position unless the vaporizer apparatus is within a certain proximity of the computing apparatus running the application. In some aspects, the application may be running a consumer's smart phone and the vaporizer remains locked until the smart phone is within a proximity threshold with the vaporizer.

Additionally, the vaporizer may be in an unlocked state within the proximity threshold and may transition to a locked state when a distance between the vaporizer and the user device running the application moves outside the proximity threshold. In some aspects, the transition to the locked state may be based on a time threshold during which the vaporizer and smart phone are outside the proximity threshold. The time threshold may include a pre-programmed time threshold or may include a user-selected time threshold. For example, the user may enter the time threshold on the application running on the user's smart phone.

In some aspects, a user carrying the user device may walk (or otherwise move) away from the vaporizer. Once the user and the smart phone move outside the proximity threshold, a timer may run on the application and/or the vaporizer. Once the timer satisfies the time threshold, the vaporizer may transition to the locked state. In some aspects, the vaporizer and/or computing apparatus may detect the proximity through Bluetooth, near-field communication (NFC), WiFi, ultrasound, ZigBee, RFID, cellular communication, or any other wireless communication. In some implementations, the vaporizer might time out after a certain set time of unlocked use after the second authentication, and require a similar second authentication to begin authorized use again.

The proximity locking and unlocking described herein may comprise a step in a multi-step authentication. For example, the proximity detection may be correlated with additional identification information to verify that the vaporizer is owned by the user (e.g., registered to the user) and/or the smart phone application is associated with the same user. The proximity detection may also be correlated with age verification information to verify that the user that owns the vaporizer, and/or is associated with the application, satisfies an age threshold. In some aspects, the application may store a user profile of the user which stores age verification information such as birth date and age threshold information.

The user profile may also include a maximum number of vaporizers that the user is authorized to use. For example, to prevent a single user from authorizing multiple devices for later resell to minors or other undesired consumers, the user profile may specify that the user may only be associated with a single vaporizer at a time. For example, if the user own multiple vaporizers and the smart phone application pairs with a first vaporizer, the other vaporizers owned by the user may be locked. In some aspects, the smart phone application may send a signal to the other vaporizers to lock the vaporizers. In other aspects, every time the application and a vaporizer is paired, the application and/or vaporizer may perform a check to determine if the user is associated with another vaporizer that is currently unlocked. If so, the application may first lock the other vaporizer and/or unpair with the other vaporizer before pairing with the current vaporizer.

In some implementations, the vaporizer may be pre-programmed to pair with a specific user account/profile. For example, the user may order a vaporizer using the application which has age verified the user. The ordered vaporizer may be configured to pair with the user profile that ordered the vaporizer. In some aspects, the vaporizer may be configured to only pair with the pre-programmed user profile which may reduce or eliminate further re-authentication.

Age verification may also be correlated with location information to determine whether the user satisfies an age threshold. For example, the vaporizer and/or application may receive global positioning system (GPS) information for identifying a location of the vaporizer and/or application. In some aspects, the age threshold may be based on a geographic location such as a particular country, state, city, county, and/or the like. If the age threshold has changed based on the location of the vaporizer and/or application, the vaporizer and/or application may re-authenticate the user based on the updated age threshold.

Performing such multi-factor authentication with proximity detection may reduce the likelihood of underage and/or unauthorized use of the vaporizer. Additionally, correlating proximity and/or location information with age verification and/or identification information may allow more flexibility to preventing vaporizer operation in designated areas.

In some aspects, the second authentication can be completed electronically without the need to download the application. For example, a user can visit a website to register the device and/or age verify. In some aspects, the user can enter his/her device serial number and then be asked to age verify (e.g., entering identity information, live chat, scan identification documentation, or using any of the methods for authentication described herein). After successful age verification, the user can receive a passcode from the website. In some implementations, each passcode is a random number associated with that serial number (such as a hidden extra 4 digits to the serial number). After receiving the passcode, the user can then pair the vaporizer to either his/her user device, for example by Bluetooth or some other communication protocol. The pairing can require the website passcode (e.g., 4-digit or multi-digit passcode), or another passcode, to complete pairing. If the correct passcode is entered, and the pairing is successful, then the device can be unlocked.

In some aspects, a dongle may be used to provide the second authentication. In some aspects, the dongle may comprise any hardware apparatus that connects with the vaporizer or other computing apparatus to provide additional functionality. For example, the dongle may function as a communication bridge between the vaporizer and the application, or another computing apparatus. In some implementations, the dongle can be connected to a computing apparatus that does not run the application that communicates with the vaporizer. The user can then communicate with the vaporizer on the computing apparatus through the use of the dongle. Additionally, in some aspects, the application running on the computing device may lose communication with the vaporizer. The application can then communicate with dongle and the dongle can communicate with the vaporizer. In other implementations, the dongle can be configured to provide a code to authorize operation of the vaporizer and/or communication with the vaporizer. For example, the dongle can be configured to provide a randomly generated number or pattern for a user to enter into the application and/or vaporizer to authorize operation. In some aspects, the code generated by the dongle can be set to expire after a certain time period (e.g., after 60 seconds, 5 minutes, an hour, etc.). Thereafter, additional use of the vaporizer would require a further new authorization code.

In some implementations, the vaporizer and/or the smart phone can provide an indication that the vaporizer is unlocked. For example, the vaporizer and/or smart phone can output an audio, visual, haptic or other indication that the vaporizer is unlocked and ready for use by the user. The audio indication can include a beep, a click, a song, or any other sound. The visual indication can include a light, a color, a pattern of lights, a series of flashing lights, or any other visual indication. The haptic indication can include a vibration pulse, a series of vibration pulses, a pattern of vibrations, or any other haptic indication.

Figure 7:
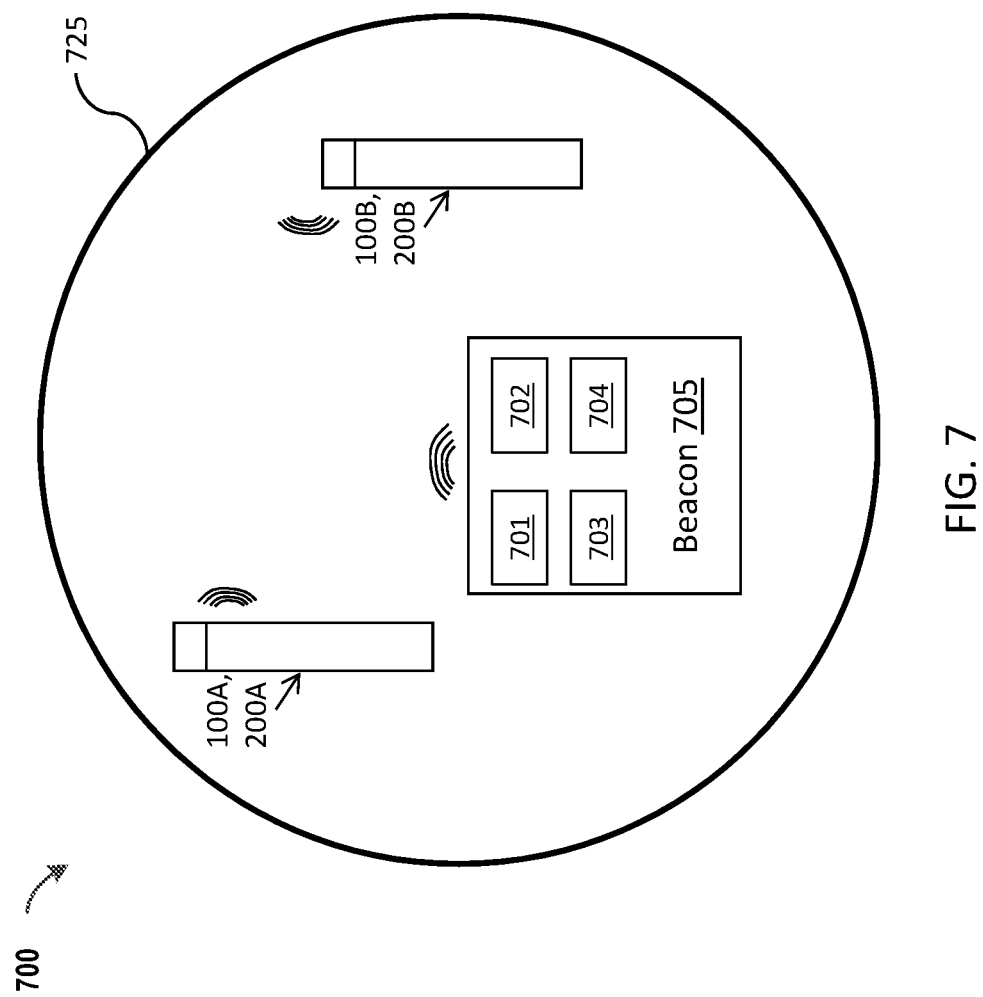
FIG. 7 illustrates a diagram of communication among one or more vaporizers and a beacon, in accordance with some example implementations.

In some aspects of the current subject matter, the second authentication (or authentication overall) can be based on the location of the vaporizer. For example, certain locations can be equipped with hardware ("beacons") configured to alter the operation of a vaporizer located within a communication range of the beacons. FIG. 7 illustrates a diagram 700 of communication exchange among vaporizers 100A, 200A, 100B, 200B and a disabling beacon 705, in accordance with some example implementations. As shown in FIG. 7, the beacon 705 comprises, a transceiver 701, a processor 702, a memory 703, and network interface 704. In some aspects, the processor 702 can be configured to execute instructions that may implement operations consistent with those described herein. The memory 703 to store executable instructions and/or information. Memory 703 may include solid-state memory, solid-state disk drives, magnetic disk drives, or any other information storage device. The network interface 704 can be configured to interface with a wired network or a wireless network. In order to effectuate wireless communications, the network interface 704, for example, may utilize one or more antennas and/or transceivers, such as transceiver 701.

In some implementations, the beacon 705 can be installed at a location where there may be an increased sensitivity to unauthorized or undesired vaporizer use (e.g., a school, high-youth areas, inside at restaurants, on a commercial airplane or other public transportation vehicle, etc.). In some aspects, the beacon 705 can be configured to disable vaporizers within a communication range 725 of the beacon 705. As shown in FIG. 7, the vaporizers 100A, 200A, 100B, 200B are located within the communication range 725 and can be disabled by the beacon 705. In some implementations, the beacon 705 can be configured to transmit a broadcast message via the transceiver 701 and/or network interface 704. The vaporizers 100A, 200A, 100B, 200B can receive the broadcast message over a network and the controller 105, 205 can be configured to disable operation of the vaporizer in response to receiving the broadcast message.

In some implementations, the beacon 705 and/or broadcast message disabling the vaporizers 100, 200 can be overridden by undergoing further age verification (e.g., second authentication, as described in the various embodiments herein). For example, an of-age consumer enable their vaporizer even though a vaporizer 100, 200 is within the communication range 725 by performing any of the authentication procedures described herein (e.g., entering a code, using a phone app, biometric identification, etc.). For example, the beacon 705 may send a communication to the vaporizers 100A, 200A, 100B, 200B and/or consumer vaporizer application notifying the consumer that the vaporizers 100A, 200A, 100B, 200B are within the communication range 725. In some aspects, the vaporizers 100A, 200A, 100B, 200B and/or consumer vaporizer application can display an indication indicating that the vaporizers 100A, 200A, 100B, 200B are locked. Once notified, the user of the vaporizers 100A, 200A, 100B, 200B can login to the vaporizer application and/or use the vaporizers 100A, 200A, 100B, 200B, to perform the second authentication to re-enable operation of the vaporizers 100A, 200A, 100B, 200B while still within the communication range 725.

In other aspects, the vaporizers 100A, 200A, 100B, 200B and/or the vaporizer application may detect the beacon 705 and notify the consumer in order for the consumer to complete the second authentication or any other authentication to enable use of the vaporizer within the beacon communication range 725. For example, the vaporizers 100A, 200A, 100B, 200B and/or the vaporizer application may transmit a communication searching for other devices in a communication range of the vaporizers 100A, 200A, 100B, 200B and/or vaporizer application. In some aspects, the beacon 705 can receive the communication from the vaporizers 100A, 200A, 100B, 200B and/or vaporizer application and respond with a communication disabling the vaporizers 100A, 200A, 100B, 200B. The user may then perform second authentication to re-enable the vaporizers 100A, 200A, 100B, 200B within the communication range 725.

In some implementations, the beacon 705 can be geo-fenced so that the beacon 705 operates within certain locations. Such geo-fencing can help prevent the beacon 705 from being transported to a different location where disabling vaporizers is not desired. In some aspects, the processor 702 and/or memory 703 can be configured to retrieve geo-location information to determine the location of the beacon 705 and whether the beacon 705 is authorized to operate in that location. If the beacon 705 is outside its authorized region, the processor 702 operating instructions from memory 703 can be configured to disable operation of beacon 705. The hardware beacon 705 may beneficially provide additional security/safeguards against under-age vaporizer use in high-risk areas (e.g., school zones).

In some implementations, beacons 705 can also be configured to track and/or report vaporizers 100, 200 within the communication range 725 of the beacons 705. For example, an application in communication with one or more beacons 705 may be configured to show a list or graphical representation of the vaporizers within the communication range 725 of the one or more beacons. For example, the graphical representation can comprise a map showing an indication of the vaporizers 100, 200 within the communication range 725. The map or user interface can also include additional information relating to the vaporizers 100, 200 (e.g., serial number, model number, etc.) and/or a user associated with the vaporizers 100, 200 (e.g., birth date, age, enrolled school, etc.) This tracking can allow an administrator of the application or entity (e.g., school) to monitor which vaporizers are located within an area and if any have be authorized for use within the area. For example, a principal of a school may monitor the vaporizers present within the communication range 725 of the one or more beacons 705 to determine if any vaporizers 100, 200 associated with a student of the school have been used or activated within the communication range 725. In some aspects, the application can allow the principal or authorized administrator to report any undesired or unauthorized vaporizer use to authorities and/or the manufacturer to improve prevention of unintended use. Additional, information about unauthorized use of a vaporizer in the region can also be transmitted to the actual authorized owner and/or user of such vaporizer (e.g., a parent).

In some implementations, the beacons 705 can be configured to unlock vaporizers 100, 200 within the communication range 725. For example, the vaporizers 100, 200 can be configured to be locked in locations outside the communication range 725 and the beacon 705 communications can be configured to unlock the vaporizers 100, 200. Such an example can be used as designated "smoking sections" of areas where vaporizer use is generally prohibited (e.g., schools, airports, etc.).

In some implementations, rather than hardware beacons 705 installed at certain locations, beacon functionality can be installed on an application running on a user's smart phone, tablet, computer, or other computing apparatus ("application beacon"). Similar to the hardware beacons 705, the application beacon can be configured to alter the operation of a vaporizer within a communication range of the application beacon. For example, all vaporizers within the communication range of the application beacons can be disabled or can require additional age verification (e.g., second authentication) to unlock use of the vaporizer while within the communication range.

The vaporizers 100, 200 may include or be connected to a "youth prevention device" (YPD) configured to lock out the vaporizer's vapor production function responsive to an encounter with a youth prevention beacon device (e.g., beacon 705 and/or beacon 805). The YPD may include the controller 105, 205, the app, or any other component of the vaporizers 100, 200, the user device 305, the remote server 307, and/or the computing apparatus 600. For example, vaporizers 100, 200 with a YPD may enable a "youth prevention feature" (YPF) in which the vaporizers 100, 200 may be shut down (e.g., vapor production disabled) for 30 minutes (or another time period) when the vaporizer comes within range of a youth prevention beacon device. The YPD may be configured with security for vaporizer shutdown. Security measures may be implemented to ensure that unauthorized parties cannot arbitrarily exploit the YPD shutdown feature to otherwise impede or disrupt services for users for whom usage should not be deauthorized.

In some embodiments, a youth prevention device's ability to act upon vaporizers 100, 200 may be dependent on the age verification status of the vaporizers 100, 200. For example, a registered and age-verified vaporizer 100, 200 may be "invisible" from YPDs. Youth prevention features may be enabled by default (e.g., after device reset) but may change and/or update when a user age verifies. A vaporizer 100, 200 connected with the app where the user is age verified, may be opted out of youth prevention device programs (for a specific, limited number of devices—limited by the number of devices that may be associated with a user account). A youth prevention advertising shutdown mode may include strong security to prevent the hacking and disabling of youth prevention features by third parties.

The vaporizer 100, 200 may be configured such that responsive to a user unlinking the vaporizer 100, 200 from the user's age-verified account, the youth prevention device features may be reactivated. The vaporizer 100, 200 may be configured such that the security protocols to prevent hacking may not be disabled. As such, the youth prevention feature may only be deactivated with a shared secret challenge or other security/authentication measure.

The vaporizer 100, 200 may be configured to minimize battery impact of YPD features by providing low-power advertising for detection by youth prevention beacon devices. The vaporizer 100, 200 may be configured, by default, to broadcast an advertisement with specific vaporizer information, manufacturer information, and/or user information for reception by youth prevention beacons. Youth prevention beacons may be configured to monitor and record the broadcast advertisement such that administrators may identify underage users and provide counseling services.

The vaporizer may be configured such that if a user misplaces or otherwise is no longer in possession of a vaporizer 100, 200 that was previously authenticated (and thus not currently subject to youth prevention device" (YPD) features) or otherwise wishes to de-authenticate the vaporizer 100, 200, he or she may release the device from his or her user-associated account, such that the device may be factory reset to include enabling YPD features. YPD features may be optionally disabled by the beacon responsive to a user relinking the device to a different account. If a lost (un-linked) device is re-paired to a user app with an age verification, the device may be factory reset and YPD features may be enabled again, unless the device is locked.

In some implementations, the vaporizer 100, 200 may be configured for authentication in connection with the hardware beacons 705 and application beacons 805 described herein. For example, the user device may be prompted when the vaporizer 100, 200 is located within a communication range of a hardware beacon and/or an application beacon. In some aspects, the hardware and/or application beacons can be implemented in high-risk areas for under-age or unauthorized use (e.g., schools, playgrounds, youth centers, etc.). In other aspects, authentication may include proximity detection based on location information. For example, the user device and/or vaporizer 100, 200 may receive GPS, or other location information, indicating that the vaporizer 100, 200 and/or user is within a proximity threshold of certain location (e.g., schools, playgrounds, youth centers, etc.). If the vaporizer 100, 200 is within the proximity threshold, the vaporizer 100, 200 may lock or the user device may be configured to lock the vaporizer 100, 200. In some aspects, the user may re-authenticate in order to unlock the vaporizer 100, 200 within the proximity threshold. In other aspects, the user may be restricted from unlocking or operating the vaporizer 100, 200 within the proximity threshold.

In addition to locking the vaporizer 100, 200, the YPD and/or the app may be configured to receive inputs from a user reporting that a vaporizer 100, 200 was lost, stolen, that the vaporizer 100, 200 was used by an underage individual, and/or the like. The user may also report retailers suspected of selling to minors, locations where underage use is suspected, and/or the like. The user may provide any other relevant information in a field of the user interface (e.g., counterfeit, location, retailer, serial number, pod/cartridge ID, individuals, and/or the like). FIGS. 14A-14F illustrate example user interface screen views that may appear in an app installed on a communication device. The user interface screen views of FIGS. 14A-14F relate to reporting features that can be used on a mobile device that need not be paired with a vaporizer. It will be understood that while these screen views are shaped and sized consistent with the dimensions of a mobile device such as a smart phone, the indicated user interface functionality may be implemented on any computing device, such as for example a tablet, desktop or laptop devices, etc.

Figure 14A:
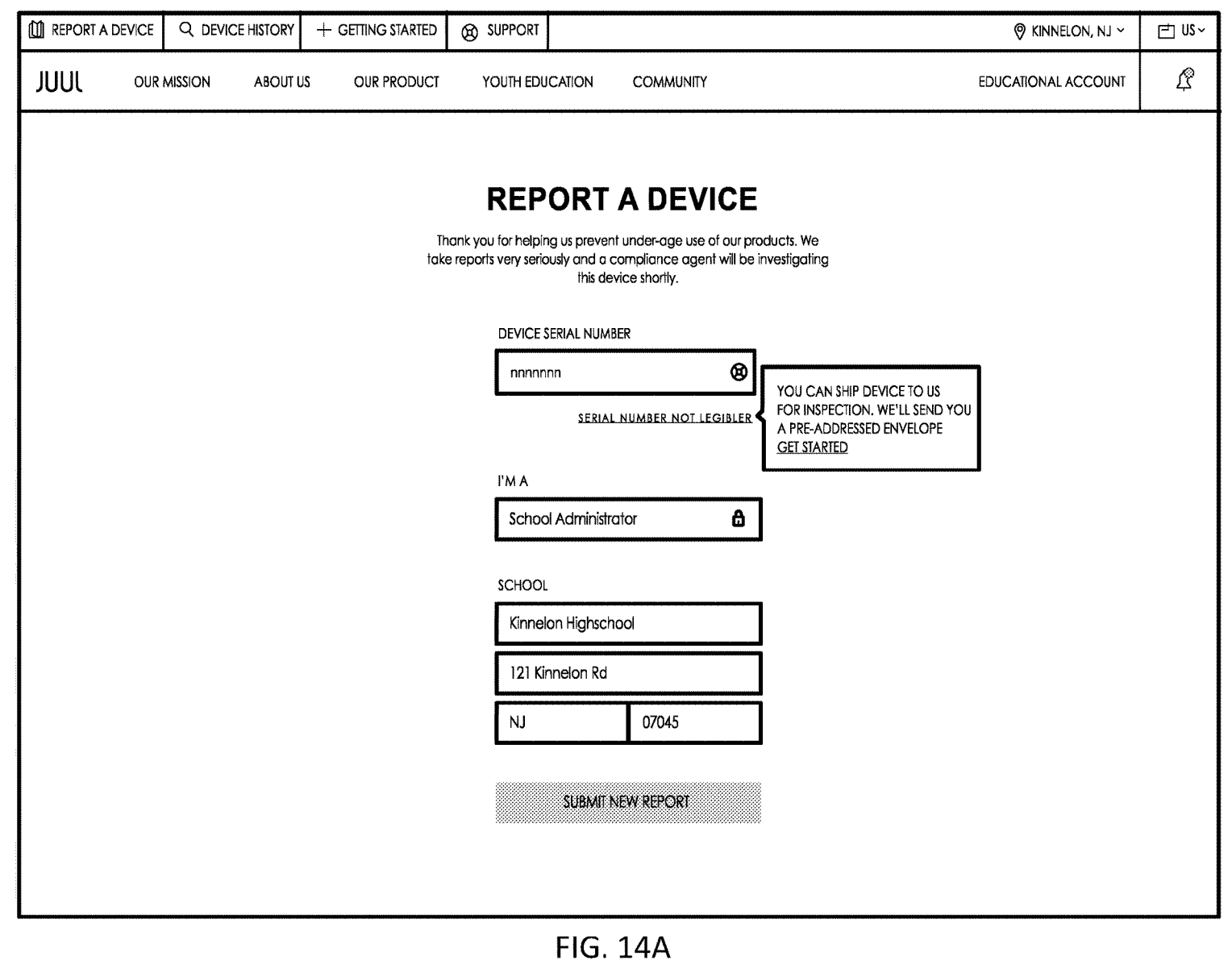
Figure 14B:

FIG. 14A and FIG. 14B show screen views via which a person may report a vaporizer (referred to on the view as a "device" that is being used by an unauthorized user (e.g., a minor). The views allows for entry of a serial number and includes a data entry option (here a pull down or scroll menu, but optionally any kind of input including a free text input) for the reporting person to indicate his or her title or other identifying information. For use of this functionality in a school settings (e.g., if the features are used for interdicting usage of vaporizers but underage users at schools), the title may be "school administrator" or "teacher" or "counselor" or the like. The view also includes fields for entry of identifying information about the school and a "submit" user interface element to allow the entered data to be transmitted to a server for analysis, aggregation, etc. The views may include a user interface element for providing guidance to the user regarding how to find the device serial number and optionally instructions for sending the device to a location where it can be analyzed to determine its provenance.

In FIG. 14C and FIG. 14D, the screen views show an example of an invalid serial number being entered. Here, the user interface may query the user to double check the serial number and if it is verified as correct relative to the confiscated vaporizer, the user may be prompted to report it as a counterfeit vaporizer, which can trigger other steps. If the device is identified as counterfeit, the screen view of FIG. 14E may prompt the user to enter any further information available, such as a place and date of purchase, etc. and may add a prompt to request that the user send the device top the manufacturer or some other location for analysis and investigation. FIG. 14F is an example of a "thank you" screen view.

Such reported information may be combined, aggregated and analyzed to track and determine where unauthorized and/or unwanted use of the vaporizer is occurring and what individuals and/or entities are involved. For example, after receiving a threshold number of reports associated with a certain retailer or a certain location, the vaporizer system may be configured to disable pods sold from the retailer over a given time period, send a warning to the retailer, lock/disable one or more vaporizers 100, 200, and/or take any other remedial action. In some aspects, the disabling and data aggregation may be performed by one or more servers in communication with the app, the user device, and/or the vaporizer 100, 200.

The vaporizer system may also combine the reported data with information obtained from individual vaporizers across a population, information regarding users and user profiles, usage profiles, user accounts, social media accounts, websites, crime reports, and/or the like. The combined information may be presented on a dashboard, or other user interface, on a user device and/or app. The dashboard may be accessed by administrators, parents, police, security to monitor underage use, unauthorized use, counterfeit products, and/or the like. For example, the vaporizer system may retrieve information from a school reporting underage use of vaporizers. The vaporizer system may correlate that information with information from social media (e.g., Tweets, Facebook posts, hashtags, etc.) associated with underage use (e.g., social media accounts mentioning vaporizers, pod flavors, usage, locations, retailers, and/or the like). This combined data may be further analyzed to find trends, patterns, and/or indicators of underage use. By tracking and tracing underage youth to the source, schools, parents, retailers, manufacturers, and/or the like may take action, initiate programs, lock vaporizers 100, 200, and/or the like to prevent underage use.

Retailers may also have access to a dashboard indicating reports of underage use associated with products sold at the retailer and/or its affiliates (e.g., a serial number, a distributor or an employee). The dashboard may include a map or graphic showing a location where the reports occurred, the data source for the reports, a number of reports, a time of the report, a reputation of a data source, other reports filed by a user or data source, social media posts, comments associated with a report, and/or the like. FIGS. 15A-15E and 16A-16H (described below) illustrate example user interfaces for tracking reports and other data indicating underage use, retailers, locations, comments, investigations, prevention actions, lock vaporizers 100, 200, and/or the like.

FIG. 15A to 16H show example screen views that may be displayed on any computing device to visually display data outcomes based on data reported via approaches discussed herein as well as other approaches. It will be understood that these screen views may be displayed on any type of computing device.

Figure 15A:
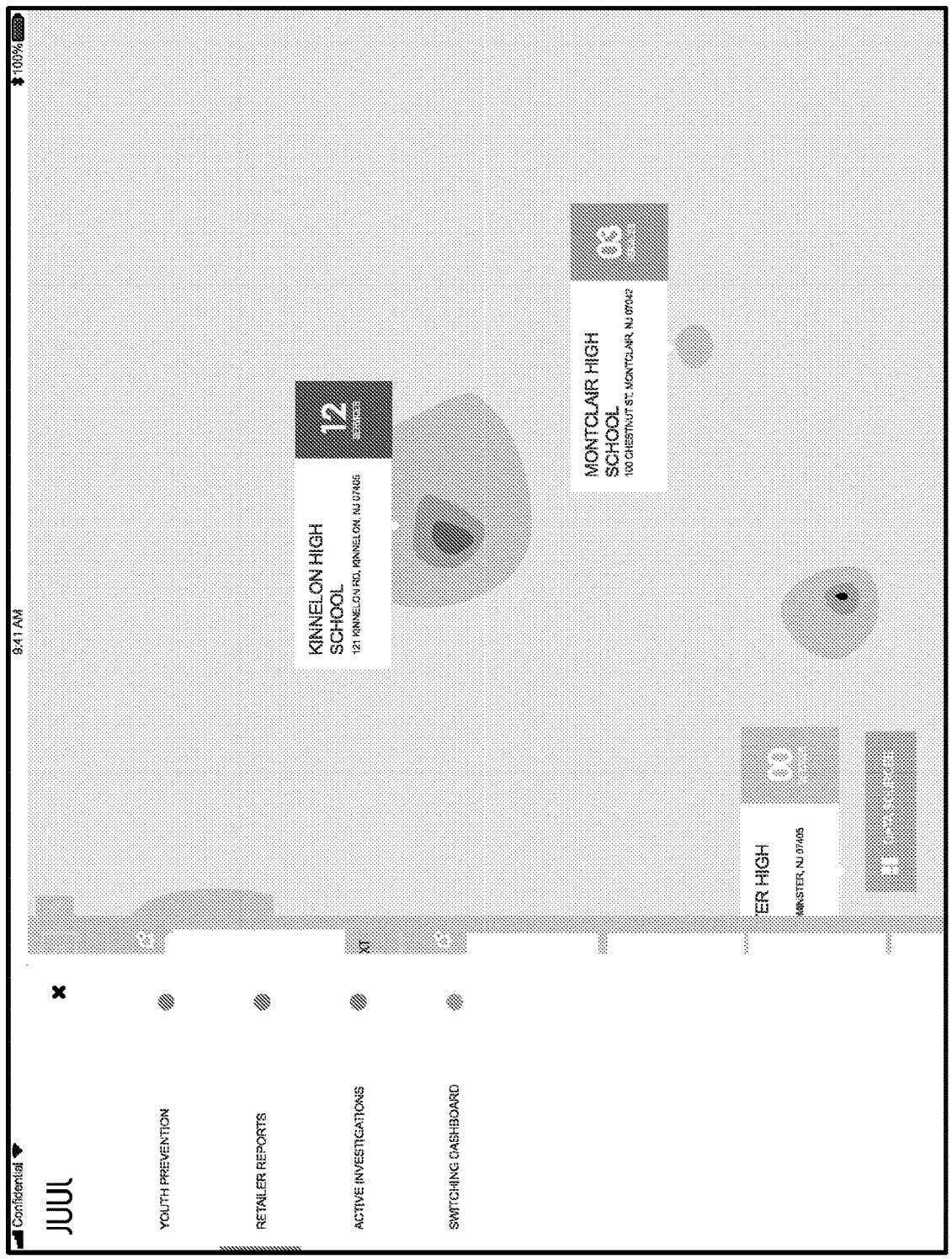
FIGS. 15A-15E illustrate features of exemplary user interfaces for an application that may be used with a vaporizer consistent with implementations of the current subject matter.

The screen view of FIG. 15A shows a map view that includes markings of schools with various overlay options allowing a user to select data types to be shown on the map in relation to one or more locations. The overlay can include a heat map type view that illustrates frequencies of different occurrences determined based on data collected. Sources of data for collection can include (without limitation) school reports (e.g., as could be entered via the above-discussed screen views), retailer data (e.g., number of sales at a given location, tracking information regarding sales sources of confiscated vaporizers, etc.), social media data (e.g., data relating to estimated ages and demographics of social media users discussing vaporizers and/or their use relative to estimated locations of those social media users), secret shopper data (e.g., data on unauthorized or insufficiently authorized sales to undercover investigators who attempt to purchase vaporizers from retail locations, regulatory reports (e.g. from the FDA or the like), etc. The screen view may also include a data insights sub-view that can display information about recently added data, trends, etc. Clicking on a given school location can enable drill-downs on specific data types. Screen views of this type can be used to develop strategies around prevention of vaporizer use by underage users, for example by easily displaying geographic correlations between school confiscations, social media, illicit sales activity, etc.

Figure 15B:
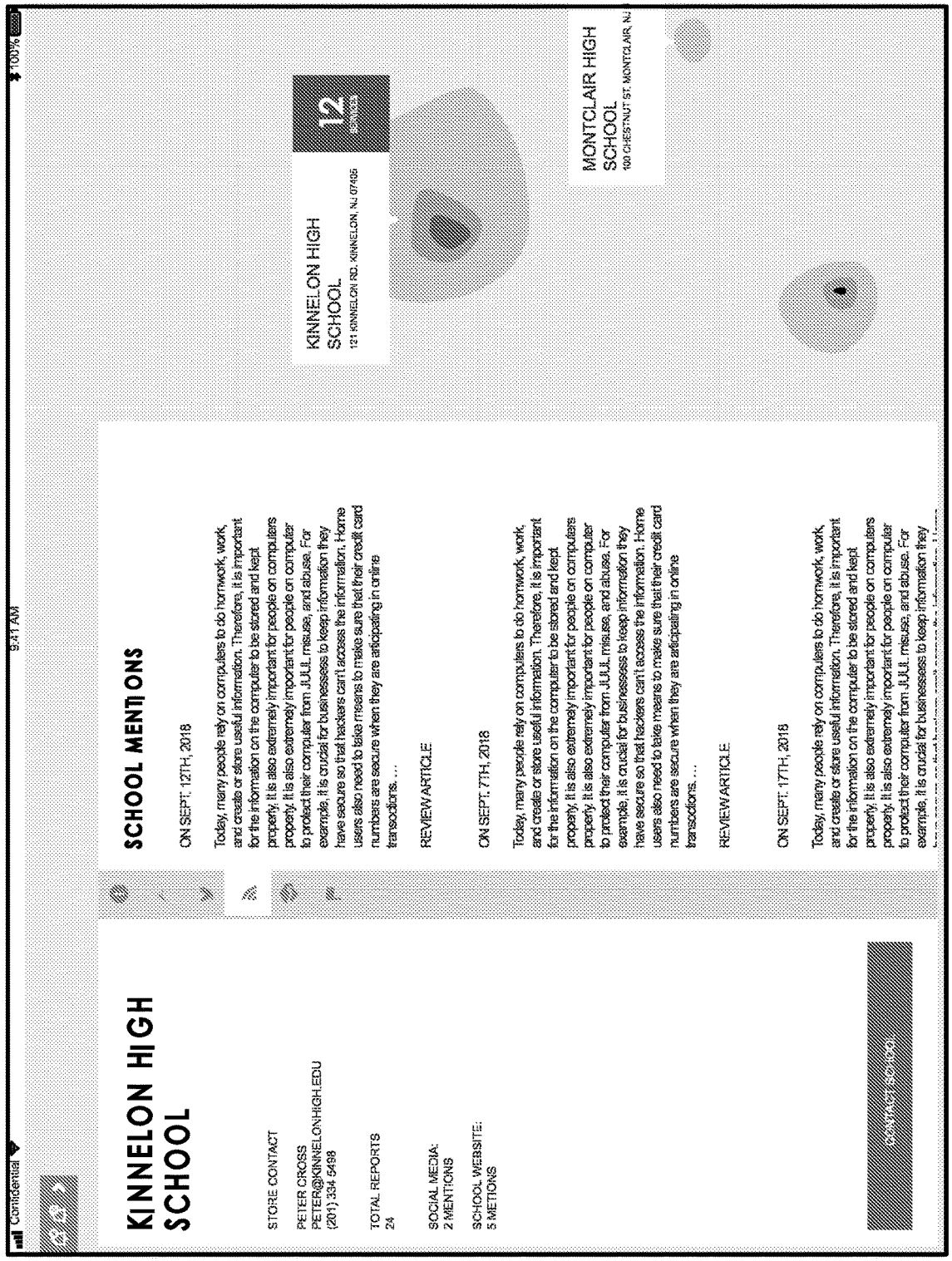
Figure 15C:
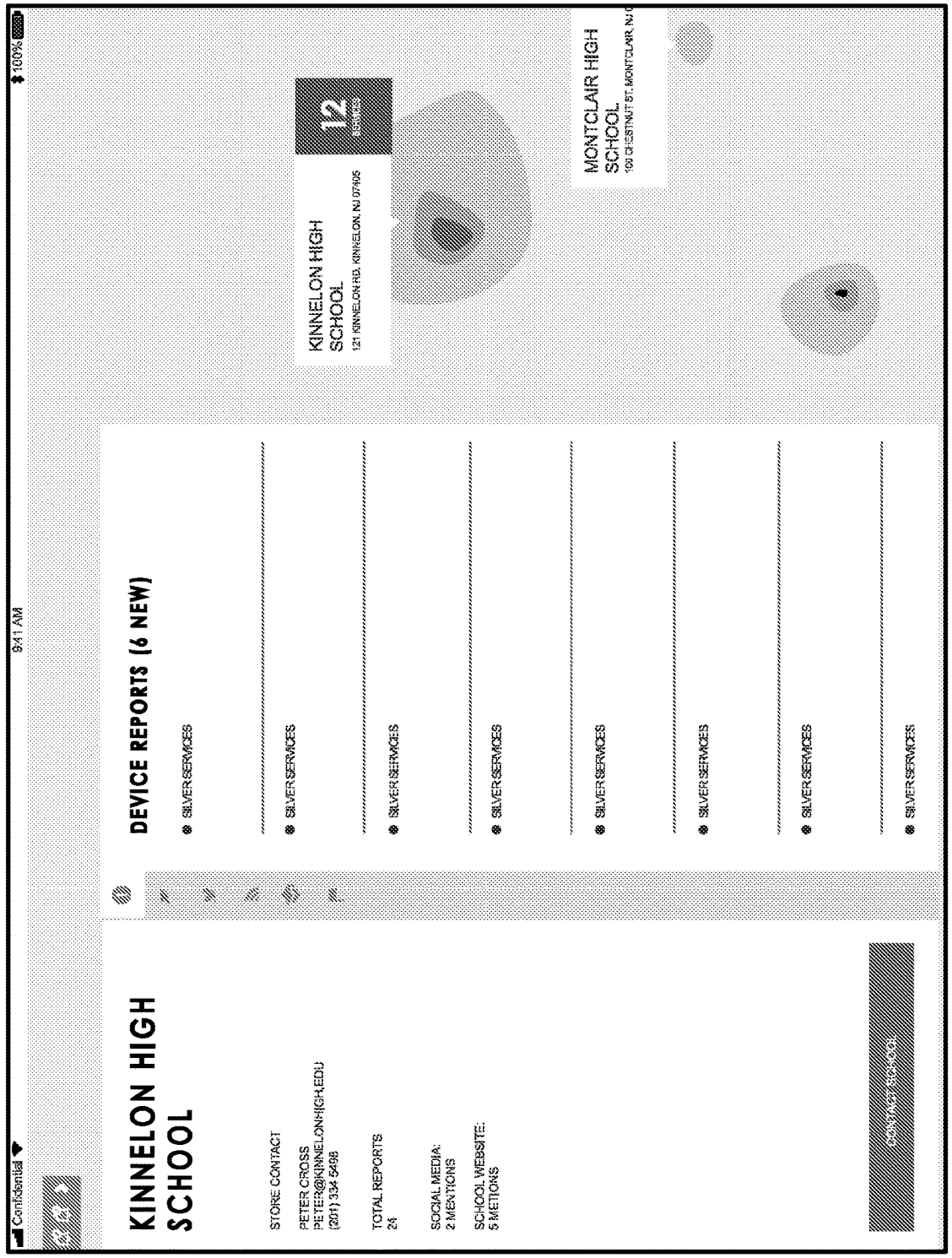
Figure 15D:
Figure 15E:
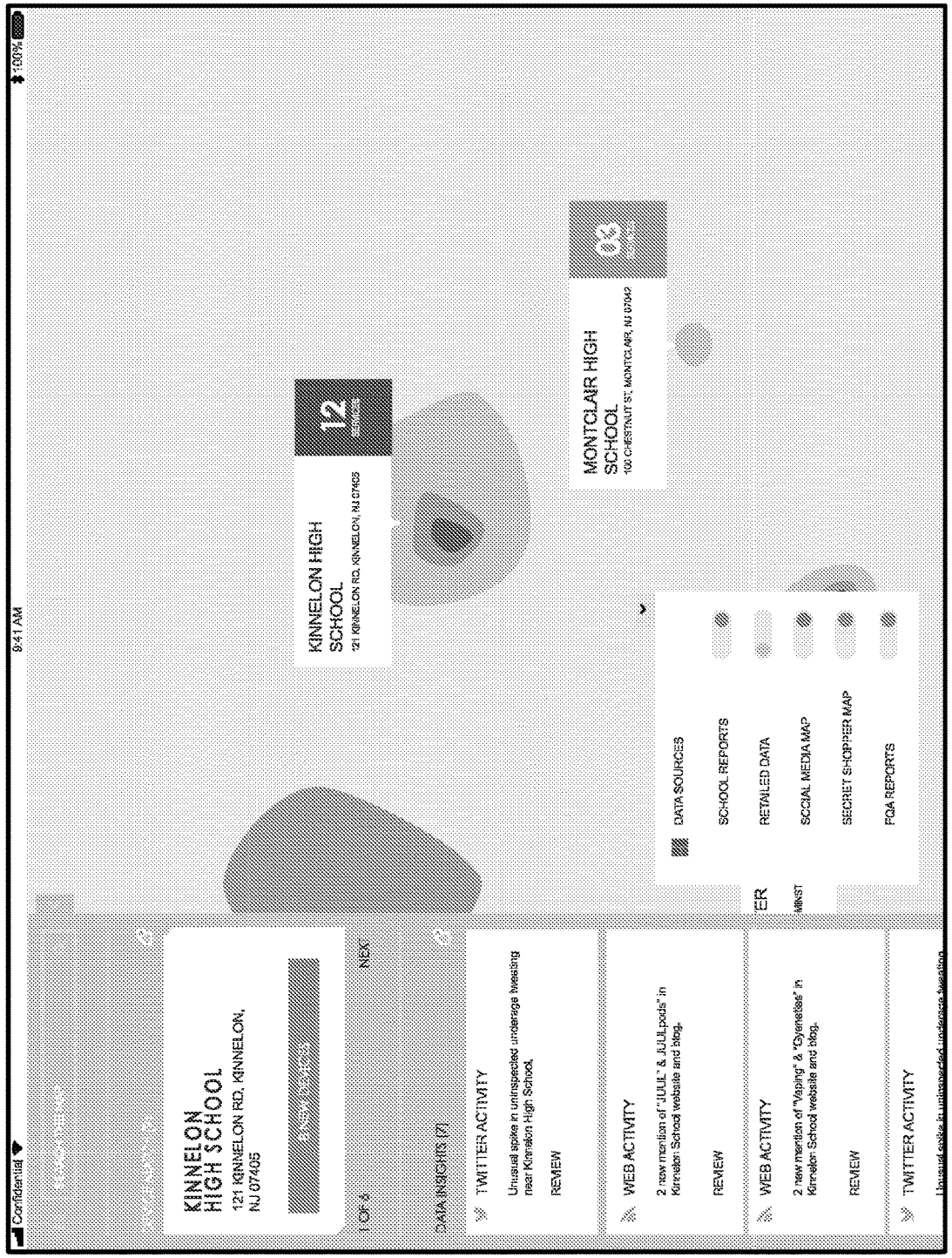

The screen view of FIG. 15B shows an example of a news feed for mentions of a given school in relation to vaporizers and/or underage usage of such devices. The screen view of FIG. 15C shows a summary of confiscated device reports for a selected school location. The screen view of FIG. 15D shows the maps with heat maps but no other data, and the screen view of FIG. 15E shows the maps with highlighted social media information.

Figure 16A:
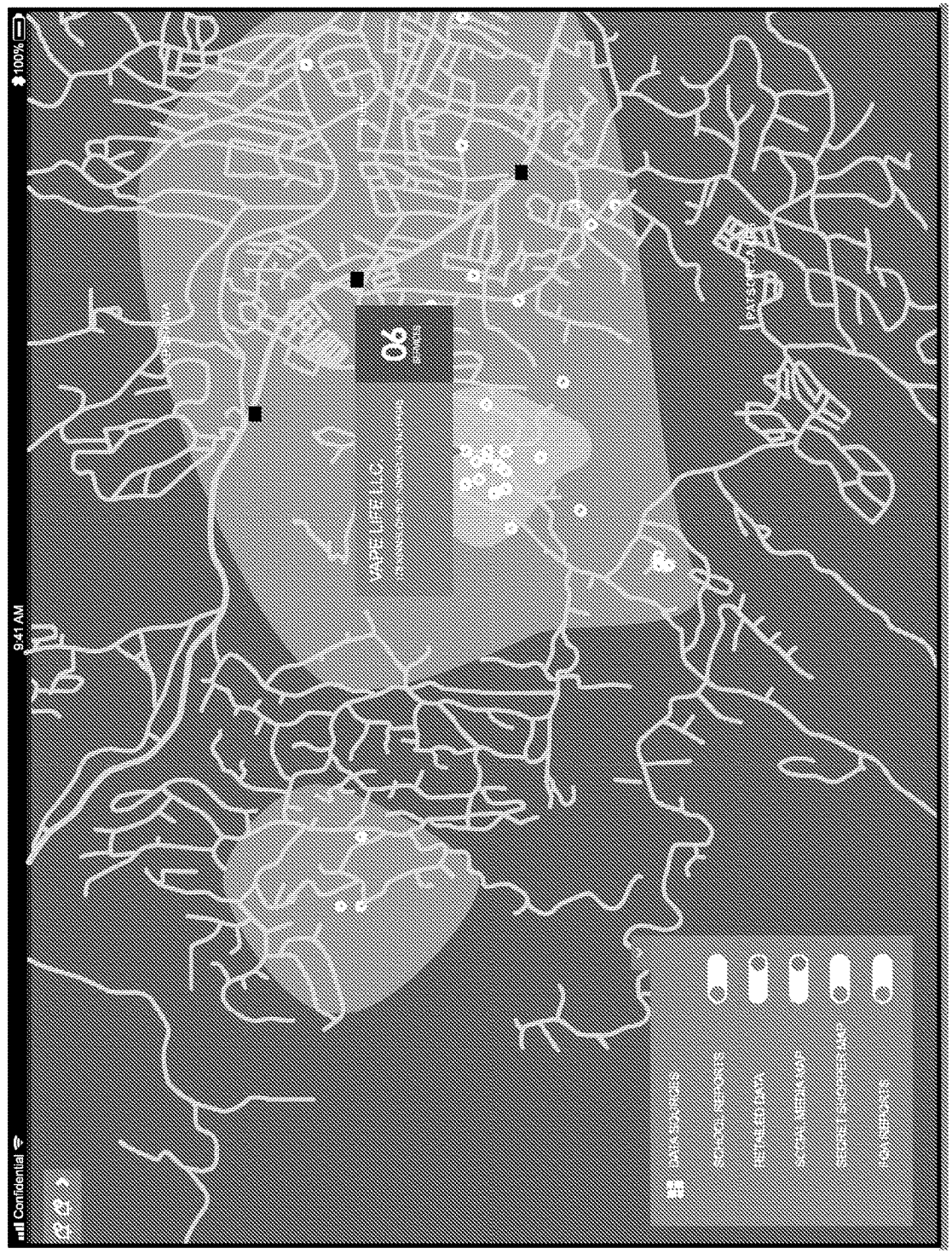
FIGS. 16A-16H illustrate features of exemplary user interfaces for an application that may be used with a vaporizer consistent with implementations of the current subject matter.
Figure 16B:
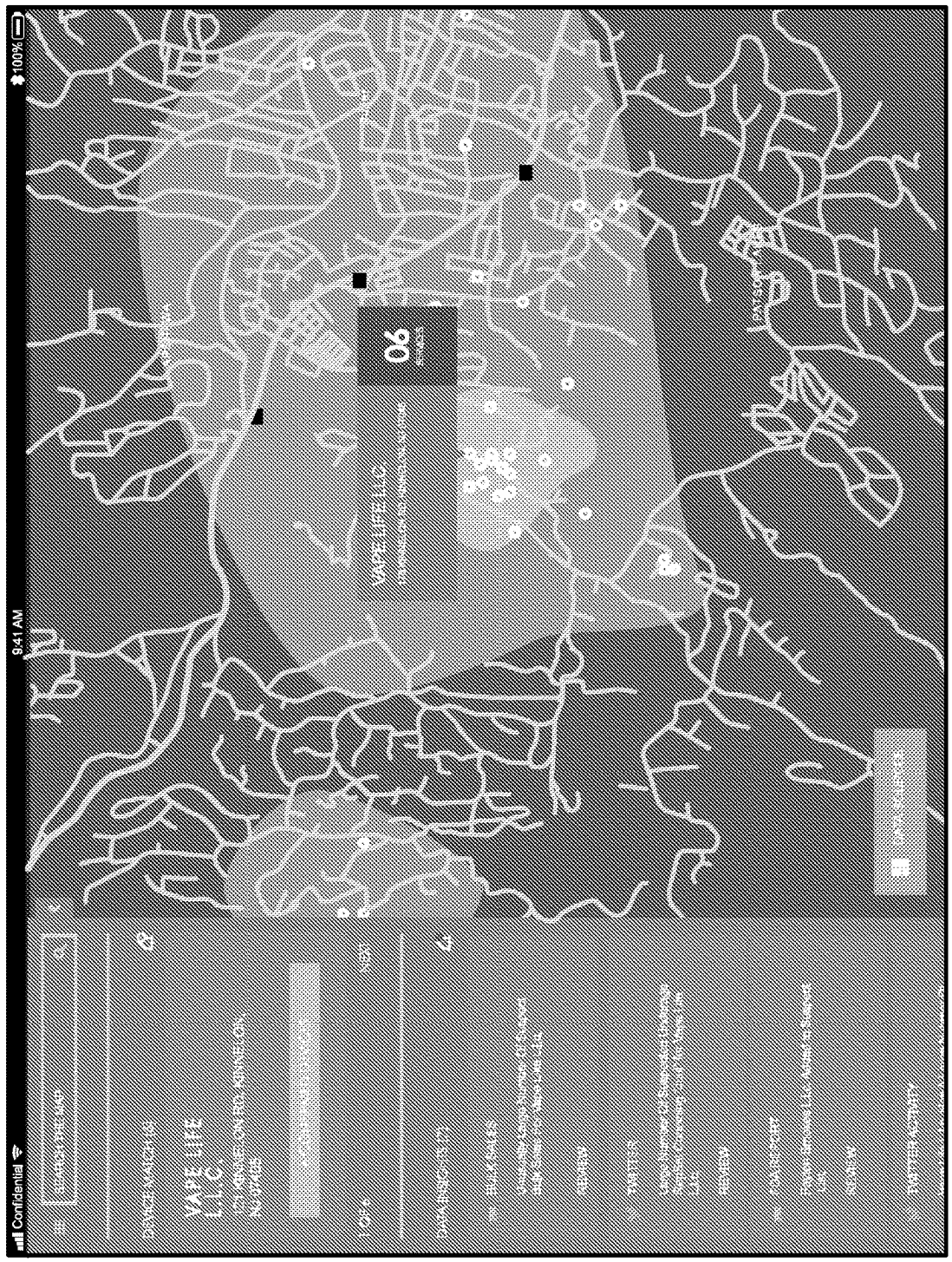
Figure 16C:
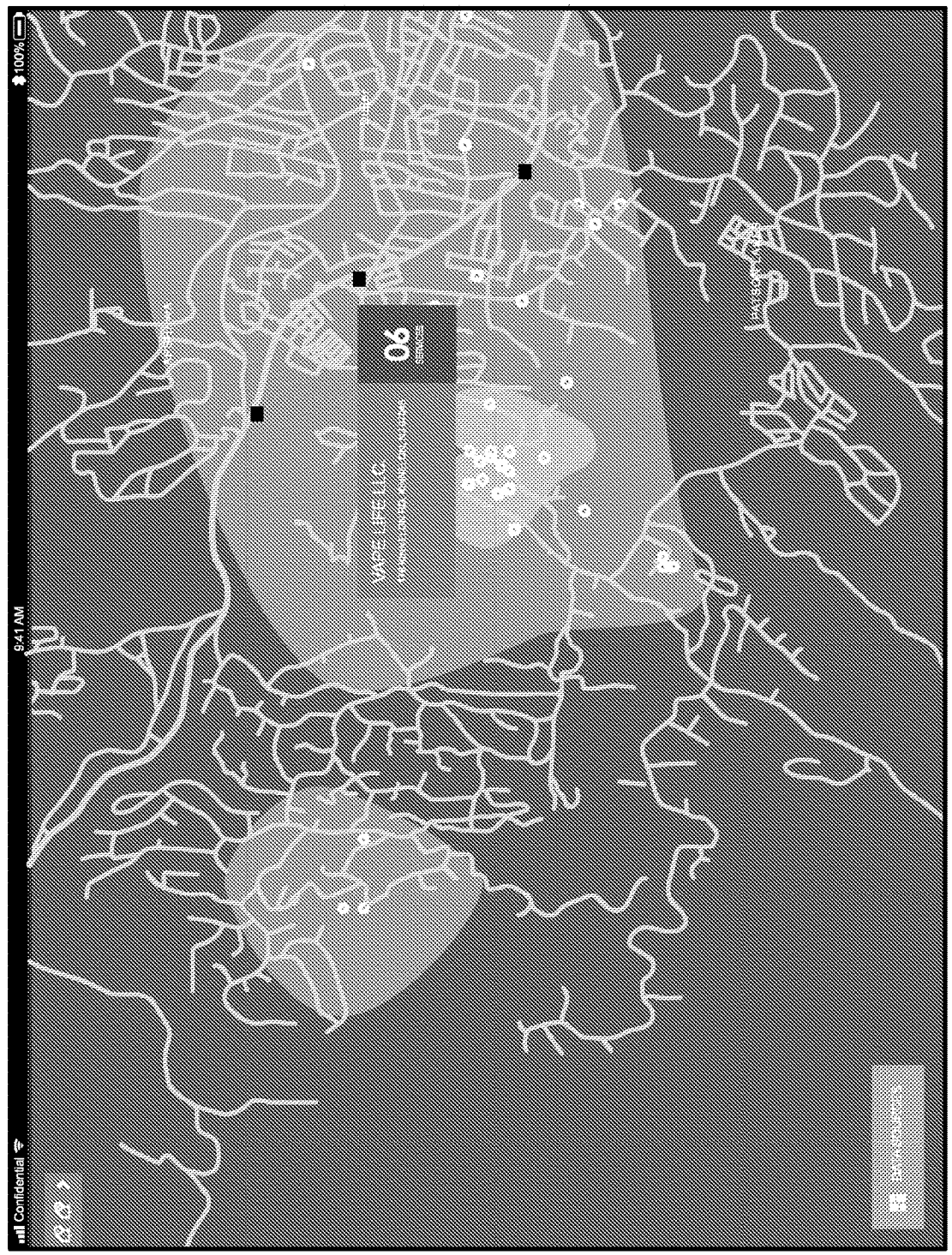
Figure 16D:
Figure 16E:
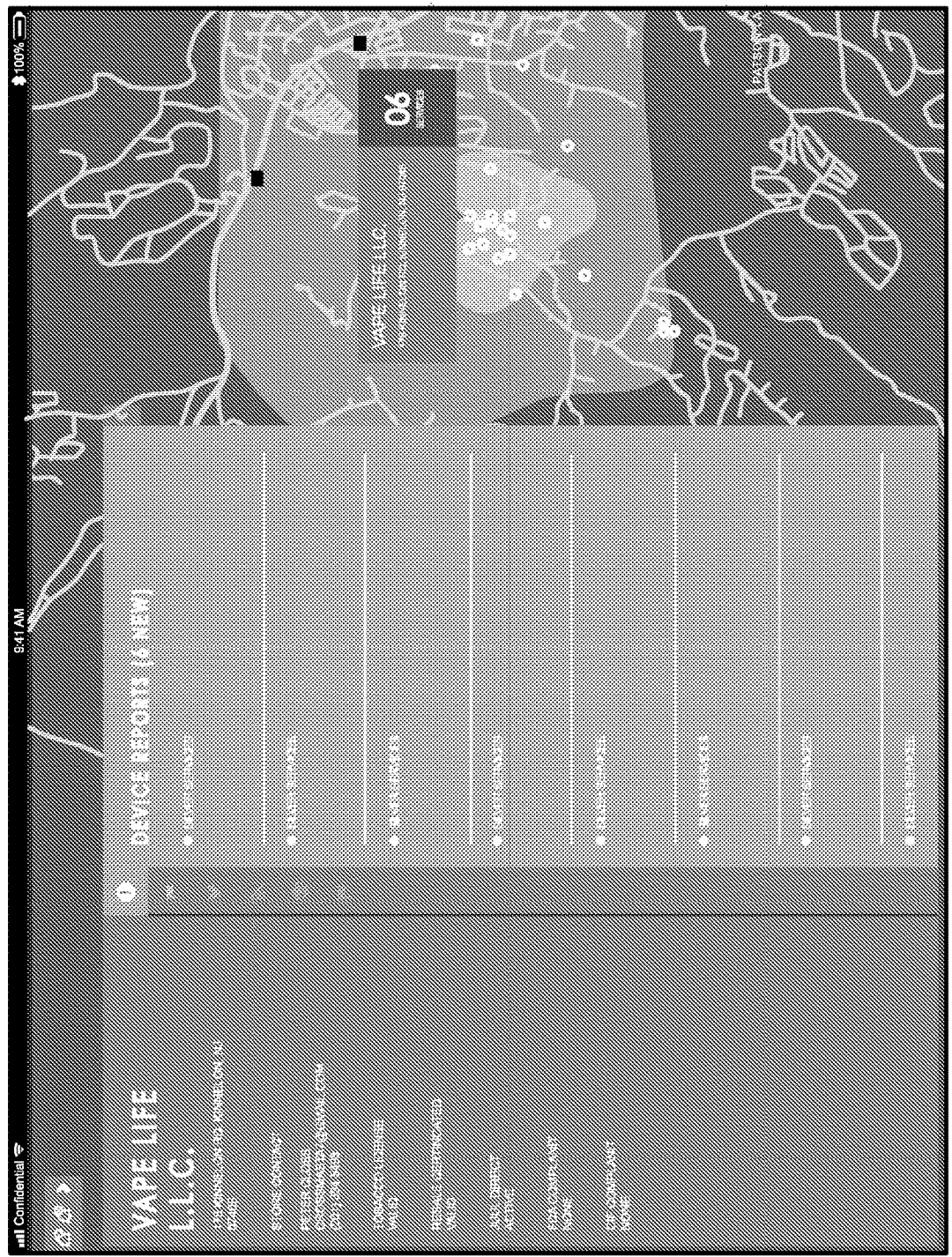
Figure 16F:
Figure 16G:
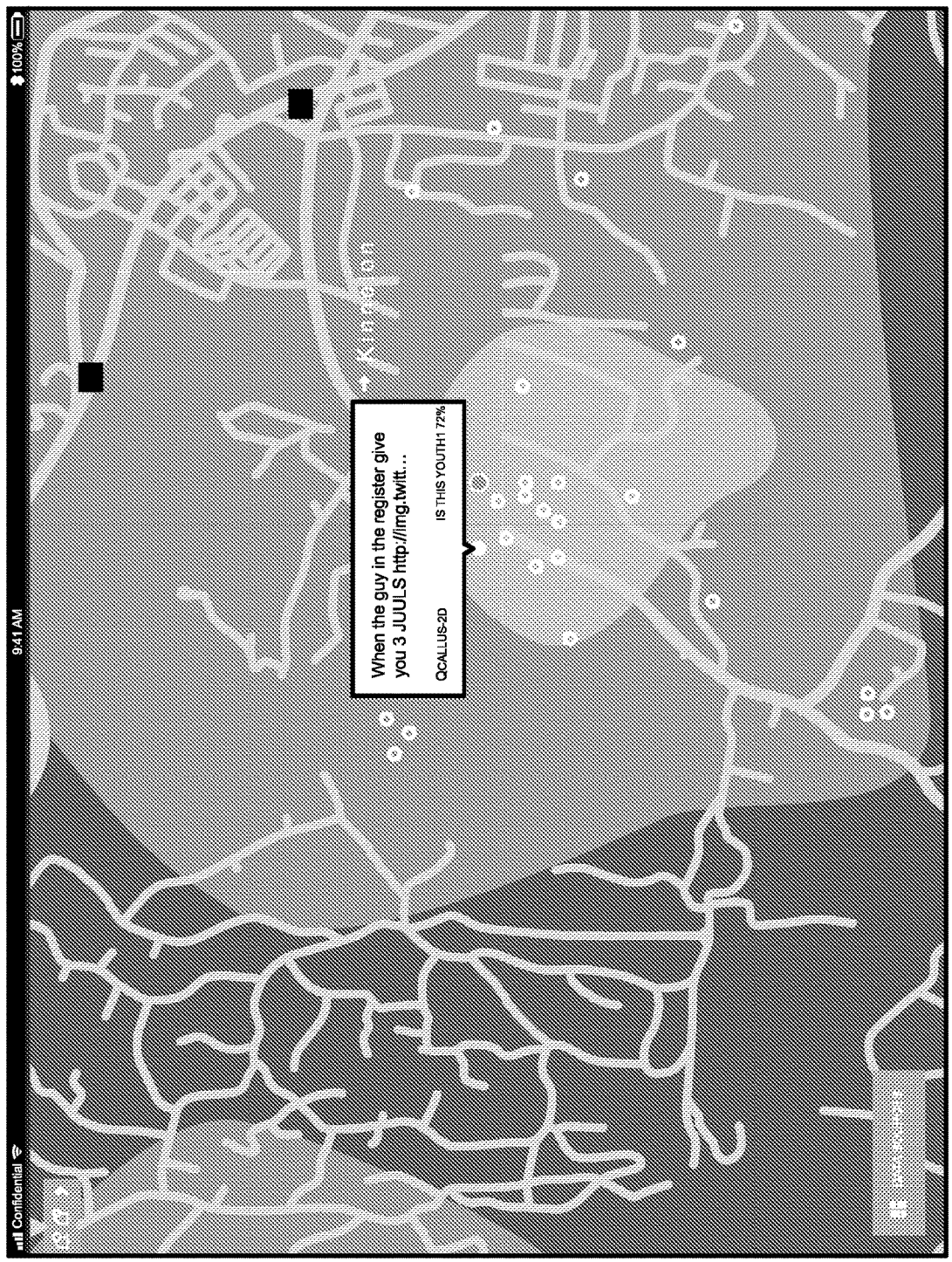
Figure 16H:
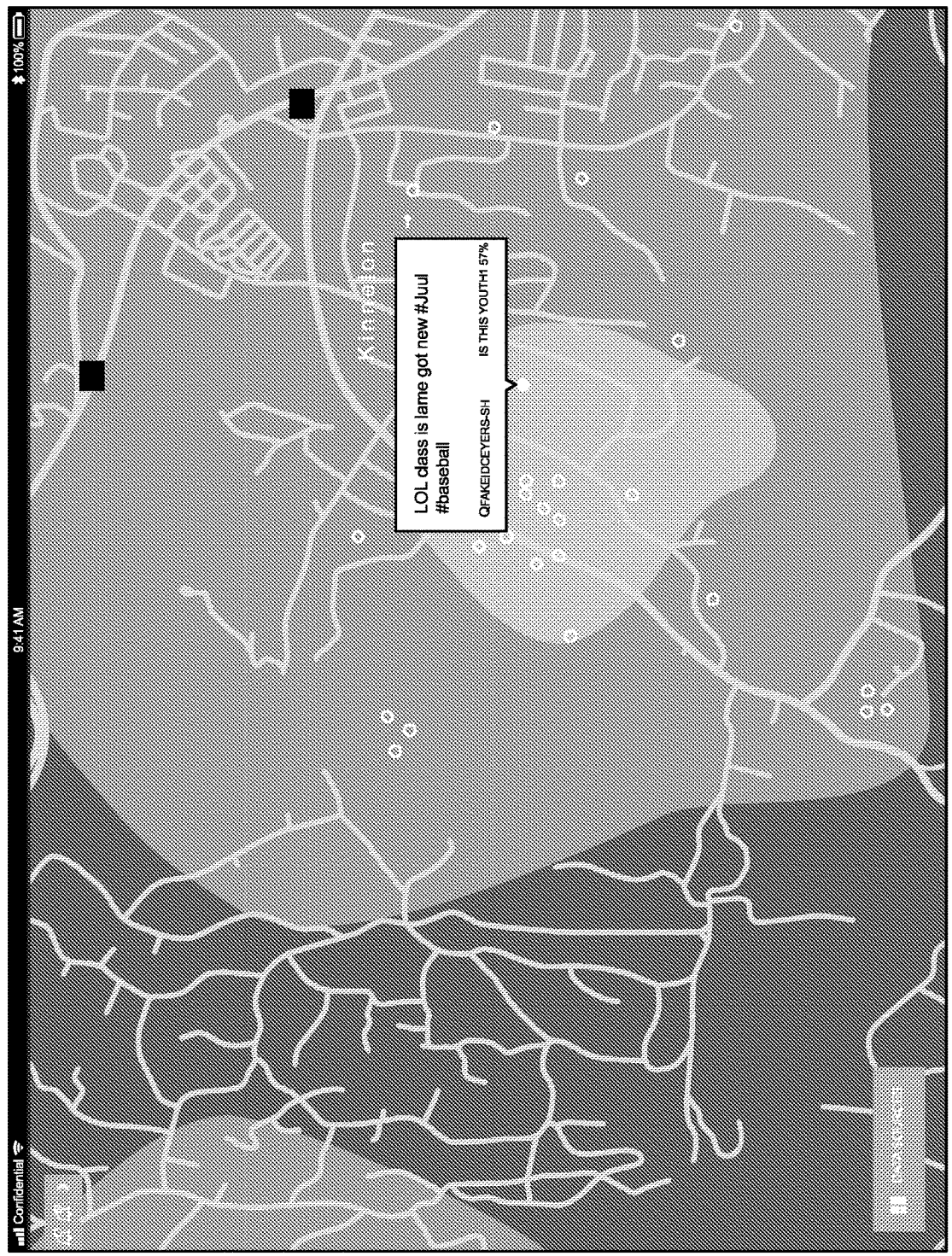
Figure 18:
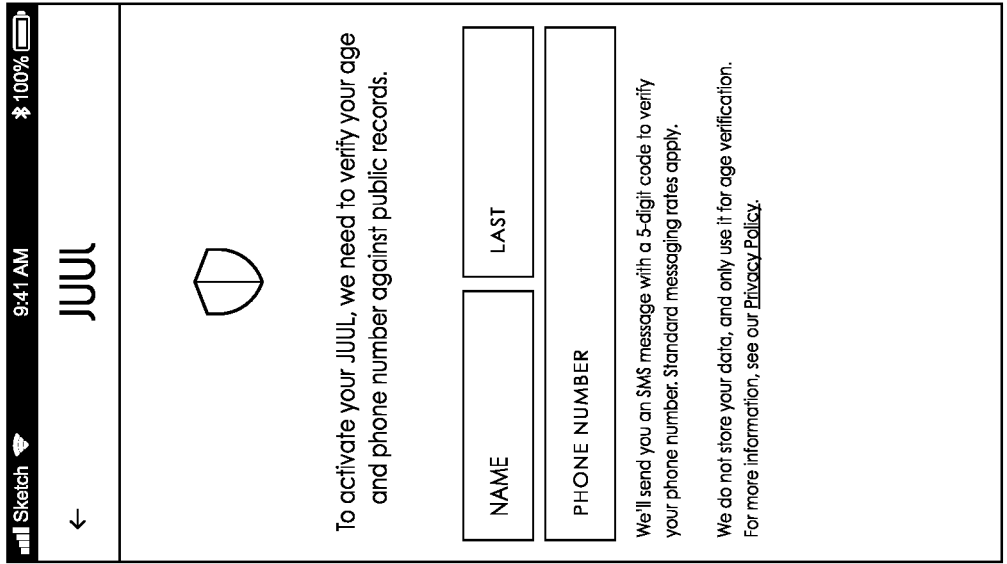
FIGS. 17-36 illustrate features of exemplary user interfaces for an application that may be used with a vaporizer consistent with implementations of the current subject matter.

FIGS. 16A to 16H show screen views illustrating example features for data-driven functionality around the use of data such as that discussed above in tracking down illicit vaporizer use and/or sales. The data sources control box allows a user to look at data from different sources as location based overlays to the map. In FIG. 16A, a fictional retail outlet is highlighted and social media mentions are overlaid. FIG. 16B shows an example of additional data insights related to this fictional retail outlet along with statistics (e.g., 6 confirmed devices that were confiscated having been sold here). FIG. 16C shows the map view without data overlays, FIG. 16D shows an option for drilling down to additional retailer reports, and FIG. 16E shows an example of data in such reports, including specifics on confiscated devices, etc. FIGS. 16F-16H show social media data with estimated locations to allow inference of correlations with given retail outlets and other data sources.

In addition to the data sources illustrated above, which can be used with existing vaporizers that may not include connectivity features, other data sources provided by such connected vaporizers can further enrich the capabilities of the current subject matter. For example, geofences may be set up around school locations and/or other places where underage vaporizer use s considered to be problematic. Vaporizers having connectivity features may be detected when they are in such areas to enable mapping of potential illicit usage hotspots. In other examples, an app executable on mobile devices may be provided to teachers or other school employees. Such apps may allow the mobile devices to become mobile detectors of vaporizers that are near the mobile device. Collection of serial number data or other data from such vaporizers may enable better tracking of where vaporizers used by teens and other underage users are originating.

FIG. 8A illustrates a diagram 800 of communication exchange among vaporizers 100A, 200A, 100B, 200B, 100C, 200C and user devices 805A and 805B. As shown in FIG. 8A, the user devices 805A and 805B can be configured with the application beacon having a communication range 825A and 825B, respectively. As further shown, the vaporizer 100A, 200A is located within communication range 825A and vaporizers 100B, 200B, 100C, 200C are located within communication range 825B.

In some aspects, the user device 805A running the application beacon may transmit a broadcast message such that any vaporizers within the 825A will be disabled. For example, the vaporizer 100A, 200A may receive the broadcast message from the user device 805A (e.g., via wireless circuitry 117, 217) and the controller 115, 215 can disable one or more components of the vaporizer 100A, 200A to lock the device. In response to the locking, the vaporizer 100A, 200A can notify the user of the vaporizer 100A, 200A that the device is locked. In some aspects, the vaporizer 100A, 200A utilizes an output 115, 215 (e.g., a light, haptic cue, sound, etc.) to indicate that the vaporizer 100A, 200A is locked. In other aspects, the vaporizer 100A, 200A may communicate to the vaporizer application that the device is locked and the vaporizer application may display a notification to the user that the device is locked. The notification can comprise text, sound, graphical image, etc. on a computing device (e.g., smart phone) of the user. In some implementations, the user device 805A may communicate the notification to the vaporizer 100A, 200A and/or the vaporizer application.

In response to the locking and/or the notification, the vaporizer 100A, 200A can receive information associated with the user of the vaporizer 100A, 200A. In some aspects, the user can enter age/identity information on the vaporizer 100A, 200A, the vaporizer application, and/or a website associated with the vaporizer 100A, 200A. Upon receiving this information, the vaporizer 100A, 200A, the vaporizer application, and/or a website associated with the vaporizer 100A, 200A, can determine the age of the user. In some aspects, the determining comprises transmitting the received user information to a third party server for analysis and receiving a determined age of the user. In other aspects, a processor of the vaporizer 100A, 200A, the vaporizer application, and/or a website associated with the vaporizer 100A, 200A can be configured to determine the age of the user based on the received information. The determined age can be compared to an age threshold (e.g., legal age limit) to determine if the user is authorized to use the vaporizer 100A, 200A. If the age threshold is satisfied, the vaporizer 100A, 200A can be unlocked for use. In some aspects, the vaporizer application and/or the website associated with the vaporizer 100A, 200A can transmit the comparison result, and/or an indication that the user satisfies the threshold, to the vaporizer 100A, 200A. The controller 105, 205 can then unlock the vaporizer 100A, 200A to activate the operation of the vaporizer 100A, 200A.

In some implementations, the application beacons on user devices 805A and 805B can be made available to certain authorized administrators (e.g., teachers, principals, etc.). Additionally, the application beacons can also optionally be configured to function only within certain geographic locations (e.g., schools, youth centers, playgrounds, etc.). In some aspects, the locations where the application beacons can function may be controlled by authorities (e.g., police, school officials, regulators, vaporizer manufacturers, etc.) and may beneficially adapt to changing demographics or areas that are determined to be a high-risk for under-age use. In some implementations, the application beacons can be aggregated or pooled together to form a pooled or net communication range 825 or restricted area for vaporizer use. In some aspects, the user devices 805A and 805B may also share information about vaporizers 100A, 200A, 100B, 200B, 100C, 200C within the application beacon's respective communication ranges 825A and 825B. This dynamic use of application beacons can also allow for more locations to be monitored or controlled using the application beacons rather than installing hardware beacons at each location.

Similar to the hardware beacons 705, in some implementations, the application beacons of the user devices 805A and 805B can also be configured to track and/or report vaporizers within the communication ranges 825A and 825B. For example, an application in communication with the user devices 805A and 805B s may be configured to show a list or graphical representation of the vaporizers within the communication ranges 825A and/or 825B. This tracking can allow an administrator of the application or entity (e.g., school or teachers) to monitor which vaporizers are located within an area and if any have be authorized for use within the area. For example, a principal, teacher, or chaperone of a school may monitor the vaporizers present within the communication range of the one or more application beacons to determine if any vaporizers associated with a student of the school have been used or activated within the communication range. In some aspects, the application can allow the authorized user of the application beacon to report any undesired or unauthorized vaporizer use to authorities and/or the manufacturer. This tattletale or reporting functionality can allow parents, teachers, authorities to improve prevention of unintended use by alerting communities of undesired or illegal use.

In some implementations, the user devices 805 can be configured to unlock vaporizers 100, 200 within the communication range 825. For example, the vaporizers 100, 200 can be configured to be locked in locations outside the communication range 825 and the user device 805 communications can be configured to unlock the vaporizers 100, 200. Such an example can be used as designated "smoking sections" of areas where vaporizer use is generally prohibited (e.g., schools, airports, etc.).

FIG. 8B illustrates a flowchart of an example method 850 for locking a vaporizer, in accordance with some example implementations. In some implementations, the method 850 can be performed by the vaporizers 100, 200, the beacon 705, and/or the user devices 805A and/or 805B

At block 852, the vaporizer 100, 200 can determine whether it is within a communication range of a second device. In some aspects, the determination is based on the vaporizer 100, 200 receiving a communication from the second device (e.g., the beacon 705, user device 805A, and/or user device 805B) for locking or disabling the vaporizer 100, 200. In some aspects, the communication can comprise a broadcast message from the beacon 705, user device 805A, and/or user device 805B transmitted in response to the beacon 705, user device 805A, and/or user device 805B detecting that the vaporizer 100, 200 is within the communication range 725 of the beacon 705 and/or within the communication ranges 825A or 825B. In other aspects, the communication can be transmitted in response to the beacon 705 receiving a communication from the vaporizer 100, 200 within the communication range 725. Similarly, the communication can be transmitted in response to the user device 805A and/or 805B receiving a communication from the vaporizer 100, 200 within the communication range 825A and/or 825B. Additionally, a vaporizer application on a smart phone association with the vaporizer 100, 200 can also receive the communication from the beacon 705, user device 805A, and/or user device 805B.

At block 854, the vaporizer 100, 200 can lock, in response to the determination that the vaporizer 100, 200 is within the communication range of the second device (e.g., the beacon 705, user device 805A, and/or user device 805B), the vaporizer 100, 200 to disable operation of the vaporizer 100, 200. For example, the wireless circuitry 107, 207 may receive the communication and the controller 105, 205 may disable one or more components of the vaporizer 100, 200 to lock/disable operation of the vaporizer 100, 200. In some aspects, the vaporizer application on the smart phone can lock the vaporizer 100, 200 in response to the communication. For example, the vaporizer application may transmit a communication to the vaporizer 100, 200 in response to receiving the communication from the beacon 705, user device 805A, and/or user device 805B. The communication to the vaporizer 100, 200 may be configured to disable the operation vaporizer 100, 200.

At block 856, the vaporizer 100, 200 can notify a user of the vaporizer 100, 200 that the device is locked. In some aspects, an output 115, 215 can provide an indication the vaporizer 100, 200 is locked. For example, the output 115, 215 can display a red light, a vibration, or an icon indicating the device is locked. In some implementations, the vaporizer 100, 200 can communicate with the vaporizer application to notify the user that the vaporizer 100, 200 is locked. For example, the vaporizer 100, 200 can communicate with the vaporizer application and the vaporizer application can provide an indication that the device is locked on a display of the smart phone or computing apparatus. In some aspects, the indication can comprise text, audio, graphics, haptic cues, etc. to indicate that the vaporizer 100, 200 is locked.

At bock 858, the vaporizer 100, 200, the vaporizer application, and/or a webpage can receive information associated with the user of the vaporizer. In some aspects, the vaporizer 100, 200, the vaporizer application, and/or the webpage can prompt the user to enter the information in response to notifying the user that the vaporizer 100, 200 is locked. For example, the user can enter identification and/or age information (e.g., date of birth, driver's license number, phone number, biometric information, address, etc.) in a user interface of the vaporizer 100, 200, the vaporizer application, and/or the webpage. In some aspects, vaporizer application and/or the webpage can be configured to communicate the received information to the vaporizer 100, 200.

At block 860, the vaporizer 100, 200, the vaporizer application, and/or a webpage can determine the age of the user based on the received information. In some implementations, the determination can be based on any of the authentication steps/methods described herein. For example, the vaporizer 100, 200, the vaporizer application, and/or the webpage can transmit the received information to a third party server to verify the user's identification and age. The third party server can then respond to the vaporizer 100, 200, the vaporizer application, and/or the webpage with the determined age. In another example, the vaporizer 100, 200 and/or the vaporizer application can comprise an age verification module configured to compare and analyze the received information to determine the age of the user. Additionally, the vaporizer 100, 200, the vaporizer application, and/or a webpage can scan the user's identification documentation to determine the age of the user.

At block 862, the vaporizer 100, 200, the vaporizer application, and/or a webpage can unlock, based on the age of the user satisfying a threshold, the vaporizer 100, 200 to activate the operation of the vaporizer 100, 200. For example, the age verification module of the vaporizer 100, 200 and/or the vaporizer application configured to compare the determined age of the user to a threshold (e.g., legal smoking age) to determine whether the threshold is satisfied. In some aspects, the vaporizer application and/or the webpage can transmit, in response to the satisfaction of the threshold, a communication to the vaporizer 100, 200 to unlock the device. In some implementations, the beacon 705, user device 805A, and/or user device 805B can be configured to transmit a second communication to the vaporizer 100, 200 to unlock the device. For example, the beacon 705, user device 805A, and/or user device 805B may receive a communication indicating that the vaporizer 100, 200 has completed the second authentication and is authorized for use within the communication range 725, 825A, and/or 825B. The beacon 705, user device 805A, and/or user device 805B can then provide the second communication to the vaporizer 100, 200.

It may also be desirable to re-authenticate a user after an initial use of the vaporizer. In some aspects, when the user runs out of cartridges and vaporizable material they may purchase additional supplies from an online or in-store retailer. It can be beneficial to provide a third authentication to help ensure that such vaporizer supplies and cartridges are being used by the intended consumers and not by un-intended user (e.g., under-age children). In some implementations, the third authentication may be the same or similar to the first authentication when the user completes the initial purchase of the vaporizer. In some aspects, the processor 610 can perform the third authentication and/or locking in response to inputs received from the sensor module 660 or other component of the computing apparatus 600.

In some aspects, the user may purchase vaporizer supplies and/or cartridges from an online retailer. The purchase may include the third authentication to verify the age of the purchaser. For example, in order to purchase vaporizer supplies and/or cartridges online, the user may be required to enter their identification information including their age. The retailer may verify the information entered is correct accessing databases containing user identification information (e.g., Social Security office, the department of motor vehicles, tax records, etc.) or the retailer may contract with third parties that have access to such information and can verify that consumer information entered is correct and the user satisfies any age threshold. Additionally, the retailer may have access to the user profile created during the first authentication that is associated with the user. The third authentication can include verifying the information entered during the third authentication matches the information entered during the first and/or second authentication or other information associated with the user.

The third authentication may include a multi-step authentication process where after the user enters its information (e.g., contact information), the retailer, manufacturer, or the like sends a code to the user (e.g., via the application, text message, email message, or the like) for the user to enter before the purchase can be completed. If the user enters the correct code, the sale may be authorized, if not, the sale transaction may be terminated. In some implementations, the information the user uses can be stored to create a user profile, if not created during the first or second authentications. The user profile can be stored at the vaporizer, the application, a server, or other computing device.

In some aspects, the user may purchase vaporizer supplies and/or cartridges through the vaporizer application. The application can have the user's profile stored in a database which confirms the age of the user. If a user profile has not been created the application can prompt the user to enter in required information to verify the age of the user. In some aspects, the application may send such information to a third party service provider in order to verify the age and/or identity of the user. In some implementations, the application may require the third authentication to allow purchase of the vaporizer supplies and/or cartridges. The third authentication can include verifying a fingerprint matches the fingerprint stored in the user profile (e.g., entered during the first and/or second authentication). The third authentication can also include any single or multi-step authentication process. For example, the application may send a message to an email address, phone number, or other contact address. The message may include a code the user must enter in the application in order to complete the purchase. The third authentication may also include any other biometric verification (e.g., speech verification, facial recognition, etc.).

In other implementations, the user may purchase vaporizer supplies and/or cartridges at an in-store retailer. The retailer may perform the third authentication to verify the age and/or identity of the user in order to complete the purchase. For example, the retailer may visually inspect the identification document of the user (e.g., driver's license, passport, etc.) to verify the age and/or identity of the user. The retailer can also swipe or scan a bar code, QR code, or other encryption code of the identification document to read and verify the consumer's age and/or identification. In some implementations, the retailer may manually enter or scan in the age/identification into a computer application that verifies the identity and/or age of the consumer. For example, the retailer may be equipped with a tablet, laptop, desktop, or other computing device running an application associated with the vaporizer. The user or retailer may register the user through the application and provide its identification and age-related information to the application. The application may then perform the third authentication to verify the age and/or identity of the consumer. In some aspects, the application may communicate with a vaporizer application database or a third party system to complete the third authentication. The third authentication can include verifying the information entered during the third authentication matches the information entered during the first and/or second authentication or other information associated with the user.

In some implementations, the third authentication can include authentication in connection with the hardware beacons and application beacons described herein. For example, the third authentication can be prompted when the vaporizer is located within a communication range of a hardware beacon and/or an application beacon. In some aspects, the hardware and/or application beacons can be implemented in retail stores selling vaporizer supplies and/or cartridges.

In addition to, or instead of, the authentication schemes described herein, it may be desirable to periodically check or re-authenticate that the vaporizer user is authorized to use the vaporizer apparatus and/or supplies. It may also be desirable to ensure the re-authentication is not overly cumbersome or time-consuming so as to take away from the user-experience. Accordingly, it may be beneficial to incorporate a fourth authentication to verify age and/or identity and unlock the vaporizer for use. In some aspects, the processor 610 can perform the fourth authentication and/or locking in response to inputs received from the sensor module 660 or other component of the computing apparatus 600.

In some implementations, the application and/or vaporizer may communicate with a dongle which performs periodic re-identification and/or authorization. In some aspects, the vaporizer and/or the application may require the user to enter a code to unlock the vaporizer. For example, the code can be preprogrammed as part of a user and/or device profile. Additionally, the code may be randomly generated and sent to a communication address or number associated with the user for the user to enter via the vaporizer and/or application. The code can include any combination of numbers, letters, gestures, sounds, speech, biometric features, or the like. For example, the code may include entering the user's fingerprint on a fingerprint scanner of the vaporizer or computing apparatus. The code may also include the user entering a scan of the user's iris using an iris scanner of the vaporizer or computing apparatus.

In some aspects, the computing apparatus running the vaporizer application can be used to provide the fourth authentication. For example, the vaporizer may remain in a locked position unless the vaporizer apparatus is within a certain proximity of the computing apparatus running the application. In some aspects, the application may be running a consumer's smart phone and the vaporizer remains locked until the smart phone is within a proximity threshold with the vaporizer. In some aspects, the vaporizer and/or computing apparatus may detect the proximity through Bluetooth, near-field communication (NFC), WiFi, ultrasound, ZigBee, RFID, cellular communication, or any other wireless communication.

In some implementations, the fourth authentication can include authentication in connection with the hardware beacons and application beacons described herein. For example, the fourth authentication can be prompted when the vaporizer is located within a communication range of a hardware beacon and/or an application beacon. In some aspects, the hardware and/or application beacons can be implemented in high-risk areas for under-age or unauthorized use (e.g., schools, playgrounds, youth centers, etc.). In other aspects, the fourth authentication may include proximity detection based on location information. For example, the application and/or vaporizer may receive GPS, or other location information, indicating that the vaporizer and/or user is within a proximity threshold of certain location (e.g., schools, playgrounds, youth centers, etc.). If the vaporizer is within the proximity threshold, the vaporizer may lock or the application may lock the vaporizer. In some aspects, the user may re-authenticate in order to unlock the vaporizer within the proximity threshold. In other aspects, the user may be restricted from unlocking or operating the vaporizer within the proximity threshold.

Any of the authentication techniques and mechanisms described can be used individually or in combination to provide protection against unintended and undesired users of the vaporizer and/or vaporizer supplies.

As discussed elsewhere herein, any of the apparatuses described herein (e.g., vaporizers and/or an affiliated app) may include location services (GPS).

For example, a user buying cartridges for the vaporizer directly from a source may use an app to understand exactly how many cartridges that the user has and how many they have left. A retailer may use this information to offer the user to auto-order more when they are running low.

In any of the apparatuses described herein, the app and/or the vaporizer may include a GPS or may communicate with a GPS to determine location of the vaporizer. Locational information may be used to tell a user the closest retailer to buy more cartridges, to use location service for delivery, to order through smart phone (e.g., usage tracker combined with auto-refill), and/or to inform the user of relevant local legislation about e-cig and cannabis use.

Locational information may also be used to disable vaporizers that are determined to be positioned at or located in one or more areas in which vaporizer use is not permitted. For example, particular areas or zones may be established, and if a vaporizer enters such an area, or comes within a predefined range of the area, the vaporizer may be automatically disabled or disabled after an alert is given. Such areas may include, for example, a defined perimeter around schools or within particular locations (such as stores) that do not allow use of vaporizer. Additionally, specific locations in which vaporizer use is not permitted may be set up by one or more individuals (e.g., an individual's house). To establish the areas/zones/locations, physical beacon devices (e.g., beacons 705 and/or 805) may be installed to identify the areas/zones/locations. When a vaporizer is within range of the beacons, the vaporizer would fail to turn on or would turn off. Alternatively, geo-fencing can be used to establish the areas/zones/locations in which use of vaporizers is not permitted. With a vaporizer paired to a user's phone or mobile device, or by utilizing location services of the vaporizer, the vaporizer can be disabled when it is within any of the defined geo-fenced areas/zones/locations.

Examples of application software with many of the features described herein for use with one or more vaporizers are described with reference to FIGS. 10A-12J. Each of the user interface (UI) screens described herein in FIGS. 10A-12J can be generated by user interface 650 of a user device 305, 805 and/or the computing apparatus 600. For example, the user device 305 can comprise the memory 620 storing instructions for executing the vaporizer application running on the user device 305. The processor 610 can execute those instructions and can generate the exemplary UIs using the display 630 and/or the user interface 650. The exemplary UIs can also be generated based on user input received via the display 630 and/or the user interface 650. The exemplary UIs can also be generated based on communications with the vaporizer 100, 200, remote server 307, beacon 705, other user devices 305, 805, and/or other devices. The communications can be received using the network interface 640 and/or antenna 690 of the user device 305, the vaporizer 100, 200, and/or any other device.

Figure 9:
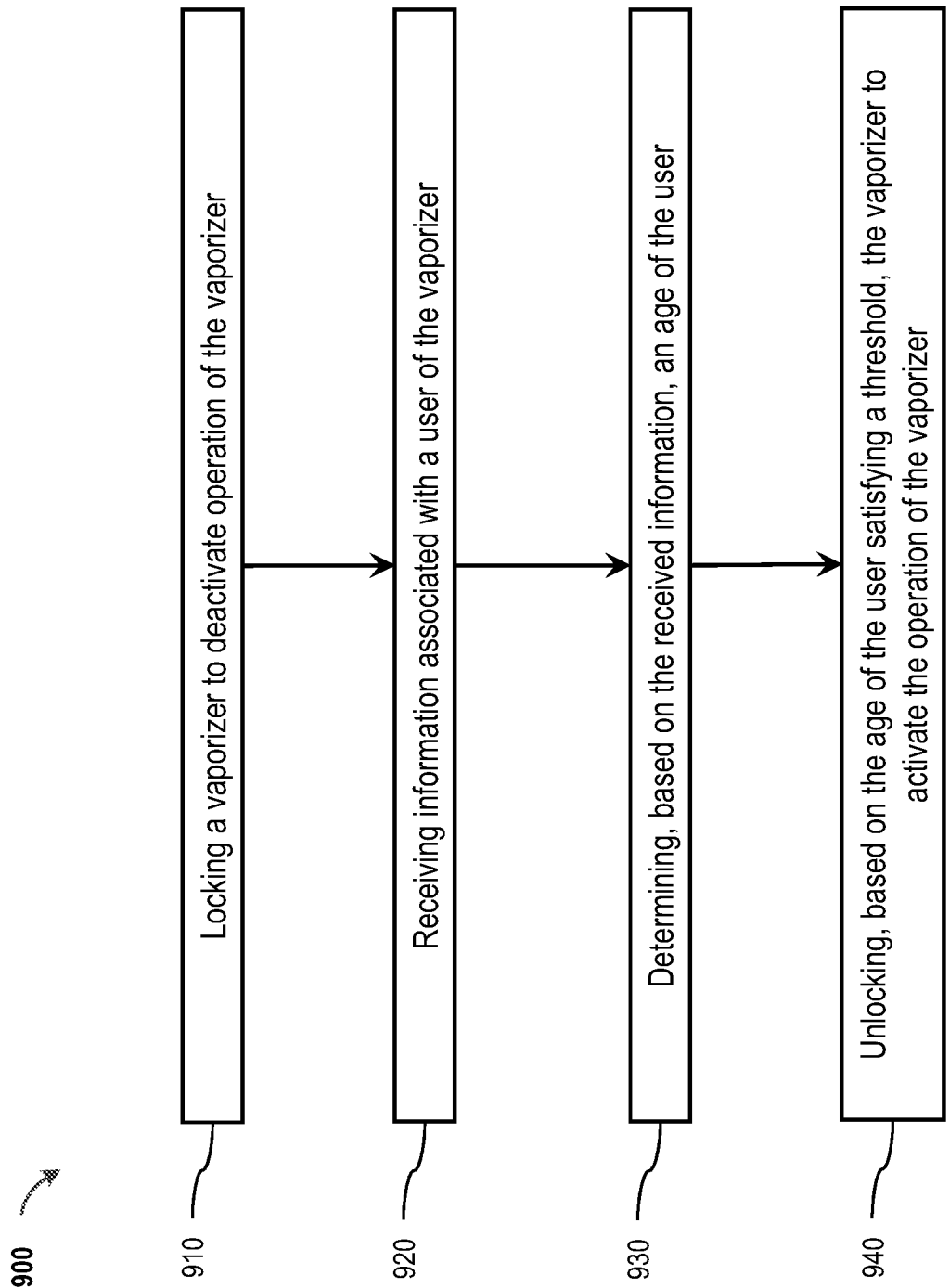
FIG. 9 illustrates a flowchart of an example method of locking a vaporizer, in accordance with some example implementations.

As noted herein, implementations of the current subject matter include various methods of use of vaporizers and vaporizer systems that include a device in communication with a vaporizer. FIG. 9 illustrates a flowchart of a method 900 for authenticating a user of a vaporizer, in accordance with some example implementations. In various implementations, the method 900 (or at least a portion thereof) may be performed by one or more of the vaporizer 100, the vaporizer 200, the user access device 305, the remote server 307, the computing apparatus 800, other related apparatuses, and/or some portion thereof.

Method 900 can start at operational block 910 where the apparatus 900, for example, can lock a vaporizer to deactivate operation of the vaporizer. Method 900 can proceed to operational block 920 where the apparatus 900, for example, can receive information associated with a user of the vaporizer. In some aspects, the information can include age and/or identification information (e.g., birthdate, address, social security number, license number, etc.). Method 900 can proceed to operational block 930 where the apparatus 900, for example, can determine an age of the user of the vaporizer. In some implementations, the vaporizer can determine the age or receive a determination of the age from a server and/or application. Method 900 can proceed to operational block 940 where the apparatus 900, for example, can unlock the vaporizer to activate operation of the vaporizer based on the determined age of the user satisfying a threshold (e.g., legal age).

Figures 10A, 10B:
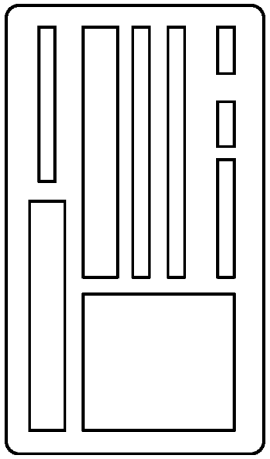
FIGS. 10A-10E illustrate features of exemplary user interfaces for an application that may be used with a vaporizer consistent with implementations of the current subject matter.
Figure 10E:
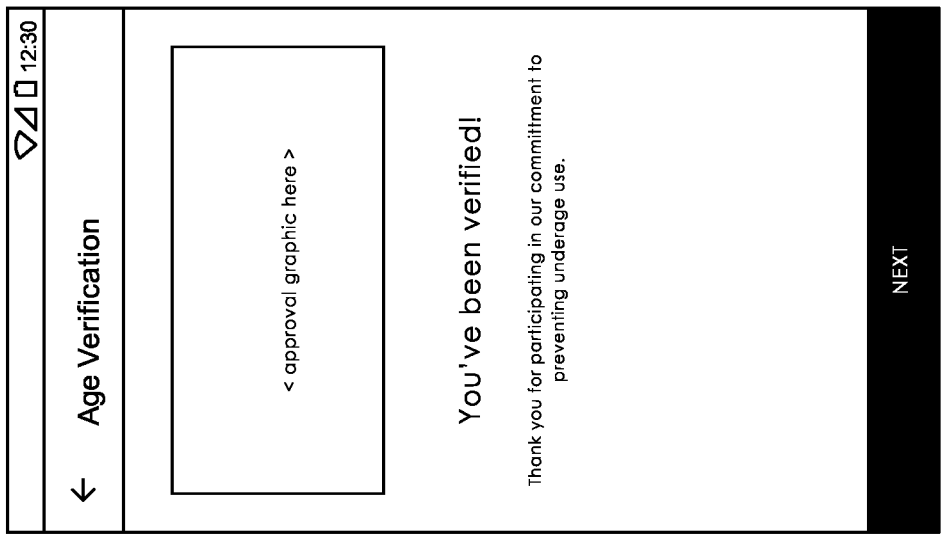
Figure 10D:
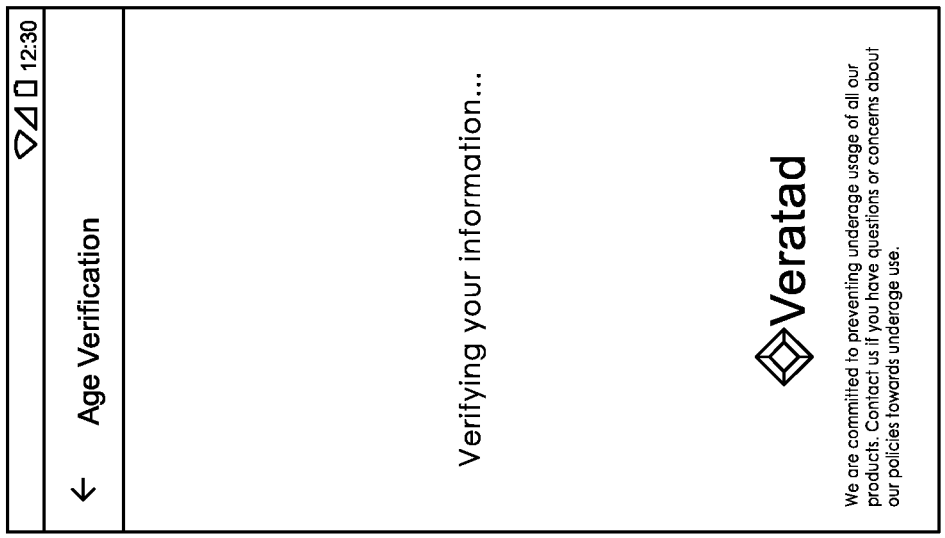
Figure 10C:
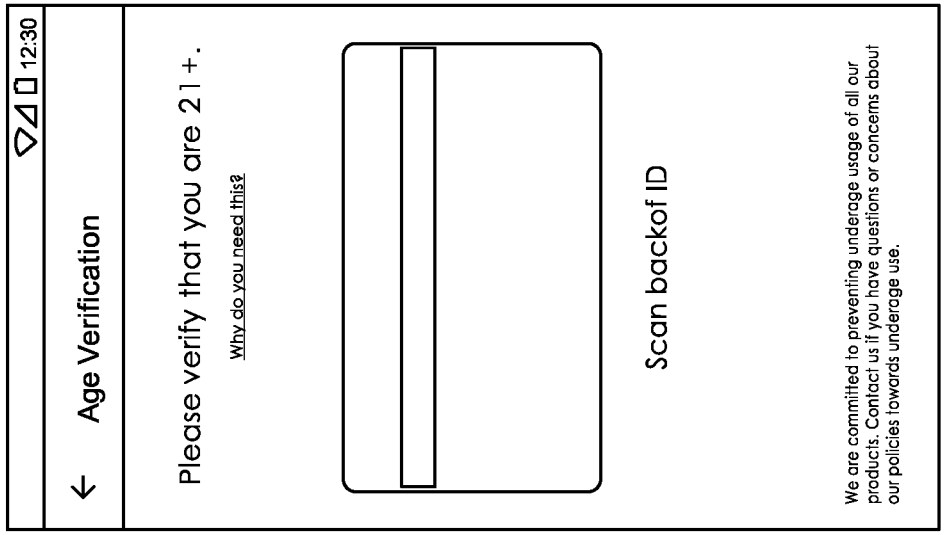

FIGS. 10A-10E show a user interface (UI) for an application (app) that may be used with a vaporizer as described herein, including an initial or subsequent age/identity authentication protocol for accessing a vaporizer and/or affiliated vaporizer data analysis, data collection and data processing systems, including the app itself. FIG. 10A illustrates a user interface for an app configured to allow the user to enter age/identity information in one or more fields of the UI, and FIG. 10B illustrates a user interface screen for an app that allows the user to scan a front or first side of an identification document (e.g., driver's license). FIG. 10C illustrates a user interface screen for an app that allows the user to scan a back or second side of the identification document. FIG. 10D illustrates a user interface screen for an app that indicates that the app is verifying the entered/scanned user information. FIG. 10E illustrates a user interface screen for an app that indicates that the user has been verified/authenticated for using the vaporizer.

Figure 11B:
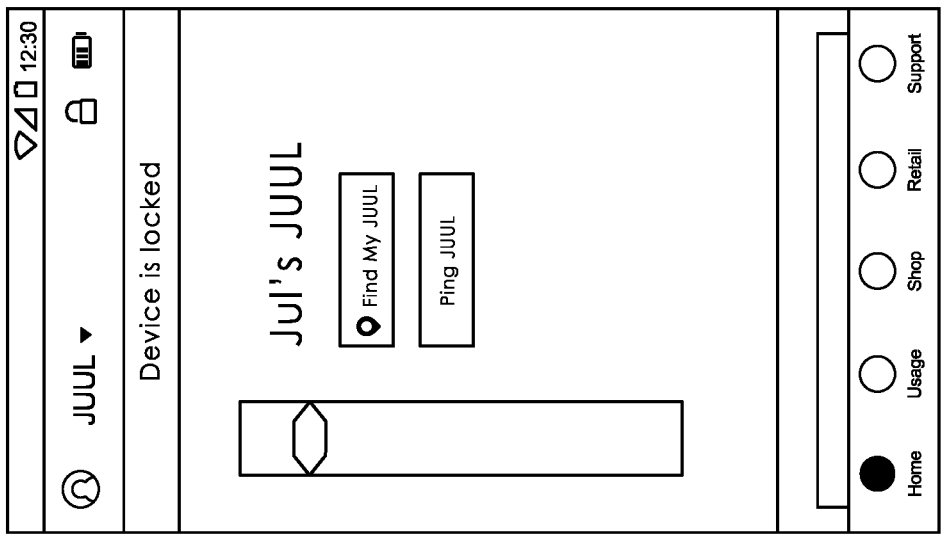
FIGS. 11A-11B illustrate features of exemplary user interfaces for an application that may be used with a vaporizer consistent with implementations of the current subject matter.
Figure 11A:
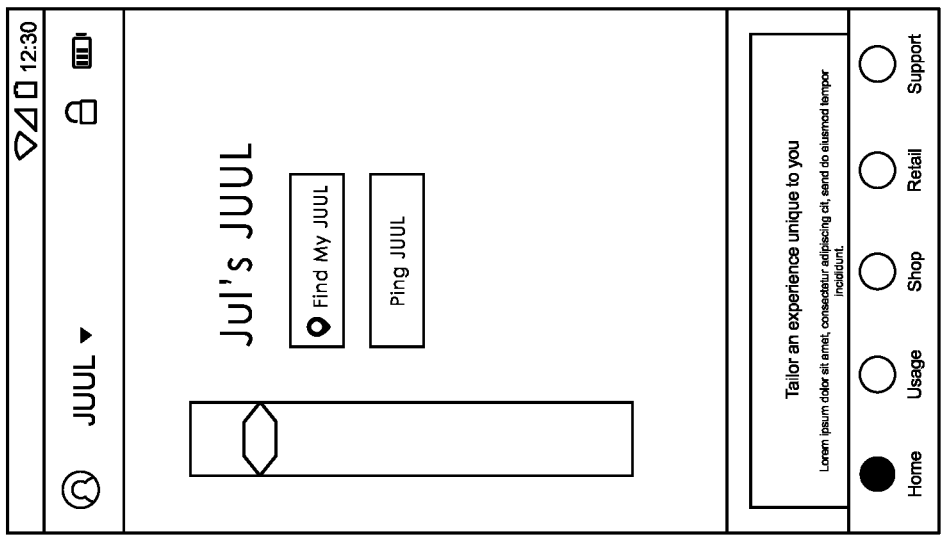

FIGS. 11A-11B illustrate UI screens that may be used as part of the app interface for finding, pinging, and/or checking a status of the vaporizer. In FIG. 11A, the UI includes a name associated with the vaporizer, a button to locate the vaporizer, and a button to ping the vaporizer. FIG. 11B shows the UI screen of FIG. 11A with an indication that the vaporizer is locked.

Figure 12C:
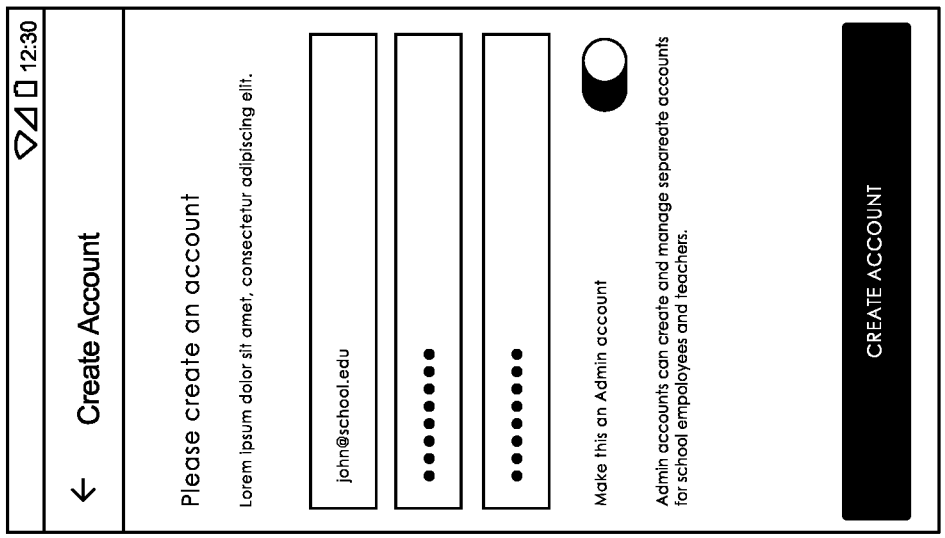
FIGS. 12A-12J illustrate features of exemplary user interfaces for an application that may be used with a vaporizer consistent with implementations of the current subject matter.
Figure 12B:
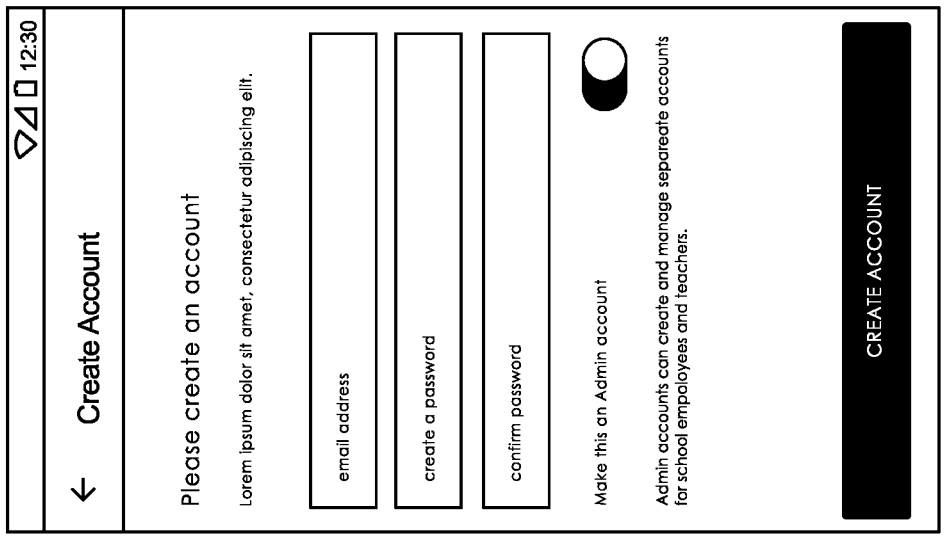
Figure 12A:
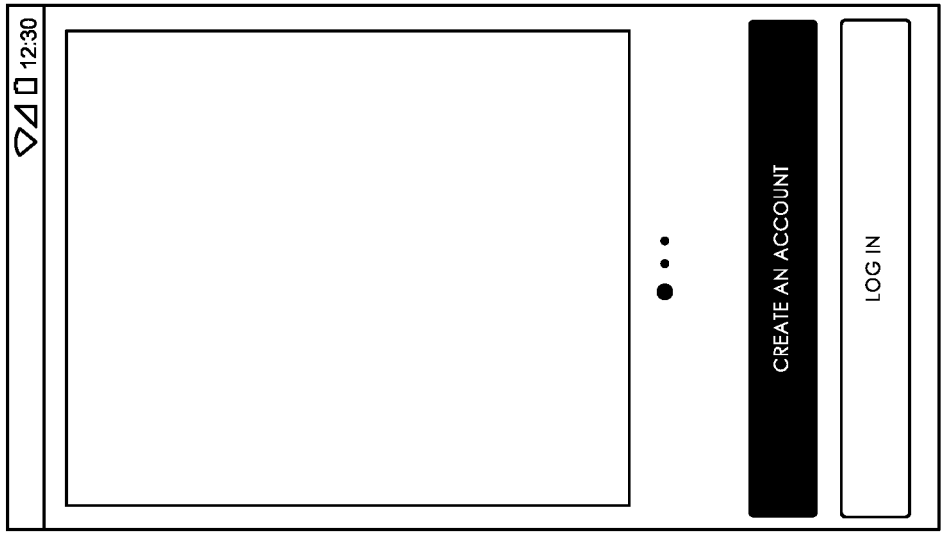
Figure 12F:
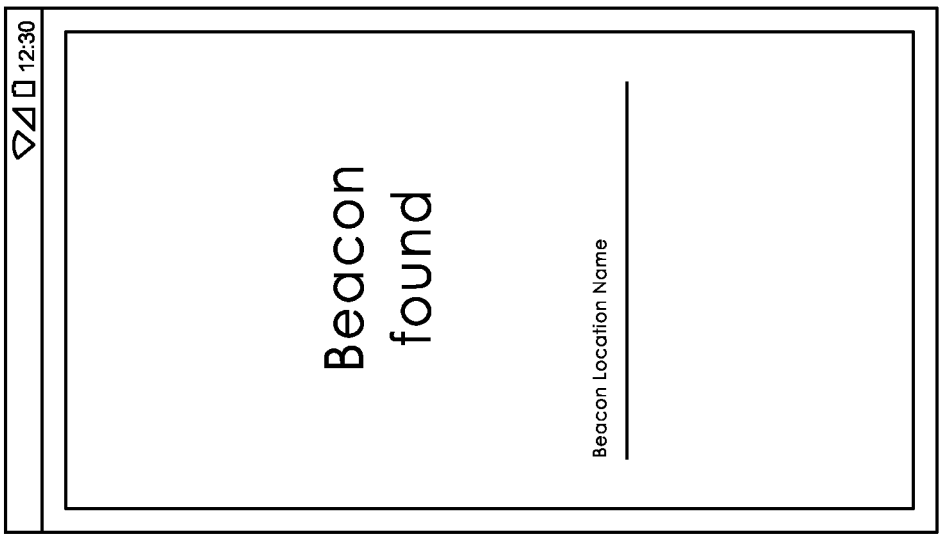
Figure 12E:
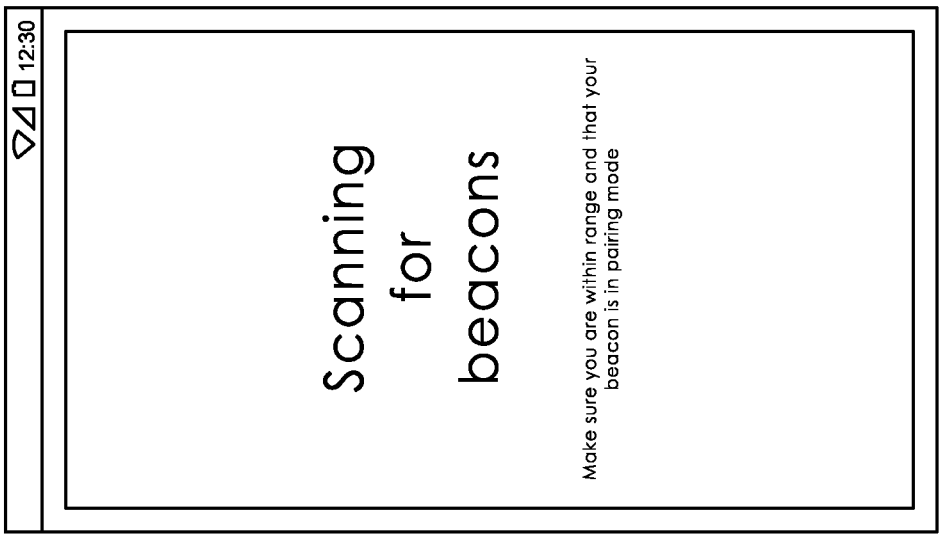
Figure 12D:
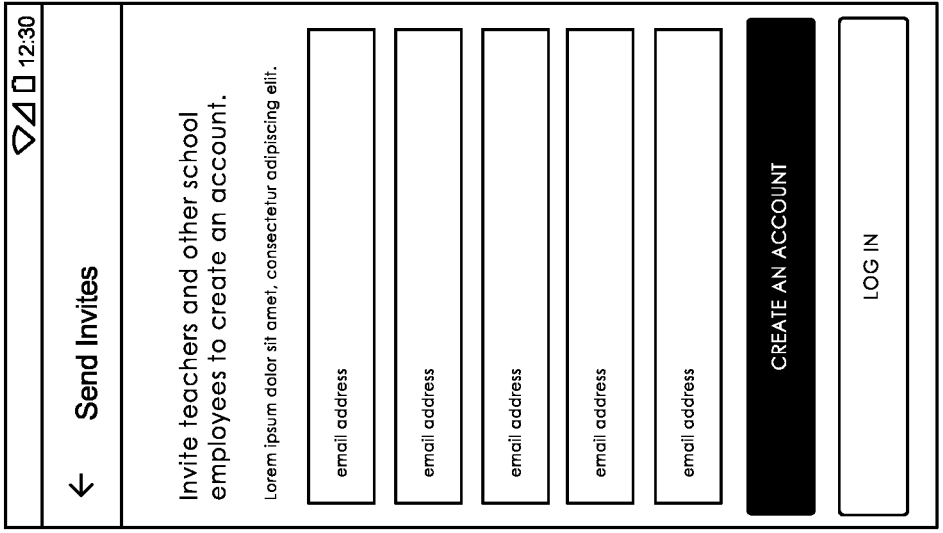
Figure 12H:
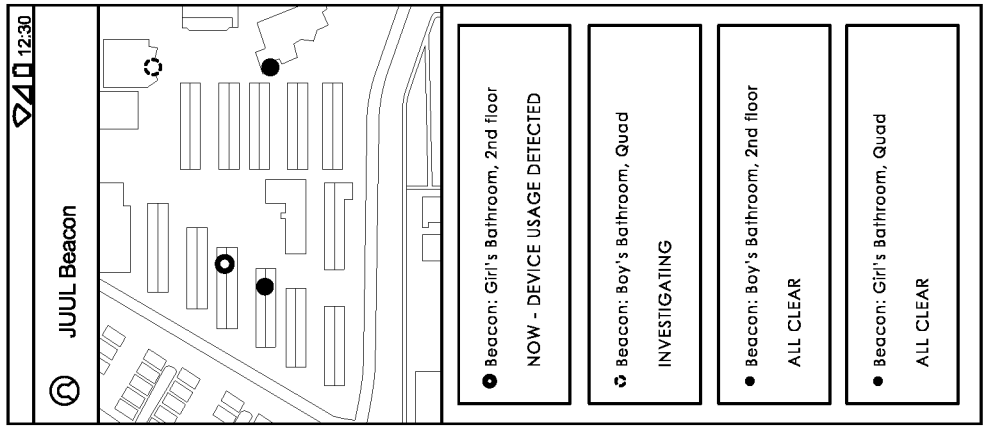
Figure 12G:
Figure 12J:
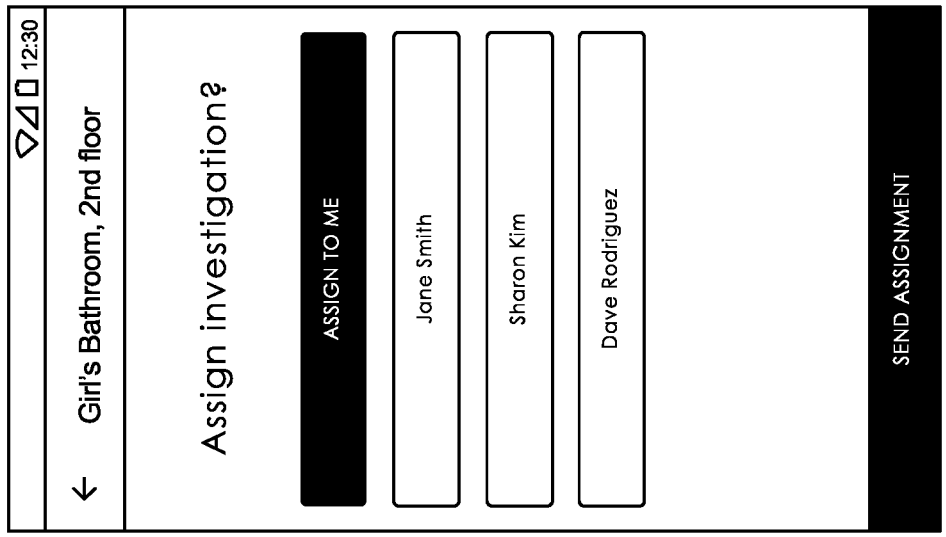
Figure 12I:
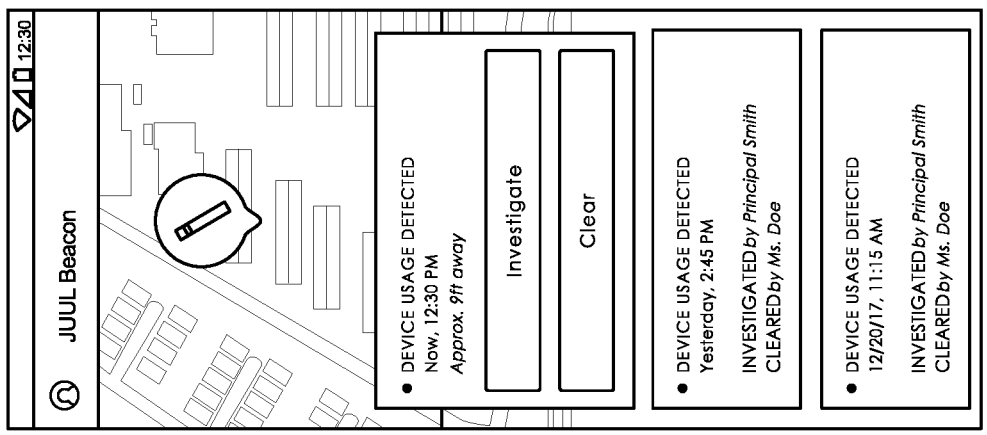

FIGS. 12A-12J illustrate UI screens that may be used as part of the app interface (for example, connected with a smartphone) that may be used with a vaporizer as described herein, including an initial or subsequent beacon protocol for accessing a vaporizer and/or affiliated vaporizer data analysis, data collection and data processing systems, including the app itself within a communication range of the beacon. FIG. 12A illustrates a user interface for an app configured to allow the user to create an account or login to the user's account. FIG. 12B illustrates a user interface screen for an app that allows the user enter information (e.g., email address, password, etc.) in one or more fields to create an account. FIG. 12C illustrates a user interface screen for an app that an exemplary entry into the UI fields to create an account. FIG. 12D illustrates a UI screen for an app that allows the user to send an invitation to other users for them to create an account or to skip this process. FIG. 12E illustrates a user interface screen for an app that indicates that the application is searching for beacons within a communication range of the app and/or beacon. FIG. 12F illustrates a user interface screen for an app that indicates that the application has found a beacon within a communication range of the app and/or beacon and contains a field to name the beacon. FIG. 12G illustrates a user interface screen for an app that indicates that the application has found a beacon within the communication range of the app and/or beacon which has been named "Girl's Bathroom Quad." FIG. 12H illustrates a user interface screen for an app that indicates that includes a map showing an indication of beacon locations and also includes a list of the indicated beacons with names and a status of the listed beacons. FIG. 12I illustrates a user interface screen for an app that indicates one beacon of the list of beacons has been selected and provides the user an option to investigate or clear a vaporizer that was detected by the selected beacon (e.g., Girl's Bathroom Quad). FIG. 12J illustrates a user interface screen for an app that indicates options for the user to select after selecting to investigate in FIG. 12I. The options include assigning the investigation to an individual (e.g., me, Jane Smith, Sharon Kim, Dave Rodriguez).

Any of the apps described herein may also be adapted for use with detection, including automatic detection, of the cartridge and/or vaporizable material. The app may provide instructions for detecting/identifying, or the operation of the app may be automatically adjusted/customized based on the detected cartridge, beacon, second device, and/or the like.

AGE VERIFICATION. FIGS. 17-31 illustrate example user interfaces that may appear in an app installed on a communication device in communication with a vaporizer (e.g., as part of an "app" or other software on a user's mobile device). The user interfaces of FIG. 17-31 relate to age verification features that may provide benefits in providing data as well as vaporizer-specific controls for preventing unauthorized and/or underage use, purchase, etc. of a vaporizer. In one implementation, the vaporizer may be configured to initiate functionality only after successful completion of an age verification process via the user interface. In another implementation, the vaporizer may be configured to disable responsive to the age verification process not being completed within a threshold duration after purchase.

Figure 17:
Figure 20:
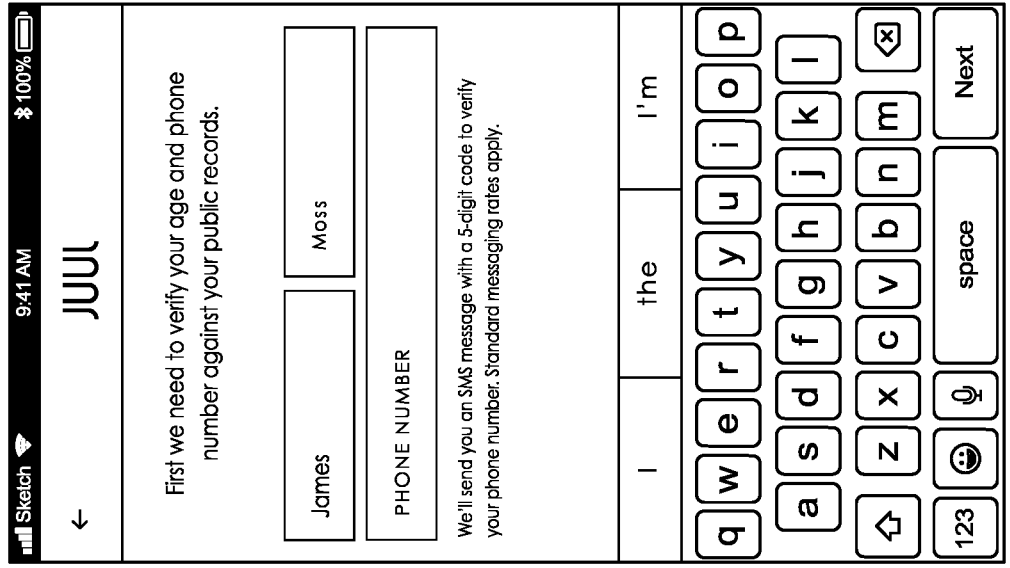
Figure 19:
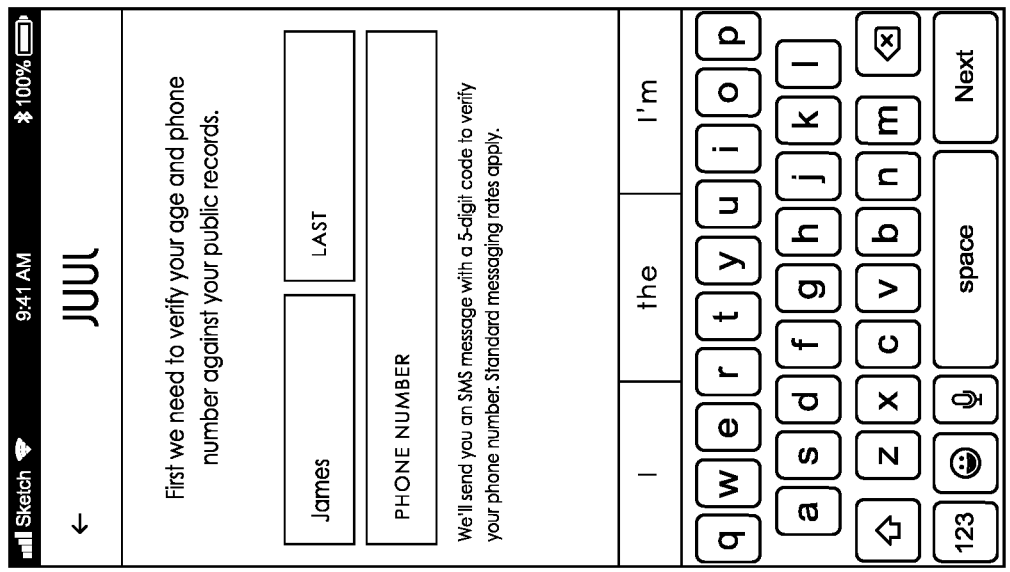

The app screen view of FIG. 17 or a similar approach may be used to prompt a user of a vaporizer to implement a device age verification feature. In one example, the user may be prompted to enter the age verification process by agreeing to be age verified. Alternatively, responsive to the user "opting-out" of the age verification process and/or being under a threshold age, the vaporizer may be configured to disable functionality. The threshold age may be based on consumption laws of a user's geographical region and/or other considerations.

Figure 22:
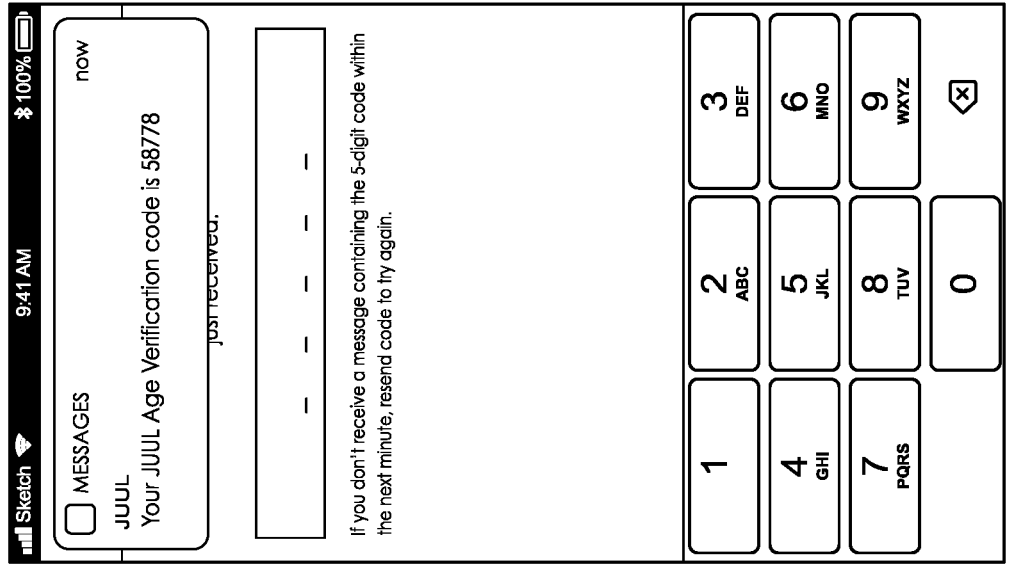
Figure 21:
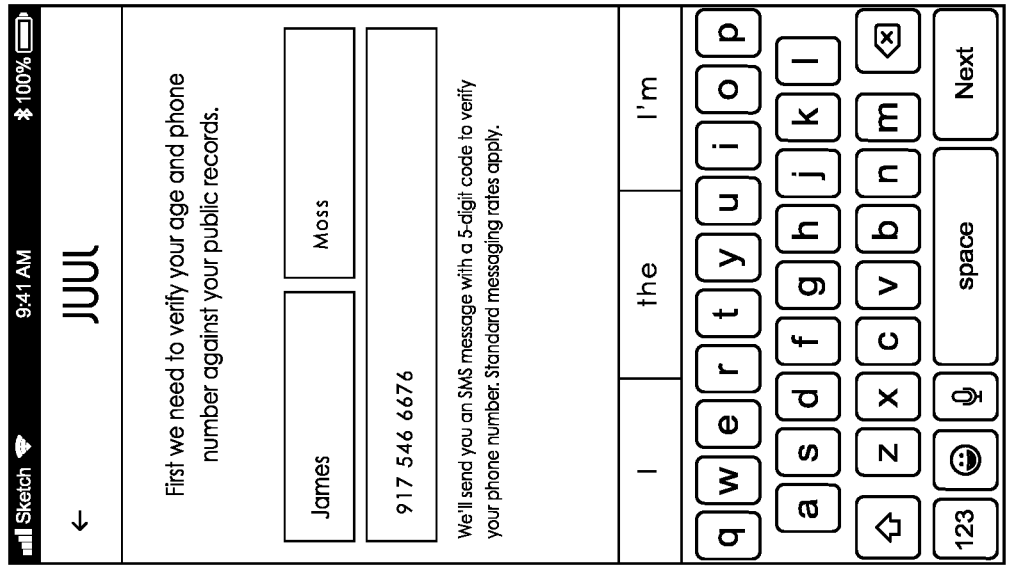

The screen views of FIGS. 18-21 show a view that may be presented to the user upon selection of, and agreement to, the age verification feature. This screen may prompt the user to enter personal user information (e.g., user's name and phone number). In some implementations, other user information may be required such as a social security number, driver's license, identification card, credit history, facial recognition, and/or the like. Responsive to the user inputting the user information, the age verification feature may be configured to verify the user's age using one or more authentication methods. For example, a user's name and phone number may be verified using a two-factor authentication (e.g., receive code via text message). The user may then receive an authentication message containing a unique or "one time use" numeric and/or alphanumeric security code, as shown in FIG. 22.

Figure 24:
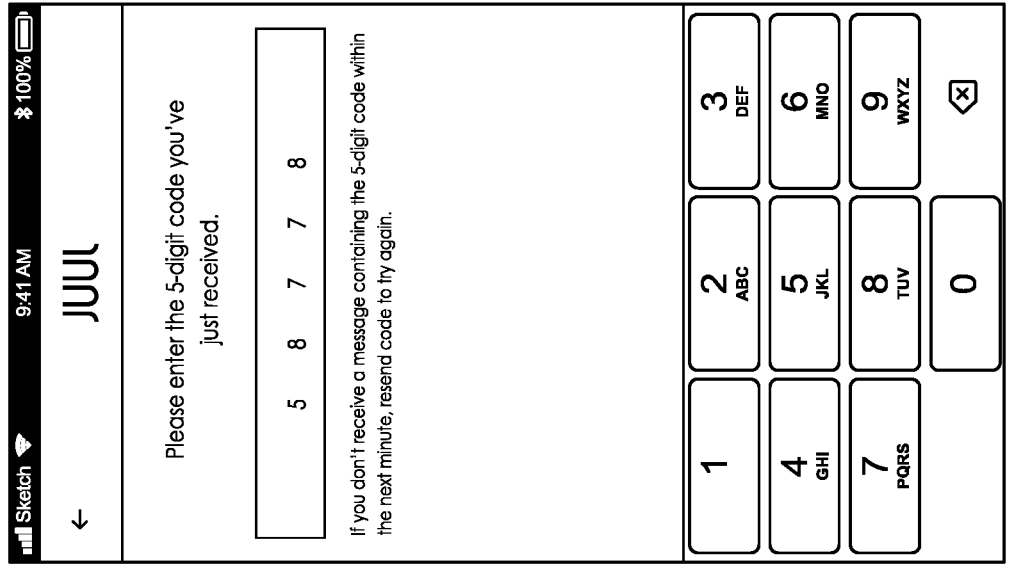
Figure 23:
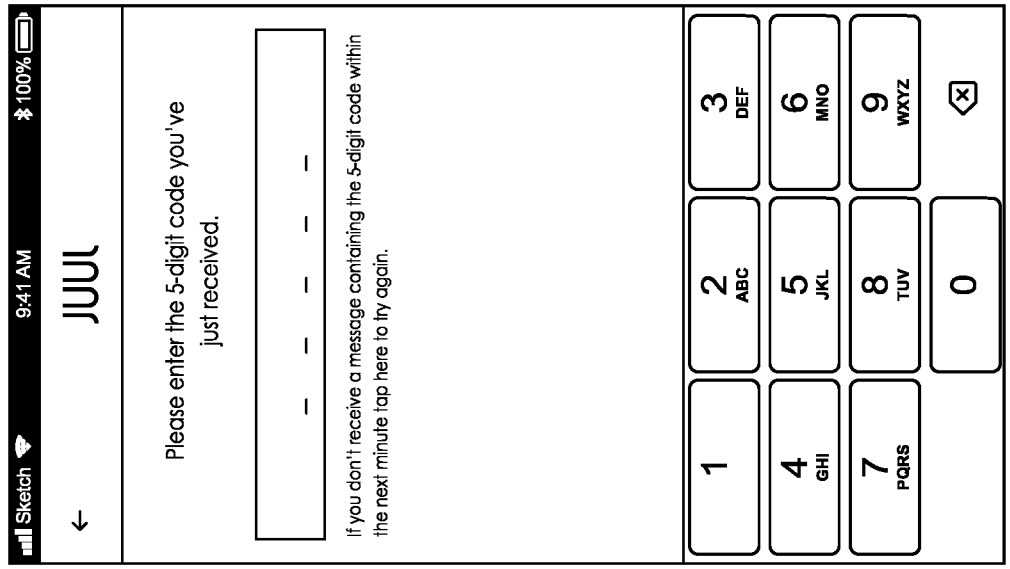
Figure 26:
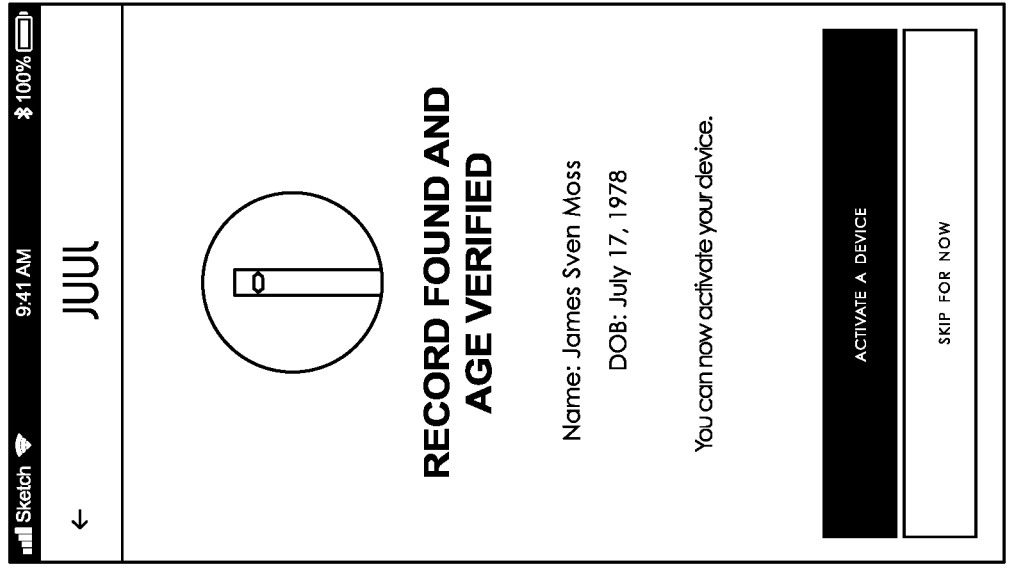
Figure 25:
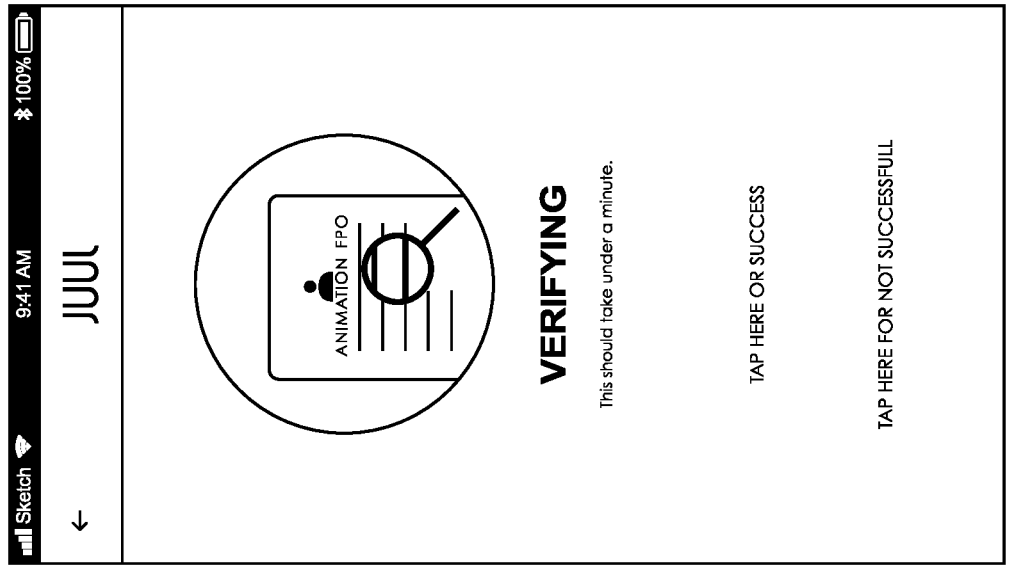

As shown in FIGS. 23 and 24, the user may be prompted to enter the security code they received. Once the user has entered the security code, the app screen view of FIG. 17 or a similar approach may be used to communicate that the user information is being verified. User information may be verified using one or more of a third-party verification system, user information database, and/or other verification methods. The duration of the verification process may be displayed (e.g., "under a minute," and/or other durations). Responsive to successful verification of the user information, the user may be notified via the app screen view of FIG. 26 or a similar approach. However, if the user information cannot be verified, the user may be notified via the app screen view of FIG. 27 or a similar approach, and the user may be prompted to provide additional user information to continue the age verification process.

Responsive to an unverified user continuing the verification process, the screen views of FIGS. 28-31, or a similar approach, may be used to prompt the user to provide user information documentation such as a valid driver's license, state identification card, passport, social security number, and/or other information. The app may be configured to access one or more features of the user device, such as a camera feature, to capture, scan, or otherwise document the user's information. In one implementation, facial recognition may be used to verify and authenticate photo identification provided by the user. Responsive to submission of the user information documentation and/or images, the app screen view of FIG. 31 or a similar approach may be used to communicate that the user information is being verified. In some implementations, an estimated duration of verification time and/or a status bar may be displayed. Responsive to successful verification of the user information, the user may be notified via the app screen view of FIG. 26 or a similar approach.

Figure 32:
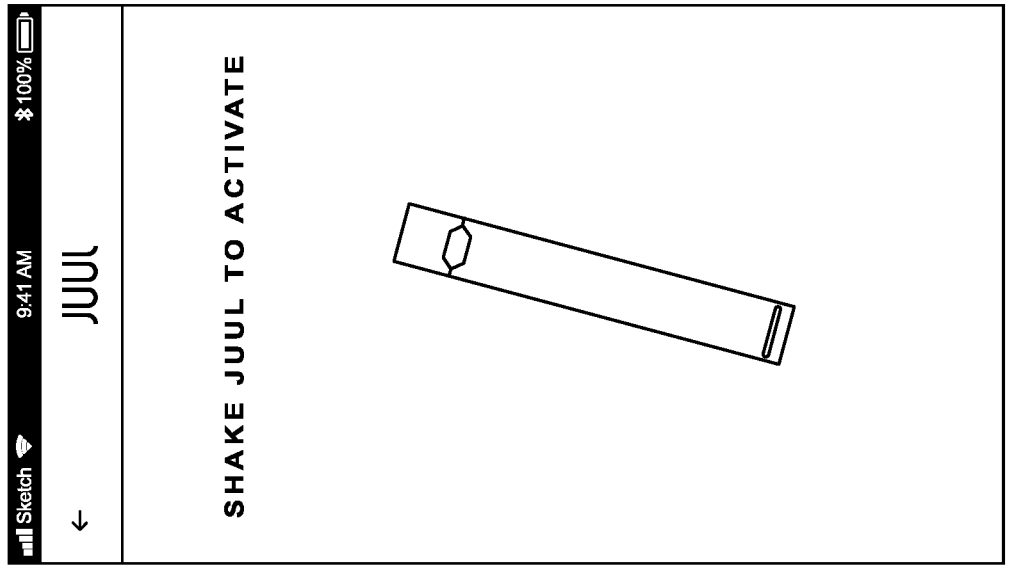
Figure 31:
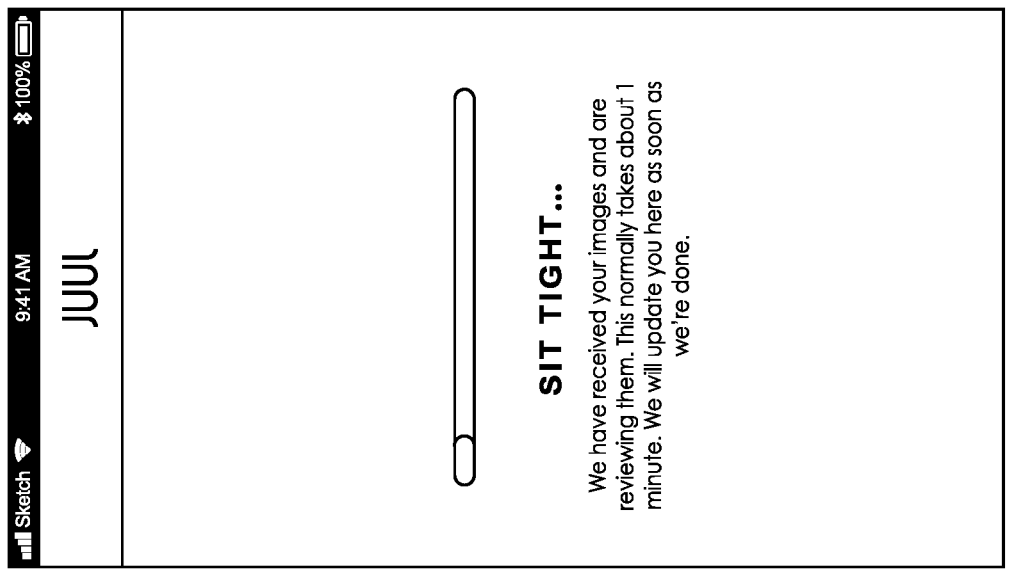
Figure 33:
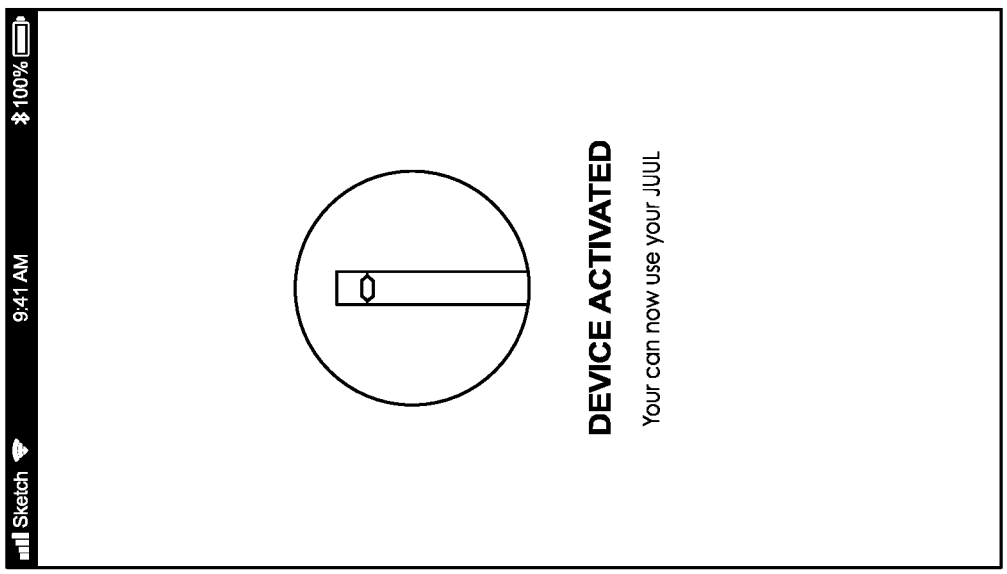

Once the age verification process has been completed, the vaporizer may be configured for activation by prompting, via the app screen view of FIG. 32 or a similar approach, one or more user actions such as shaking the vaporizer, and/or other user inputs. A confirmation of vaporizer activation may be provided, as shown in FIG. 33.

Figure 34:
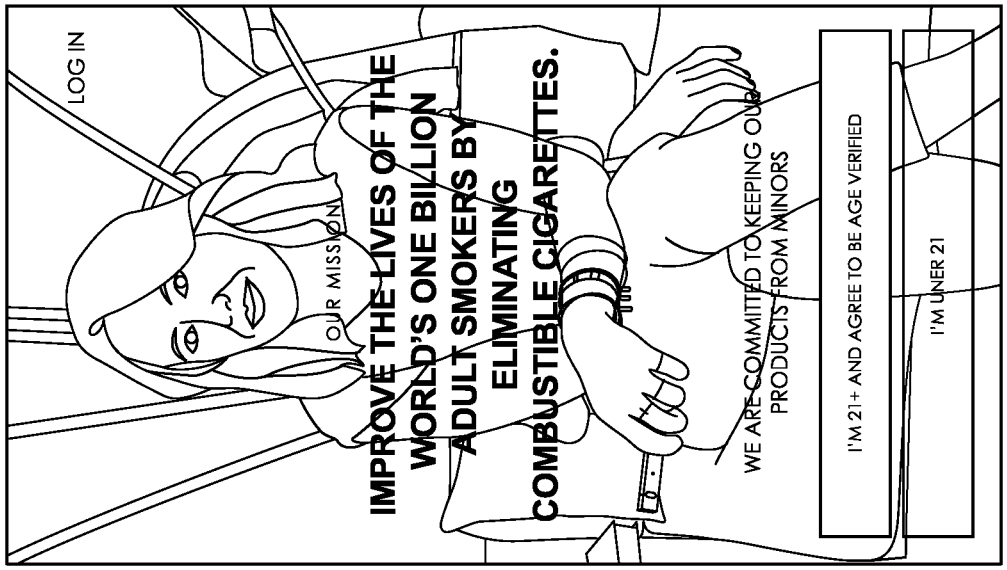
Figure 35:

In some implementations of the current subject matter, responsive to a user exiting and returning to the app, a screen view such as shown in FIG. 34 may be provided. A new user may initiate the age verification process or a returning verified user may "Log In" to their associated user account. A logged-in, verified user may then access additional features of the app including a vaporizer to mobile, or other user device, pairing process as shown in FIG. 35. A quick start guide and/or other on-boarding instructions (e.g., user manuals and/or use tutorials configured to familiarize the user with the vaporizer) may be provided by the app to a logged-in, verified user. Additional coaching and habit management programs may also be provided, as described further herein.

Figure 36:
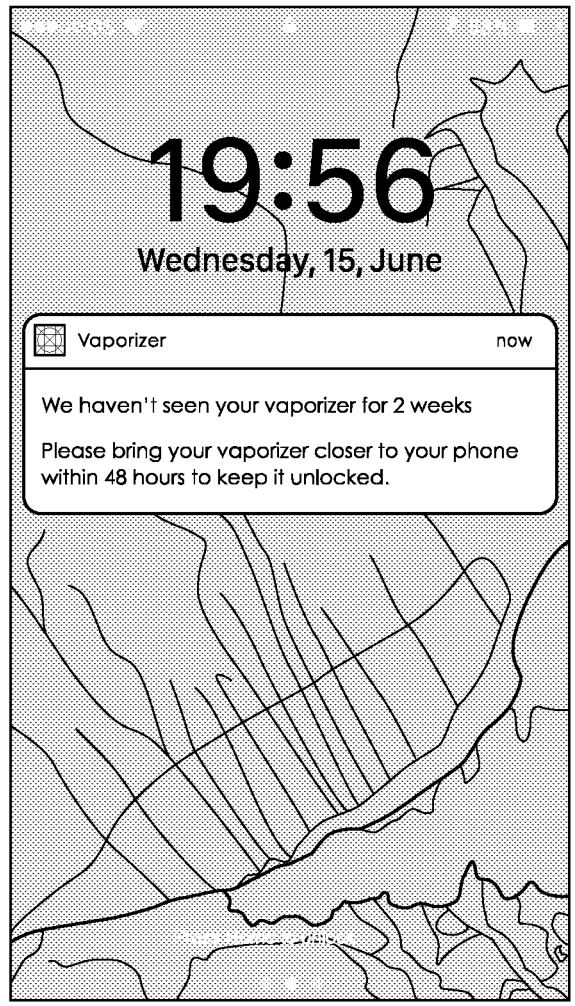

In some implementations, after activation, the device may periodically re-verify in the background with little to no action required by the user. For example, the vaporizer may be required to connect with the user device periodically (e.g., once per week, every two weeks, and/or other durations), as shown in FIG. 36. In some implementations, the age verification process may only be required responsive to insertion of specific cartridge types (e.g., flavored cartridges) into the vaporizer.

Figure 37:
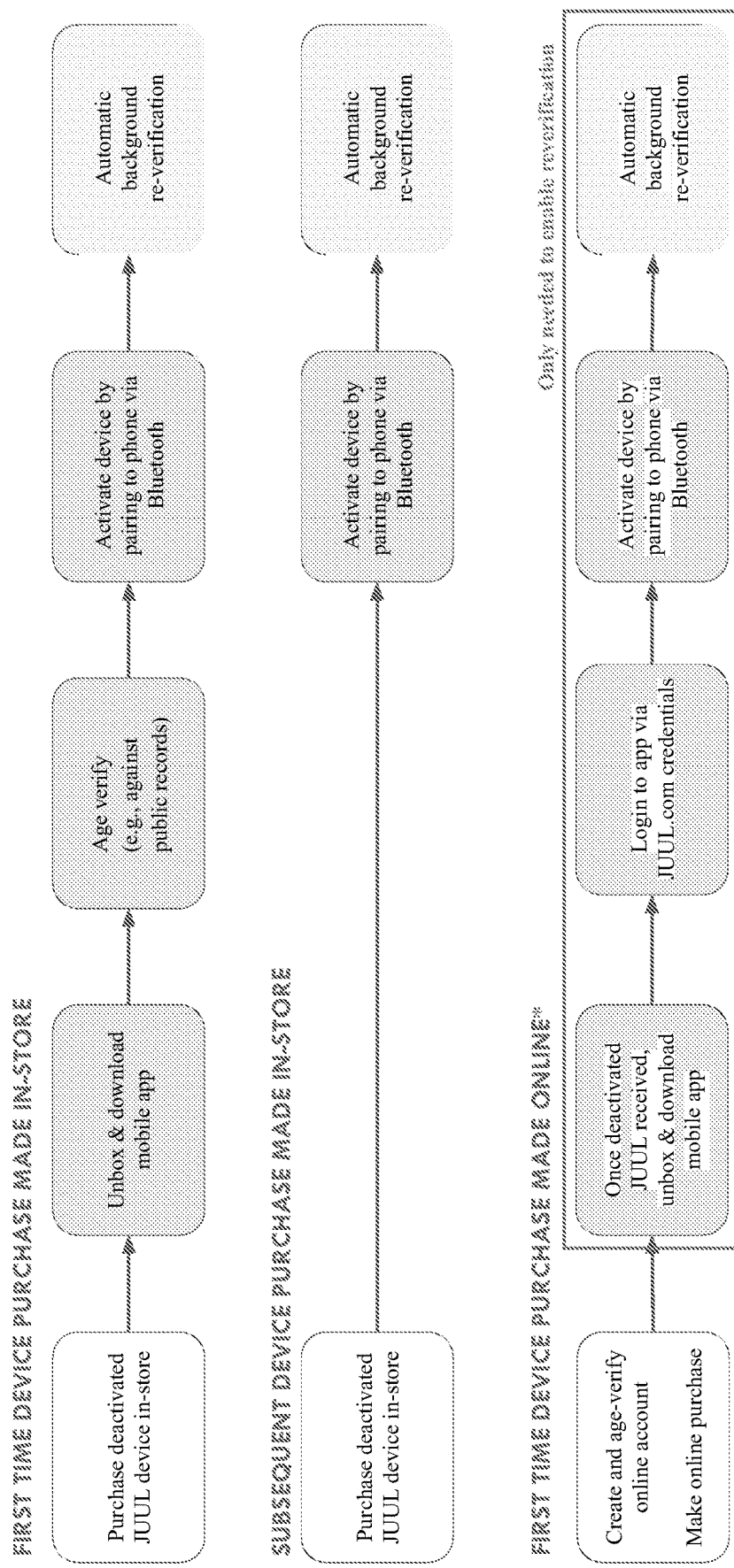
FIG. 37 illustrates an exemplary method consistent with implementations of the current subject matter.
Figure 38A:
FIGS. 38A and 38B illustrate exemplary methods consistent with implementations of the current subject matter.
Figure 38B:
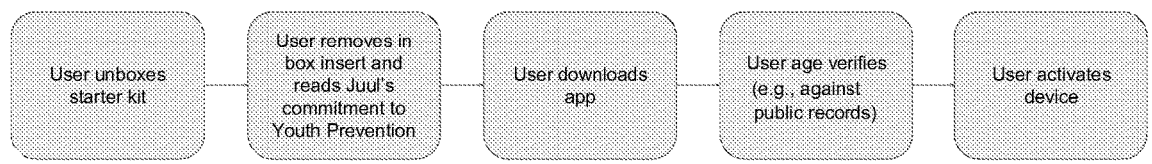
Figure 39:
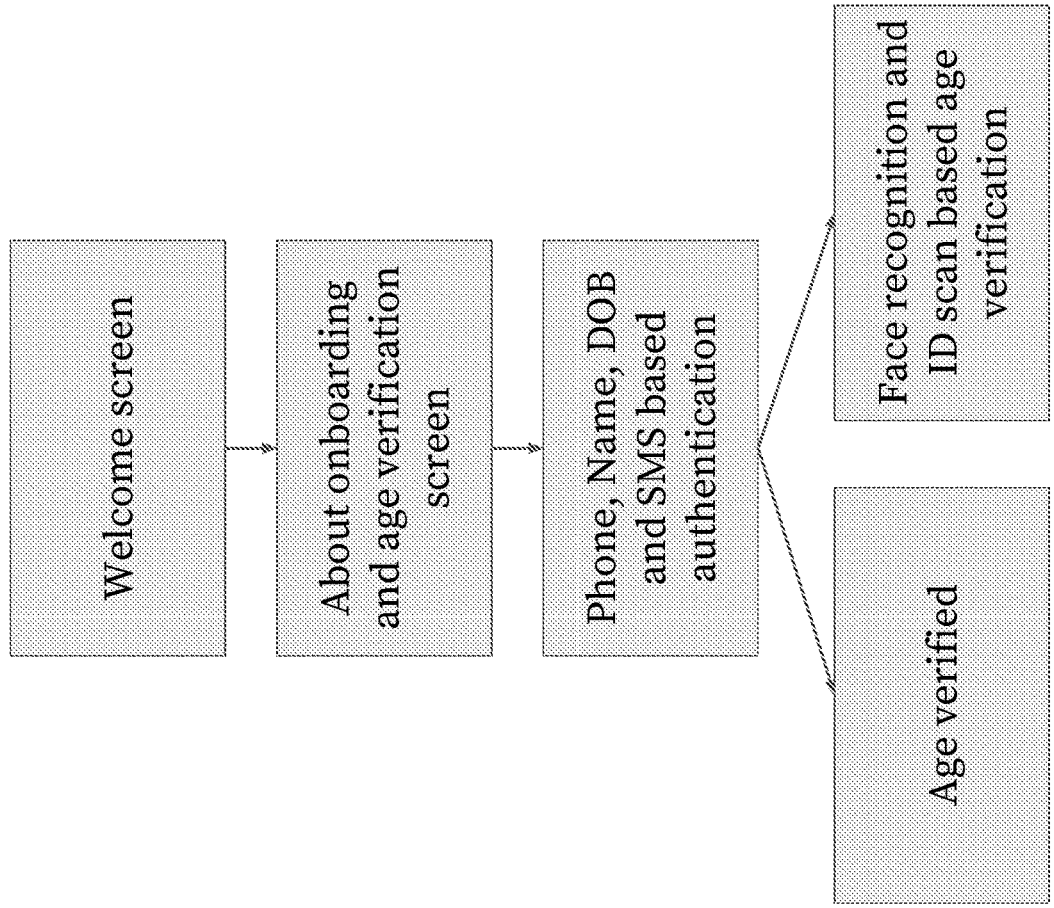
FIG. 39 illustrates an exemplary method consistent with implementations of the current subject matter.

FIGS. 37-39 describe one or more age verification methods for ensuring age-appropriate use of the vaporizer. As shown in FIG. 37, a first time device purchase made in-store may require one or more of the following steps for age verification and/or activation of the device: (1) purchase deactivated device in-store; (2) unbox and download mobile app; (3) age verify against public records; (4) activate vaporizer by pairing to a user device via Bluetooth and/or other connection; and/or (5) automatic reverification of device. A subsequent device purchase made in-store may require one or more of the following steps for age verification and/or activation of the device: (1) purchase deactivated device in-store; (2) activate vaporizer by pairing to a user device via Bluetooth and/or other connection; and/or (3) automatic reverification of device. A first time device purchase made online may require one or more of the following steps for age verification and/or activation of the device: (1) create and age-verify an online account and make online purchase; (2) receive deactivated device, unbox, and download mobile app; (3) log into app using online account credentials; (4) activate vaporizer by pairing to a user device via Bluetooth and/or other connection; and/or (5) automatic reverification of device.

As shown in FIG. 38A, another embodiment of an age verification method for ensuring age-appropriate use of the vaporizer may include one or more of the following steps for age verification and/or unlocking of a vaporizer: (1) unbox the vaporizer and/or cartridge(s); (2) download app; (3) age verify; (4) unlock vaporizer by pairing to a user device via Bluetooth and/or other connection; and/or (5) automatic reverification of device. In yet another embodiment, as shown in FIG. 38B, of an age verification method for ensuring age-appropriate use of the vaporizer may include one or more of the following steps for age verification and/or unlocking of a vaporizer: (1) unbox the vaporizer and/or cartridge(s); (2) read provided Youth Prevention information; (3) download app; (4) age verify against public records; (5) activate vaporizer by pairing to a user device via Bluetooth and/or other connection.

As shown in FIG. 39, another embodiment of an age verification method for ensuring age-appropriate use of a vaporizer may include one or more of the following steps for age verification via a user interface: (1) provide a welcome screen; (2) provide onboarding information and prompt for age verification information; (3) verify user information with authentication; and/or (4a) provide notification of successful age verification; or (4b) require additional age verification information.

After a user has been age verified and their associated vaporizer is unlocked using one or more of the methods described herein, the user may be required to re-authenticate themselves periodically. Re-authentication may be required (e.g., based on firmware within the vaporizer) once per day, per a specific number of days, per week, per a specific number of weeks, per month, per a specific number of months, etc. In some implementations, the vaporizer may require re-authentication once every two weeks. Re-authentication may occur via the use of a user device executing a specific application capable of communicating with the vaporizer, such as those described herein. For example, re-authentication may require a user to periodically electronically pair (e.g., via Bluetooth) their vaporizer with a user device through the application. In some aspects, the period of time required for re-authentication may start once the vaporizer detects that it is no longer paired to the user device, may restart each time the vaporizer detects that it is paired to the user device, may start regardless of the most recent pairing (e.g., restart based on a specific re-authentication procedure implemented through the execution of the application), and/or the like.

In some implementations, after a user has been age verified using one or more of the methods described herein, the application executed on the user device may store credentials for the user indicating that the user is age-verified (e.g., user account information with a specific value for an "age verified" field associated with the user account). In some implementations, the credentials may be created as part of a registration process that is implemented using the application executed on the user device. In some implementations, the user device may receive the credentials or some portion thereof from a server after an initial account setup and/or age verification of the user. For example, if a user age-verifies themselves using a web browser, a dedicated kiosk, two-step verification (e.g., via email, SMS, and/or the like) and/or others methods external to the application executed on the user device, then a server configured for communication with the user device may transmit the credentials or some portion thereof to the user device. In some aspects, a user may only be allowed to (re)authenticate themselves for the purposes of unlocking a user device if the credentials stored on the user device indicate that the user is age-verified. In some aspects, devices purchased using an age-verified user account may be shipped activated, but may still require (re)authentication within a specified period of time.

In some aspects, a user may be restricted from purchasing a specific number of vaporizers and/or cartridges for use with a vaporizer within a specific time. For example, in some aspects, a user may be restricted from buying more than one, two, three, etc. devices within a month (e.g., calendar month or rolling based on the last purchase of a vaporizer). In some aspects, a user may be restricted from buying more than ten, fifteen, twenty sets of cartridges, etc. (e.g., with two, three, four, five, etc. cartridges per set) within a month (e.g., calendar month or rolling based on the last purchase of a set of cartridges). In some implementations, a user's purchases may be tracked through more than one source. For example, a user's aggregate purchases within a specific time may be determined based on data received through user device(s), web browser(s), kiosk(s), retail store(s) (e.g., via point-of-sale systems), online retailer(s), server(s) configured for communication with one or more thereof, and/or the like. In order to track a user's aggregate purchases, the user may be required to utilize an age-verified user account for each purchase.

In order to prevent a user from creating multiple user accounts, a user may be restricted to one account for each set of unique credentials (e.g., unique information that only identifies one person). In order to determine whether a set of credentials is unique, the system (e.g., via a server) may require a user to provide a valid name, date of birth, permanent address, and the last four digits of their social security number. This information can be verified by a third party and/or cross-referenced with publicly available records to confirm the person is of age in their location/jurisdiction. If a user's public records fail to match or they do not wish to provide their social security number, the user may be required to upload or swipe (through a card reader) a valid government-issued ID for compliance review. In some aspects, a user may be required to verify themselves through multi-factor authentication. For example, in order to create a user account, a user may be required to provide a phone number and then provide the code sent to the phone number before proceeding. In some aspects, a code may only be sent to a phone when the phone number is known to be associated with a person of legal age for purchase of a vaporizer. In some aspects, a SIM card associated with the phone number may be verified and a user may only be permitted to use a code sent to a phone number when the SIM card is verified (e.g., when the SIM card is associated with the phone number provided). Additionally or alternatively, a user may be required to upload or swipe (through a card reader) a valid government-issued ID and scan their face through a facial-recognition interface (e.g., provided through execution of an application on the user device being used for account creation). In order to prevent a user from using multiple user accounts from different users, the user may be required to verify themselves each time they use a user account for a purchase, such as through electronic verification of an ID (e.g., driver's license), facial recognition, and/or the like.

In some implementations, a kiosk or other device may be configured for device activation. For example, a kiosk may be configured to receive user input to age verify a user according to the methods described herein. Once the user is age verified, the kiosk may provide the user with a receipt having a code (e.g., barcode, QR code, numerical value, alphanumeric string, and/or the like) for presentation to a store clerk. The store clerk may scan or input the code into a system that indicates what the user may purchase prior to allowing the store to sell vaporizers or cartridges to a user. In some aspects, the kiosk may be connected (e.g., physically, electronically, and/or in communication with) to a vending machine with vaporizers and/or cartridges. Once the user is age verified and makes a purchase, the vending machine may dispense the purchase to the user.

In some aspects, vaporizers stored in the vending machine may be deactivated and/or require authentication (e.g., via one or more of the device-pairing methods described herein) before a user may use the vaporizer. In some aspects, the vaporizer may not be configured for wireless communication with a user device. Accordingly, such vaporizers may be prevented from activation based on information stored on the device, such as a register (e.g., 1 bit) in the vaporizer. In order to activate the device, a user may be required to place the device into an interface in communication with the kiosk. After the user is age verified and the vaporizer is placed into the interface, the kiosk may be configured to change the value of the register to unlock the device. In some implementations, the interface can include a cradle and/or cable with an electronic interface capable of communicating with the vaporizer through an interface built into the vaporizer (e.g., USB or other data communication interface, such as one or more pins). Once the device is unlocked, the serial number or other unique identifier associated with the vaporizer, a date of activation, a date of purchase, and/or the like may be associated with the user account for tracking purposes. Although a kiosk is described, any device capable of communicating with the device without the use of wireless communications may be used.

In some aspects, a user may be permitted to purchase vaporizers and/or cartridges beyond a set limit but the vaporizers and/or cartridges may be held until the expiration of the current period of time during which the user is above the set limit. For example, if a user is restricted from buying more than two vaporizers per month and the user attempts to buy a third vaporizer within the same month (calendar month or rolling month based on the purchase of the first vaporizer), then the vaporizer may be held until the month is over. When the month is over, the vaporizer may be released to the user (e.g., auto-shipped). Additionally or alternatively, a user may be limited to a number of activations per a specified time period (e.g., two activations per month). Activations may be tracked by a server configured for communication with a plurality of devices configured for vaporizer activations (e.g., user devices executing dedicated application and/or the like). In an example implementation, if a user is restricted from activating more than two vaporizers per month and the user attempts to activate a third vaporizer within the same month (calendar month or rolling month based on the activation of the first vaporizer), then the device configured for vaporizer activation may not allow the user to activate the device until the month is over. The device may notify the user that they have exceeded their limit of activations and/or provide the user with information indicating when they will be able to activate the vaporizer. In the event a user returns a device, the user's account may be credited with an additional activation within the specific time period(s).

In some aspects, users may be restricted from purchasing and/or activating a specific number of vaporizers per year in addition to being restricted from purchasing and/or activating a specific number of vaporizers per month. For example, a user may be prevented from purchasing and/or activating more than two vaporizers per month and more than ten devices per year.

In some implementations, when a user purchases or activates a vaporizer using a user account, a serial number, MAC address, or other unique identifier associated with the vaporizer, a date of activation, a date of purchase, and/or the like may be associated with the user account for tracking purposes. In the event a user account is determined to be associated with improper activity (e.g., providing vaporizers to minors, shipping vaporizer to other jurisdictions, and/or the like), then the user account may be blocked/prevented from making additional purchases or activations.

In some aspects, the requirements to satisfy age verification may additionally or alternatively be based on GPS information. For example, based on a determined GPS location, a user may be prompted to supply specific documents for age verification sufficient for identification based on the jurisdiction covering the GPS location, such as either a driver's license or passport, only a passport, or the like.

Another useful implementation of the identification system may be point-of-purchase and/or cartridge tracking information. The location and/or date of when the cartridge was initially purchased, as well as vendor information, is beneficial both from a legal and safety standpoint and/or from a marketing standpoint. For example, if a cartridge is discovered in possession of someone under-age, the purchase information of the cartridge may identify whether a vendor is not performing age verification at the point-of-purchase or if the cartridges are being purchased by someone "of-age" and being provided to the minor.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to a given example, the features and elements so described or shown can apply to other implementations of the current subject matter. It will also be appreciated by those of skill in the art that references to a structure or feature that is disposed "adjacent" another feature may have portions that overlap or underlie the adjacent feature.

Terminology used herein is for the purpose of describing particular implementations and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification and in the claims, specify the presence of stated features, steps, operations, elements, and/or components, but do not preclude the presence or addition of one or more other features, steps, operations, elements, components, and/or groups thereof.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," herein and in the claims is intended to mean, "based at least in part on," such that an unrecited feature or element is also permissible.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative implementations are described herein, any of a number of changes may be made to various implementations without departing from the teachings herein. For example, the order in which various described method steps are performed may often be changed in alternative implementations, and in other alternative implementations one or more method steps may be skipped altogether. Optional features of various device and system implementations may be included in some implementations and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like The examples and illustrations included herein show, by way of illustration and not of limitation, specific implementations in which the subject matter may be practiced. As mentioned, other implementations may be utilized and derived there from, such that structural and logical substitutions and changes may be made without departing from the scope of this disclosure. Such implementations of the inventive subject matter may be referred to herein individually or collectively by the term "invention" merely for convenience and without intending to voluntarily limit the scope of this application to any single invention or inventive concept, if more than one is, in fact, disclosed. Thus, although specific implementations have been illustrated and described herein, any arrangement calculated to achieve the same purpose may be substituted for the specific implementations shown. This disclosure is intended to cover any and all adaptations or variations of various implementations. Combinations of the implementations described, and other implementations not specifically described herein, will be apparent to those of skill in the art upon reviewing the above description.

What is claimed is:

1. A method comprising:
   determining, via one or more processors, whether a vaporizer device is within a communication range of a second device, the determining based on transmitting a broadcast message from the second device;
   locking, via the one or more processors, the vaporizer device in response to the vaporizer device being within the communication range, wherein locking the vaporizer device comprises disabling use of a heating function of the vaporizer device;
   receiving, via the one or more processors, information indicative of an age of a user of the vaporizer device, the information received from a third device that is separate from the second device; and
   unlocking, via the one or more processors and based on the information indicative of the age of the user, the vaporizer device, wherein unlocking the vaporizer device comprises enabling use of the heating function at a time when the vaporizer device is within the communication range of the second device.

2. The method of claim 1, wherein locking the vaporizer device comprises sending a signal via an application running on the second device to the vaporizer device to disable the heating function of the vaporizer device.

3. The method of claim 1, further comprising displaying, on a user interface of the second device, a list or graphical representation of vaporizer devices within the communication range, wherein the vaporizer devices within the communication range comprise the vaporizer device and at least one other vaporizer device.

4. The method of claim 1, wherein receiving the information indicative of the age of the user comprises receiving the information via an application executing on the second device.

5. The method of claim 1, further comprising:
   transmitting, via the one or more processors, information associated with the user of the vaporizer device to the third device, wherein the third device comprises a server configured for determining the age of the user; and
   wherein receiving the information indicative of the age of the user comprises receiving, via the one or more processors and from the third device in response to transmitting the information associated with the user, a response indicating whether the age of the user satisfies a threshold, wherein unlocking the vaporizer device is in response to the response indicating that the age of the user satisfied the threshold.

6. The method of claim 1, wherein unlocking the vaporizer device comprises:
generating, via the third device, a code to unlock the vaporizer device;
transmitting, via the third device, the code;
receiving, via the one or more processors, an input of the code; and
activating, via the one or more processors, the vaporizer device in response to receiving the code.

7. The method of claim 6, wherein receiving the input of the code comprises receiving a user input of the code via interaction with a user interface of the second device.

8. The method of claim 6, wherein receiving the input of the code comprises receiving a user input of the code via interaction with the vaporizer device.

9. The method of claim 1, wherein the third device comprises a server in communication with an application running on the second device.

10. The method of claim 1, wherein locking the vaporizer device comprises sending a signal from the second device to the vaporizer device to disable operation of the vaporizer device.

11. The method of claim 1, further comprising reporting, to the third device, an indication of vaporizer devices within the communication range of the second device.

12. The method of claim 1, wherein the second device comprises the one or more processors.

13. A vaporizer device comprising:
at least one processor; and
at least one memory storing instructions which, when executed by the at least one processor, cause the vaporizer device to at least:
determine whether the vaporizer device is within a communication range of a second device, the determining based on receiving a broadcast message from the second device;
lock the vaporizer device to disable use of a heating function of the vaporizer device in response to the vaporizer device being within the communication range; and
unlock, based on information indicative of an age of the user, the vaporizer device, wherein unlocking the vaporizer device comprises enabling use of the heating function at a time when the vaporizer device is within the communication range of the second device, and wherein the information is received via a third device that is separate from the second device.

14. The vaporizer device of claim 13, wherein the vaporizer device is further caused to receive a signal from an application running on the second device to unlock the vaporizer device.

15. The vaporizer device of claim 13, wherein the vaporizer device is further caused to receive a user input by interaction of the user with a user interface.

16. The vaporizer device of claim 13, wherein the vaporizer device is further caused to receive the information indicative of the age of the user via an application executing on the second device.

17. The vaporizer device of claim 13, wherein the vaporizer device is further caused to compare the information indicative of the age of the user with second information associated with the user stored in a database.

18. The vaporizer device of claim 13, wherein the vaporizer device is further caused to at least:
receive an input of a code to unlock the vaporizer device; and
activate the vaporizer device in response to receiving the code.

19. The vaporizer device of claim 18, wherein the vaporizer device is further caused to receive a user input of the code by interaction with a user interface of the second device.

20. The vaporizer device of claim 18, wherein the vaporizer device is further caused to at least receive a user input of the code by interaction with the vaporizer device.

* * * * *